US008523672B2

(12) United States Patent
Kryuchkov et al.

(10) Patent No.: US 8,523,672 B2
(45) Date of Patent: *Sep. 3, 2013

(54) 3-D REELS AND 3-D WHEELS IN A GAMING MACHINE

(75) Inventors: Alexey Kryuchkov, Reno, NV (US); Robert E. Breckner, Reno, NV (US); Gregory A. Schlottmann, Sparks, NV (US); Johnny Palchetti, Las Vegas, NV (US); Steven G. LeMay, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,811

(22) Filed: Jul. 23, 2012

(65) Prior Publication Data

US 2012/0289306 A1   Nov. 15, 2012

Related U.S. Application Data

(63) Continuation of application No. 10/674,884, filed on Sep. 29, 2003, now Pat. No. 8,267,767, which is a continuation-in-part of application No. 09/927,901, filed on Aug. 9, 2001, now Pat. No. 6,887,157.

(51) Int. Cl.
*A63F 9/24*   (2006.01)
*A63F 13/00*   (2006.01)

(52) U.S. Cl.
USPC .................... 463/32; 463/16; 463/20; 463/31

(58) Field of Classification Search
USPC .......................................... 463/16, 20, 32, 33
See application file for complete search history.

(56) References Cited

U.S. PATENT DOCUMENTS 4,332,389 A * 6/1982 Loyd et al. ...................... 463/19
4,365,810 A * 12/1982 Richardson ................... 273/237

(Continued)

FOREIGN PATENT DOCUMENTS

AU   200227720   2/2003
AU   2003237479   1/2004

(Continued)

OTHER PUBLICATIONS

"3D Modelers Are Running under Linux" LinuxFocus: vol. Nr 4, May 1998 http://mercury.chem.pitt.edu/~tiho/LinuxFocus/English/May1998/index.html printed on Oct. 11, 2002.

(Continued)

*Primary Examiner* — Steven J Hylinski
(74) *Attorney, Agent, or Firm* — Neal, Gerber & Eisenberg LLP

(57) ABSTRACT

Techniques for presenting a plurality of game outcome presentations derived from one or more virtual 3-D gaming environments stored on the gaming machine are disclosed. While a game of chance is being played on a gaming machine, two-dimensional images derived from a 3-D object in the 3-D gaming environment may be rendered to a display screen on the gaming machine in real-time as part of a game outcome presentation. A sequence of symbols from a virtual reel strip in the 3-D gaming environment may be generated and displayed. The sequence of symbols may be mapped to one or more of flat reels, rounded reels or sequences of moving objects in the 3-D gaming environment, which may be moved in the 3-D gaming environment through a motion that allow the sequence of symbols from the virtual reel strip to be displayed as part of game outcome presentation.

26 Claims, 13 Drawing Sheets

(56) References Cited

U.S. PATENT DOCUMENTS

| | | | |
|---|---|---|---|
| 4,373,726 A * | 2/1983 | Churchill et al. | 463/19 |
| 4,455,025 A * | 6/1984 | Itkis | 273/237 |
| 4,469,536 A * | 9/1984 | Forester | 148/403 |
| 4,572,509 A | 2/1986 | Sitrick | |
| 4,624,462 A * | 11/1986 | Itkis | 273/237 |
| 4,634,126 A * | 1/1987 | Kimura | 273/129 S |
| 4,798,387 A * | 1/1989 | Richardson | 273/237 |
| 4,823,345 A | 4/1989 | Daniel et al. | |
| 4,848,771 A * | 7/1989 | Richardson | 273/237 |
| 4,856,787 A * | 8/1989 | Itkis | 273/237 |
| 4,885,703 A * | 12/1989 | Deering | 345/422 |
| 4,914,607 A | 4/1990 | Takanashi et al. | |
| 4,986,543 A | 1/1991 | Heller | |
| 5,007,649 A * | 4/1991 | Richardson | 463/25 |
| 5,227,771 A | 7/1993 | Kerr et al. | |
| 5,242,163 A * | 9/1993 | Fulton | 463/13 |
| 5,255,352 A * | 10/1993 | Falk | 345/582 |
| 5,297,802 A * | 3/1994 | Pocock et al. | 463/19 |
| 5,303,388 A | 4/1994 | Kreitman et al. | |
| 5,339,390 A | 8/1994 | Robertson et al. | |
| 5,342,047 A | 8/1994 | Heidel | |
| 5,351,970 A * | 10/1994 | Fioretti | 463/19 |
| 5,393,057 A * | 2/1995 | Marnell, II | 463/13 |
| 5,435,554 A | 7/1995 | Lipson | |
| 5,455,904 A | 10/1995 | Bouchet et al. | |
| 5,469,536 A | 11/1995 | Blank et al. | |
| 5,485,197 A | 1/1996 | Hoarty et al. | |
| 5,594,844 A | 1/1997 | Sakai et al. | |
| 5,604,852 A * | 2/1997 | Watters et al. | 345/443 |
| 5,608,850 A | 3/1997 | Robertson et al. | |
| 5,621,906 A | 4/1997 | O'Neill et al. | |
| 5,639,088 A * | 6/1997 | Schneider et al. | 273/138.2 |
| 5,643,086 A * | 7/1997 | Alcorn et al. | 463/29 |
| 5,678,015 A | 10/1997 | Goh | |
| 5,682,043 A | 10/1997 | Pei et al. | |
| 5,689,628 A | 11/1997 | Robertson et al. | |
| 5,729,673 A * | 3/1998 | Cooper et al. | 345/427 |
| 5,742,779 A | 4/1998 | Steele et al. | |
| 5,745,109 A | 4/1998 | Nakano et al. | 715/838 |
| 5,755,621 A * | 5/1998 | Marks et al. | 463/42 |
| 5,766,074 A * | 6/1998 | Cannon et al. | 463/16 |
| 5,775,993 A | 7/1998 | Fentz et al. | |
| 5,788,573 A * | 8/1998 | Baerlocher et al. | 463/16 |
| 5,805,783 A * | 9/1998 | Ellson et al. | 345/468 |
| 5,807,172 A * | 9/1998 | Piechowiak | 463/20 |
| 5,816,918 A | 10/1998 | Kelly et al. | |
| 5,833,540 A * | 11/1998 | Miodunski et al. | 463/42 |
| 5,836,819 A | 11/1998 | Ugawa | |
| 5,880,733 A * | 3/1999 | Horvitz et al. | 715/850 |
| 5,903,271 A | 5/1999 | Bardon et al. | |
| 5,912,671 A | 6/1999 | Oka et al. | |
| 5,934,672 A * | 8/1999 | Sines et al. | 273/143 R |
| 5,941,772 A | 8/1999 | Paige | 463/20 |
| 5,956,038 A | 9/1999 | Rekimoto | 345/419 |
| 5,967,895 A * | 10/1999 | Kellen | 463/19 |
| 5,998,803 A * | 12/1999 | Forrest et al. | 257/40 |
| 6,002,403 A | 12/1999 | Sugiyama et al. | |
| 6,002,853 A | 12/1999 | de Hond | |
| 6,005,579 A | 12/1999 | Sugiyama et al. | |
| 6,008,579 A * | 12/1999 | Negi et al. | 313/532 |
| 6,009,458 A | 12/1999 | Hawkins et al. | |
| 6,012,984 A * | 1/2000 | Roseman | 463/42 |
| 6,014,142 A | 1/2000 | Lahood et al. | |
| 6,023,371 A | 2/2000 | Onitsuka et al. | 359/620 |
| 6,027,115 A * | 2/2000 | Griswold et al. | 273/143 R |
| 6,029,973 A | 2/2000 | Takemoto | |
| 6,031,545 A | 2/2000 | Ellenby et al. | |
| 6,033,307 A | 3/2000 | Vancura et al. | |
| 6,043,818 A | 3/2000 | Nakano et al. | |
| 6,050,895 A * | 4/2000 | Luciano, Jr. et al. | 463/7 |
| 6,057,856 A | 5/2000 | Miyashita et al. | |
| 6,062,978 A | 5/2000 | Martino et al. | |
| 6,080,063 A | 6/2000 | Khosla | |
| 6,089,976 A * | 7/2000 | Schneider et al. | 463/16 |
| 6,093,100 A * | 7/2000 | Singer et al. | 463/13 |
| 6,094,196 A | 7/2000 | Berry et al. | |
| 6,104,815 A * | 8/2000 | Alcorn et al. | 380/251 |
| 6,106,396 A * | 8/2000 | Alcorn et al. | 463/29 |
| 6,131,909 A * | 10/2000 | Chilese | 273/292 |
| 6,135,884 A | 10/2000 | Hedrick et al. | |
| 6,149,156 A * | 11/2000 | Feola | 273/292 |
| 6,149,522 A * | 11/2000 | Alcorn et al. | 463/29 |
| 6,159,095 A | 12/2000 | Frohm et al. | 463/19 |
| 6,183,361 B1 * | 2/2001 | Cummings et al. | 463/18 |
| 6,203,428 B1 * | 3/2001 | Giobbi et al. | 463/16 |
| 6,206,782 B1 | 3/2001 | Walker et al. | |
| 6,220,593 B1 | 4/2001 | Pierce et al. | |
| 6,234,901 B1 | 5/2001 | Nagoshi et al. | |
| 6,254,483 B1 | 7/2001 | Acres | |
| 6,267,669 B1 * | 7/2001 | Luciano et al. | 463/7 |
| 6,271,842 B1 | 8/2001 | Bardon et al. | |
| 6,280,325 B1 * | 8/2001 | Fisk | 463/19 |
| 6,287,201 B1 | 9/2001 | Hightower | |
| 6,315,666 B1 * | 11/2001 | Mastera et al. | 463/31 |
| 6,319,128 B1 | 11/2001 | Miyoshi et al. | |
| 6,331,146 B1 * | 12/2001 | Miyamoto et al. | 463/32 |
| 6,332,838 B1 * | 12/2001 | Yamagami | 463/9 |
| 6,342,892 B1 * | 1/2002 | Van Hook et al. | 345/503 |
| 6,346,956 B2 | 2/2002 | Matsuda | |
| 6,347,999 B1 * | 2/2002 | Yuan | 463/46 |
| 6,390,470 B1 | 5/2002 | Huang | |
| 6,398,218 B1 | 6/2002 | Vancura | |
| 6,409,602 B1 | 6/2002 | Wiltshire et al. | |
| 6,409,604 B1 | 6/2002 | Matsuno | |
| 6,413,162 B1 | 7/2002 | Baerlocher et al. | |
| 6,431,982 B2 | 8/2002 | Kobayashi | |
| 6,454,649 B1 * | 9/2002 | Mattice et al. | 463/17 |
| 6,458,032 B1 * | 10/2002 | Yamagami | 463/9 |
| 6,506,114 B1 | 1/2003 | Estes et al. | |
| 6,508,709 B1 | 1/2003 | Karmarkar | |
| 6,512,522 B1 | 1/2003 | Miller et al. | |
| 6,515,688 B1 | 2/2003 | Berry et al. | |
| 6,517,433 B2 * | 2/2003 | Loose et al. | 463/20 |
| 6,524,185 B2 * | 2/2003 | Lind | 463/19 |
| 6,533,273 B2 | 3/2003 | Cole et al. | |
| 6,537,150 B1 * | 3/2003 | Luciano et al. | 463/16 |
| 6,542,168 B2 | 4/2003 | Negishi et al. | |
| 6,559,863 B1 | 5/2003 | Megiddo | |
| 6,569,017 B2 * | 5/2003 | Enzminger et al. | 463/19 |
| 6,570,587 B1 | 5/2003 | Efrat et al. | |
| 6,577,330 B1 | 6/2003 | Tsuda et al. | |
| 6,597,358 B2 | 7/2003 | Miller | |
| 6,597,380 B1 | 7/2003 | Wang et al. | |
| 6,626,760 B1 | 9/2003 | Miyamoto et al. | |
| 6,628,310 B1 | 9/2003 | Hiura et al. | |
| 6,641,478 B2 * | 11/2003 | Sakai | 463/32 |
| 6,645,070 B2 | 11/2003 | Lupo | |
| 6,656,044 B1 * | 12/2003 | Lewis | 463/19 |
| 6,661,426 B1 | 12/2003 | Jetha et al. | |
| 6,667,741 B1 | 12/2003 | Kataoka et al. | |
| 6,669,562 B1 | 12/2003 | Shiino | |
| 6,700,588 B1 | 3/2004 | MacInnis et al. | |
| 6,734,884 B1 | 5/2004 | Berry et al. | |
| 6,746,329 B1 * | 6/2004 | Duhamel | 463/20 |
| 6,760,050 B1 | 7/2004 | Nakagawa | |
| 6,769,982 B1 | 8/2004 | Brosnan | |
| 6,772,195 B1 | 8/2004 | Hatlelid et al. | |
| 6,802,776 B2 * | 10/2004 | Lind et al. | 463/19 |
| 6,811,482 B2 * | 11/2004 | Letovsky | 463/7 |
| 6,822,662 B1 | 11/2004 | Cook et al. | |
| 6,840,858 B2 * | 1/2005 | Adams | 463/19 |
| 6,847,162 B2 * | 1/2005 | Duggal et al. | 313/504 |
| 6,866,585 B2 | 3/2005 | Muir | |
| 6,887,157 B2 * | 5/2005 | LeMay et al. | 463/32 |
| 6,902,481 B2 | 6/2005 | Breckner et al. | |
| 6,922,815 B2 | 7/2005 | Rosen | |
| 6,938,218 B2 | 8/2005 | Rosen | |
| 6,942,571 B1 | 9/2005 | McAllister et al. | |
| 7,008,324 B1 | 3/2006 | Johnson et al. | |
| 7,009,611 B2 | 3/2006 | Di Lelle | |
| 7,034,825 B2 | 4/2006 | Stowe et al. | |
| 7,070,504 B2 | 7/2006 | Iwamoto | |
| 7,179,166 B1 * | 2/2007 | Abbott | 463/9 |
| 7,192,345 B2 * | 3/2007 | Muir et al. | 463/20 |

| | | | |
|---|---|---|---|
| 7,291,068 B2 | 11/2007 | Bryant et al. | |
| 7,318,774 B2 | 1/2008 | Bryant et al. | |
| 7,367,885 B2* | 5/2008 | Escalera et al. | 463/32 |
| 7,400,322 B1 | 7/2008 | Urbach | |
| 7,465,230 B2 | 12/2008 | LeMay et al. | |
| 7,503,003 B2 | 3/2009 | Kamen et al. | |
| 7,503,006 B2 | 3/2009 | Danieli | |
| 7,572,186 B2 | 8/2009 | LeMay et al. | |
| 7,581,195 B2 | 8/2009 | Sciammarella et al. | |
| 7,901,289 B2 | 3/2011 | Schlottmann et al. | |
| 7,909,696 B2 | 3/2011 | Beaulieu et al. | |
| 7,918,730 B2 | 4/2011 | Brosnan et al. | |
| 7,934,994 B2 | 5/2011 | LeMay et al. | |
| 8,002,623 B2 | 8/2011 | Resnick et al. | |
| 8,012,019 B2 | 9/2011 | Escalera et al. | |
| 2001/0054794 A1* | 12/2001 | Cole et al. | 273/138.1 |
| 2002/0013170 A1 | 1/2002 | Miller et al. | 463/19 |
| 2002/0016201 A1* | 2/2002 | Bennett et al. | 463/25 |
| 2002/0019253 A1* | 2/2002 | Reitzen et al. | 463/16 |
| 2002/0105515 A1* | 8/2002 | Mochizuki | 345/419 |
| 2002/0111208 A1* | 8/2002 | Marta | 463/20 |
| 2002/0111212 A1* | 8/2002 | Muir | 463/32 |
| 2002/0113369 A1* | 8/2002 | Weingardt | 273/269 |
| 2002/0113820 A1* | 8/2002 | Robinson et al. | 345/764 |
| 2002/0132661 A1* | 9/2002 | Lind et al. | 463/16 |
| 2002/0175466 A1* | 11/2002 | Loose et al. | 273/143 R |
| 2003/0013517 A1* | 1/2003 | Bennett et al. | 463/25 |
| 2003/0032479 A1* | 2/2003 | LeMay et al. | 463/32 |
| 2003/0045345 A1* | 3/2003 | Berman | 463/20 |
| 2003/0064781 A1* | 4/2003 | Muir | 463/20 |
| 2003/0064801 A1* | 4/2003 | Breckner et al. | 463/30 |
| 2003/0119581 A1* | 6/2003 | Cannon et al. | 463/25 |
| 2003/0125101 A1* | 7/2003 | Campo | 463/19 |
| 2004/0002380 A1* | 1/2004 | Brosnan et al. | 463/32 |
| 2004/0029636 A1* | 2/2004 | Wells | 463/32 |
| 2004/0048657 A1* | 3/2004 | Gauselmann | 463/25 |
| 2004/0077402 A1* | 4/2004 | Schlottmann | 463/20 |
| 2004/0077404 A1* | 4/2004 | Schlottmann et al. | 463/30 |
| 2004/0092302 A1* | 5/2004 | Gauselmann | 463/20 |
| 2004/0102245 A1* | 5/2004 | Escalera et al. | 463/32 |
| 2004/0198485 A1* | 10/2004 | Loose et al. | 463/20 |
| 2004/0266515 A1* | 12/2004 | Gauselmann | 463/20 |
| 2005/0001845 A1* | 1/2005 | Noyle | 345/522 |
| 2005/0075167 A1* | 4/2005 | Beaulieu et al. | 463/32 |
| 2005/0225559 A1* | 10/2005 | Robertson et al. | 345/581 |
| 2005/0233798 A1* | 10/2005 | Van Asdale | 463/19 |
| 2005/0233799 A1* | 10/2005 | LeMay et al. | 463/20 |
| 2006/0025199 A1* | 2/2006 | Harkins et al. | 463/19 |
| 2006/0229122 A1* | 10/2006 | Macke | 463/16 |
| 2006/0287058 A1* | 12/2006 | Resnick et al. | 463/19 |
| 2007/0155471 A1* | 7/2007 | Powell et al. | 463/19 |
| 2007/0155472 A1* | 7/2007 | Gail et al. | 463/19 |
| 2007/0155473 A1* | 7/2007 | Powell et al. | 463/19 |
| 2007/0161423 A1* | 7/2007 | Bienvenue et al. | 463/19 |
| 2008/0045331 A1* | 2/2008 | LeMay et al. | 463/25 |
| 2008/0076546 A1* | 3/2008 | Moyle et al. | 463/29 |
| 2008/0188303 A1* | 8/2008 | Schlottmann et al. | 463/32 |
| 2008/0188304 A1* | 8/2008 | Escalera et al. | 463/32 |
| 2008/0303746 A1* | 12/2008 | Schlottmann et al. | 345/1.2 |
| 2009/0062001 A1* | 3/2009 | LeMay et al. | 463/32 |
| 2011/0165929 A1* | 7/2011 | Brosnan et al. | 463/16 |
| 2011/0165930 A1* | 7/2011 | Brosnan et al. | 463/16 |
| 2011/0165931 A1* | 7/2011 | Brosnan et al. | 463/16 |

FOREIGN PATENT DOCUMENTS

| | | |
|---|---|---|
| AU | 200179477 | 8/2005 |
| AU | 200210214 | 12/2006 |
| AU | 2006203556 | 9/2009 |
| CA | 2343870 | 10/2001 |
| EP | 0 475 581 | 3/1992 |
| EP | 0 759 315 | 2/1997 |
| EP | 0 830 881 | 3/1998 |
| GB | 2 405 107 | 2/2005 |
| GB | 2 412 282 | 9/2005 |
| GB | 2 420 294 | 5/2006 |
| GB | 2 459 628 | 11/2009 |
| GR | 62140 | 2/1979 |
| JP | 07-044735 | 2/1995 |
| JP | 2001070634 | 3/2001 |
| JP | 2002099926 | 4/2002 |
| RU | 2067775 | 10/1996 |
| RU | 2168192 | 5/2001 |
| WO | WO 98/45004 | 10/1998 |
| WO | WO 02/32521 | 4/2002 |
| WO | WO 02/073501 | 9/2002 |
| WO | WO 2004/002591 | 1/2004 |
| WO | WO 2004/028650 | 4/2004 |
| WO | WO 2004/029893 | 4/2004 |
| WO | WO 2005/016473 | 2/2005 |
| WO | WO 2005/034054 | 4/2005 |
| WO | WO 2006/039324 | 4/2006 |
| WO | WO 2008/005278 | 1/2008 |
| WO | WO 2008/154433 | 12/2008 |

OTHER PUBLICATIONS

"A Primer form Mercury Research the Basics of 3D Graphics Technology" The Meter available at http://www.themeter.com/artilces/3DBasics.shtml printed on Jan. 31, 2003 pp. 1-2.

"Game Machine," Patent Abstracts of Japan, Publication No. 2001-252394, published Sep. 18, 2001.

"Learn How to Program 3D Graphics" LinuxFocus vol. NR 2, Jan. 1998 1-2 pages http://mercury.chem.pitt.edu/~tiho/LinuxFocus/English/January1998/index/html.

"Pattern Display Device," Patent Abstracts of Japan, Publication No. 2002-085624, published Mar. 26, 2002.

"PowerVR Technologies Debuts KYRO II SE Graphics Processor at CeBIT 2002", Tech/Zone, Mar. 13, 2002, available at http://www.techzone.pcvsconsole.com/news.php?tzd=1246, 3 pages.

"Slot Machine," Patent Abstracts of Japan, Publication No. 2001-062032, published Mar. 13, 2001.

"TE 5 Graphics Accelerator Technology Preview" NEC Aug. 2001, 7 pages.

"The Basics of 3D: Adding Parallelism", The Meter, available at http://www.themeter.com/articles/3DBasics-4.shtml, printed on Jan. 31, 2003 pp. 1-2.

"The Basics of 3D: Balancing the Pipeline", The Meter, available at http://www.themeter.com/articles/3DBasics-3.shtml, printed on Jan. 31, 2003 pp. 1-2.

"The Basics of 3D: Tackling the Pipeline", The Meter, available at http://www.themeter.com/articles/3DBasics-2.shtml, printed on Jan. 31, 2003 pp. 1-2.

"The Basics of 3D: The Next Generation", The Meter, available at http://www.themeter.com/articles/3DBasics-7.shtml, printed on Jan. 31, 2003 pp. 1-2.

"The Basics of 3D: Transform and Lighting", The Meter, available at http://www.themeter.com/articles/3DBasics-6.shtml, printed on Jan. 31, 2003 pp. 1-2.

"The Basics of 3D: What's Next", The Meter, available at http://www.themeter.com/articles/3DBasics-5.shtml, printed on Jan. 31, 2003 p. 1.

Australian Examiner's first report dated Feb. 16, 2009 issued in AU 2003279092.

Australian Examiner's first report dated Feb. 6, 2009 issued in AU 2003279742.

Australian Examiner's first report dated Jun. 18, 2008 issued in AU 2003237479.

Australian Examiner's first report dated Jun. 26, 2008 issued in AU 2006203556.

Australian Examiner's first report dated Mar. 12, 2010 issued in AU 2005201148.

Australian Examiner's first report dated Nov. 21, 2005 issued in AU 27720/02.

Australian Examiner's Report No. 2 dated Aug. 10, 2010 issued in AU 2005201148.

Bienvenue et al., U.S. Appl. No. 11/312,966, "Bingo System with Downloadable Common Patterns", filed Dec. 19, 2005.

British Examination Report dated Dec. 9, 2009 issued in GB 0505328.5.

British Examination Report dated Jun. 9, 2005 issued in UK 0427512.9.

British Examination Report dated May 14, 2009 issued in GB 0505328.5.

British Examination Report dated Nov. 7, 2006 issued in GB 0427512.9.
Carson G. S.: "Standards Pipeline the OpenGL Specification" Computer Graphics, ACM, US, vol. 31, No. 2, May 1997, pp. 17-18, XP000939297, ISSN: 097-8930.
David Einstein, 3D Web Browsing on the Horizon, Nov. 27, 2000, http://www.forbes.com/2001/11/27/1127threed.html., Forbes.com.
England and Wales High Court (Patent Court) Decisions; Neutral Citation Number: [2005] EWHC 2416 (Pat) Case No. CH/2005/APP/0232 http://www.bailii.org/we/cases/EWHC/Patents/2005/2416.html (5 pgs.).
EP Examination Report dated Jun. 3, 2009 issued in EP 07 809 991.8-2221.
EP Result of Consultation dated Sep. 1, 2009 issued in EP 07 809 991.8-2221.
European Examination Report dated Dec. 15, 2005 issued in EP 03 773 084.3-2218.
European Office Action dated Jun. 29, 2007 from related EP Application No. 03773084.3 3 pages.
European Office Action dated Nov. 24, 2005 from a corresponding EP Application No. 03770604.1 (4 pages).
Gail et al., U.S. Appl. No. 11/402,726, "Using Multiple Bingo Cards to Represent Multiple Slot Paylines and Other Class III Game Options", filed Apr. 11, 2006.
GameSpot Staff. "15 Most Influential Games of All Time" Gamespot [online], [retrieved May 30, 2007]. Retrieved from the Internet.
GB Examination Report dated Nov. 28, 2011 issued in GB0915991.4.
International Search Report and Written Opinion dated Feb. 12, 2008 from related PCT Application No. PCT/US2007/015015 15 pages.
International Search Report dated Jun. 23, 2005 from related UK Application No. 0505328.5.
M2 Presswire, Aristocrat Technologies to use PowerVR technology in casino video machines; Australian company leads market for video machine games of chance, Oct. 17, 2000, http://www.aristocrat.com.au/PR181000.htm, Copyright 2000 M2 Communications, Ltd. All Rights Reserved.
Mason Woo, Jackie Neider, Tom Davis, Dave Shreiner, OpenGL Program Guide: The Official Guide to Learning OpenGL, Introduction to OpenGL Chapter 1, Version 1.2, 3rd edition, OpenGL Architecture Review Board, Addison-Wesley Publishing, Co., 1999, ISBN: 0201604582.
Microsoft Press. Computer Dictionary Third Edition. Redmond, WA, 1997 p. 406.
Miguel Angel Sepulveda, "Open GL Programming: The 3D Scene" pp. 1-7 http://mercury.chem.pitt.edu/~tiho/LinuxFocus/English/May1998/article46.html.
Miguel Angel Sepulveda, "What is OpenGL?" LinuxFocus vol. 2 pp. 1-5 http://mercury.chem.pitt.edu/~tiho/LinuxFocus/English/January1998/article15.html printed on Oct. 11, 2002.
Mogilev, D. et al., (Apr. 2002) AR Pad: An Interface for Face-to-Face AR Collaboration, CHI 2002: changing the world, changing ourselves, Interactive Poster: Tools for Collaboration, pp. 654-655.
Notice of Allowance dated Sep. 24, 2007 from related U.S. Appl. No. 10/676,719 and Allowed Claims.
Patents Act 1977: Examining for Patentability Article http://www.patent.gov.uk/patent/notices/practice/examforpat.htm (3 pgs.).
PCT International Preliminary Report on Patentability and Written Opinion dated Dec. 7, 2009 issued in PCT/US2008/066196.
PCT International Preliminary Report on Patentability and Written Opinion dated Jan. 6, 2009 issued in PCT/US2007/015015.
PCT International Search Report and Written Opinion dated Oct. 24, 2008 issued in PCT/US2008/066196.
PCT International Search Report dated Jan. 13, 2004 issued in PCT/U52003/018028.
PCT International Search Report dated Mar. 1, 2004 issued in PCT/US2003/031138.
PCT International Search Report dated Mar. 19, 2004 issued in PCT/US2003/031158.
Phillip Ross, "Hardware Review: 3Dfx Graphics Card" LinuxFocus vol. 2, pp. 1-7 http://mercury.chem.pitt.edu/~tiho/LinuxFocus/English/January1998/artilce18.ht printed on Oct. 11, 2002.
Powell et al., U.S. Appl. No. 11/312,948, "Bingo Gaming Machine Capable of Selecting Different Bingo Pools", filed Dec. 19, 2005.
Powell et al., U.S. Appl. No. 11/442,029, "Bingo System with Discrete Payout Categories", filed May 26, 2006.
PowerVR (PowerVR), 3D Graphical Processing, Nov. 14, 2000, © Power VR 2000.
Rose, "Nevada A.G. Finds Free Internet Gambling is Still Gambling", Mar. 2001, printed from http://rose.casinocitytimes.com/articles/974.html, pp. 1-4.
Russian Office Action dated Jul. 19, 2007 from related Russian Application No. 2005109160 9 pages.
Russian Office Action dated Jul. 19, 2007 from related Russian Application No. 2005109161 7 pages.
Scott et al. "An Overview of the Visualize fx Graphics Accelerator Hardware" Article 4 Hewlet Packard Company May 1998 HP Journal.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (29 pages).
Supplemental Information Disclosure Statement dated Jan. 28, 2004 from related U.S. Appl. No. 10/272,788 4 pages.
Third Party Submission for U.S. Appl. No. 13/047,721 dated Sep. 7, 2011.
U.S. Final Office Action dated Dec. 22, 2003 issued in U.S. Appl. No. 09/927,901.
U.S. Final Office Action dated Jan. 28, 2011 issued in U.S. Appl. No. 11/759,825.
U.S. Final Office Action dated Jan. 30, 2007 issued in U.S. Appl. No. 10/187,343.
U.S. Final Office Action dated Jun. 9, 2009 issued in U.S. Appl. No. 12/024,931.
U.S. Final Office Action dated May 10, 2010 issued in U.S. Appl. No. 10/187,343.
U.S. Final Office Action dated Nov. 23, 2011 issued in U.S. Appl. No. 11/759,825.
U.S. Final Office Action dated Oct. 1, 2009 issued in U.S. Appl. No. 10/803,233.
U.S. Notice of Allowance and Examiners Communication dated Nov. 3, 2010 issued in U.S. Appl. No. 10/803,233.
U.S. Notice of Allowance dated Aug. 16, 2010 issued in U.S. Appl. No. 12/264,877.
U.S. Notice of Allowance dated Aug. 6, 2010 issued in U.S. Appl. No. 10/187,343.
U.S. Notice of Allowance dated Dec. 16, 2004 issued in U.S. Appl. No. 09/927,901.
U.S. Notice of Allowance dated Dec. 21, 2007 issued in U.S. Appl. No. 10/676,719.
U.S. Notice of Allowance dated Jan. 27, 2010 issued in U.S. Appl. No. 10/803,233.
U.S. Notice of Allowance dated Jul. 12, 2010 issued in U.S. Appl. No. 10/803,233.
U.S. Notice of Allowance dated Jun. 13, 2011 issued in U.S. Appl. No. 11/481,666.
U.S. Notice of Allowance dated Jun. 24, 2011 issued in U.S. Appl. No. 12/101,921.
U.S. Notice of Allowance dated Mar. 11, 2010 issued in U.S. Appl. No. 10/803,233.
U.S. Notice of Allowance dated Nov. 1, 2010 issued in U.S. Appl. No. 12/264,877.
U.S. Notice of Allowance dated Nov. 15, 2010 issued in U.S. Appl. No. 12/024,931.
U.S. Notice of Allowance dated Nov. 30, 2010 issued in U.S. Appl. No. 10/187,343.
U.S. Notice of Allowance dated Sep. 15, 2008 issued in U.S. Appl. No. 11/112,076.
U.S. Notice of Allowance dated Sep. 20, 2010 issued in U.S. Appl. No. 12/024,931.
U.S. Notice of Non-Compliant Amendment (37 CFR 1.121) dated Aug. 11, 2010 issued in U.S. Appl. No. 12/024,931.
U.S. Notice of Panel Decision from Pre-Appeal Brief Review dated Mar. 20, 2012 issued in U.S. Appl. No. 11/759,825.

U.S. Office Action (Ex Parte Quayle) dated Feb. 9, 2011 issued in U.S. Appl. No. 11/481,666.
U.S. Office Action (IDS considered) dated Feb. 10, 2011 issued in U.S. Appl. No. 10/803,233.
U.S. Office Action (IDS considered) dated Feb. 14, 2011 issued in U.S. Appl. No. 10/187,343.
U.S. Office Action (Notice of Panel Decision on Pre-Appeal Brief Review) dated Apr. 6, 2011 issued in U.S. Appl. No. 11/759,825.
U.S. Office Action (Notice of Panel Decision on Pre-Appeal Brief Review) dated Aug. 2, 2007 issued in U.S. Appl. No. 10/272,788.
U.S. Office Action dated Aug. 18, 2010 issued in U.S. Appl. No. 11/481,666.
U.S. Office Action dated Aug. 21, 2008 issued in U.S. Appl. No. 10/187,343.
U.S. Office Action dated Aug. 25, 2010 issued in U.S. Appl. No. 11/759,825.
U.S. Office Action dated Dec. 10, 2007 from related U.S. Appl. No. 11/112,076 14 pages.
U.S. Office Action dated Dec. 12, 2007 from related U.S. Appl. No. 11/829,807 15 pages.
U.S. Office Action dated Dec. 22, 2008 issued in U.S. Appl. No. 12/101,921.
U.S. Office Action dated Dec. 31, 2009 issued in U.S. Appl. No. 12/024,931.
U.S. Office Action dated Feb. 12, 2007 from related U.S. Appl. No. 10/676,719.
U.S. Office Action dated Feb. 15, 2011 issued in U.S. Appl. No. 12/101,921.
U.S. Office Action dated Feb. 8, 2005 issued in U.S. Appl. No. 10/272,788.
U.S. Office Action dated Jan. 23, 2009 issued in U.S. Appl. No. 10/803,233.
U.S. Office Action dated Jun. 13, 2003 issued in U.S. Appl. No. 09/927,901.
U.S. Office Action dated Jun. 16, 2011 issued in U.S. Appl. No. 11/759,825.
U.S. Office Action dated Jun. 17, 2005 issued in U.S. Appl. No. 10/187,343.
U.S. Office Action dated Jun. 21, 2004 issued in U.S. Appl. No. 09/927,901.
U.S. Office Action dated Jun. 24, 2008 from related U.S. Appl. No. 10/803,233 15 pages.
U.S. Office Action dated Jun. 27, 2007 issued in U.S. Appl. No. 10/187,343.
U.S. Office Action dated Mar. 15, 2010 issued in U.S. Appl. No. 12/264,877.
U.S. Office Action dated May 15, 2009 issued in U.S. Appl. No. 10/187,343.
U.S. Office Action dated May 18, 2010 issued in U.S. Appl. No. 12/101,921.
U.S. Office Action dated Nov. 5, 2008 issued in U.S. Appl. No. 12/024,931.
U.S. Office Action dated Sep. 6, 2007 from related U.S. Appl. No. 10/803,233.
U.S. Office Action Final dated Oct. 29, 2010 issued in U.S. Appl. No. 12/101,921.
U.S. Office dated Feb. 22, 2007 from related U.S. Appl. No. 10/272,788, 9 pages.
U.S. Office dated Feb. 8, 2005 from related U.S. Appl. No. 10/272,788, 11 pages.
U.S. Office dated Jun. 1, 2006 from related U.S. Appl. No. 10/272,788, 10 pages.
U.S. Office dated May 25, 2005 from related U.S. Appl. No. 10/272,788, 14 pages.
U.S. Office dated Oct. 26, 2006 from related U.S. Appl. No. 10/272,788, 8 pages.
UK Combined Search and Examination Report under Sections 17 and 18(3) dated Mar. 15, 2006 issued in GB0600005.3.
US Notice of Allowance dated Sep. 8, 2008 issued in U.S. Appl. No. 11/829,807.

* cited by examiner ed by the player. For example, a
3-D REELS AND 3-D WHEELS IN A GAMING MACHINE

PRIORITY CLAIM

This application is a continuation of and claims priority to U.S. patent application Ser. No. 10/674,884 by Kryuchkov, et al. filed on Sep. 29, 2003, which issued as U.S. Pat. No. 8,267,767 on Sep. 18, 2012, which is a continuation-in-part and claims priority from U.S. patent application Ser. No. 09/927,901, by Lemay, et al., filed on Aug. 9, 2001, which issued as U.S. Pat. No. 6,887,157 on May 3, 2005, titled "VIRTUAL CAMERAS AND 3-D GAMING ENVIRONMENTS IN A GAMING MACHINE," which is incorporated herein by reference and for all purposes and the present application claims priority under 35 U.S.C. §119(e) from U.S. Provisional Patent Application No. 60/415,114, by Kryuchkov, et al., "3-D REELS AND 3-D WHEELS IN A GAMING MACHINE," filed Sep. 30, 2002 which is incorporated by herein reference and for all purposes.

BACKGROUND OF THE INVENTION

This invention relates to game presentation methods for gaming machines such as slot machines and video poker machines. More particularly, the present invention relates to apparatus and methods of for displaying game presentations derived from a 3-D gaming environment.

As technology in the gaming industry progresses, the traditional mechanically driven reel slot machines are being replaced with electronic counterparts having CRT, LCD video displays or the like. These video/electronic gaming advancements enable the operation of more complex games, which would not otherwise be possible on mechanical-driven gaming machines. Gaming machines such as video slot machines and video poker machines are becoming increasingly popular. Part of the reason for their increased popularity is the nearly endless variety of games that can be implemented on gaming machines utilizing advanced electronic technology.

There are a wide variety of associated devices that can be connected to video gaming machines such as video slot machines and video poker machines. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box, which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

One method for maintaining a player's interest is to present multiple games at the same time during a game presentation. For instance, triple play poker in which a player plays three hands of poker during each game presentation has become very popular game implemented on a video gaming machine. Variants of triple play poker include game presentations where a hundred or more poker hands are played during each game presentation. The presentation of multiple games during a single game presentation may be extended to other types of games, such as video slot games.

One difficulty associated with presenting multiple games in a video game presentation is the screen resolution of the display on a gaming machine. A typical display resolution on a gaming machine is about 640 pixels by 480 pixels. As the number of games presented in a game presentation increases, the amount of detail may be limited by the screen resolution. For instance, for a hundred-hand poker game where a hundred poker hands are displayed during each game presentation, each card must be drawn fairly small without much detail to accommodate all of the cards on a single display screen. The lack of detail and small card size may discourage some game players from playing such games.

Another method for maintaining a player's interest in playing a game on a gaming machine is to present an exciting game presentation that is shown on a display screen on the gaming machine. Many newer game systems use graphical generation schemes employing mass storage devices that utilize varied load times and streamable media formats to generate an exciting game presentation. With these game systems, many game scenes are generated during the game play using complex renderings and video playback capabilities. Typically, however, for efficiency reasons, a player has little control over the game outcome presentation other than through game decisions they make during the play of the game.

In view of the above, it would be desirable to provide method and apparatus that allow detailed game presentations accommodating the simultaneous play of multiple games to be presented on a video gaming machine where the game presentation may also be controlled by a game player.

SUMMARY OF THE INVENTION

This invention addresses the needs indicated above by providing method and apparatus on a gaming machine for presenting a plurality of game outcome presentations derived from one or more virtual 3-D gaming environments stored on the gaming machine. While a game of chance is being played on the gaming machine, two-dimensional images derived from a 3-D object in the 3-D gaming environment may be rendered to a display screen on the gaming machine in real-time as part of a game outcome presentation. Apparatus and methods are described for generating and displaying a sequence of symbols from a virtual reel strip in the 3-D gaming environment. In particular, the sequence of symbols may be mapped one or more to flat reels, rounded reels or sequences of moving objects in the 3-D gaming environment. The flat reels, round reels or sequences of moving objects may be moved in the 3-D gaming environment through a motion that allows the sequence of symbols from the virtual reel strip to displayed as part of game outcome presentation for a game of chance played on the gaming machine.

One aspect of the present invention provides a method of generating a game of chance in a gaming machine including a master gaming controller, a display device and a memory device. The method may be generally characterized as comprising: 1) receiving a wager for the game of chance controlled by the master gaming controller on the gaming machine where the gaming machine is capable of receiving indicia of credit for the wager from an input device coupled to the gaming machine and outputting indicia of credit from an output device coupled to the gaming machine; 2) determining a game outcome for the game of chance by randomly selecting, one or more times, an index from a sequence of indices, 3) rendering one or more two-dimensional (2-D) images derived from the one more 3-D objects and the three-dimensional gaming environment as a game outcome presentation for the game of chance wherein information used to generate the one or more 3-D objects and the 3-D gaming environment is stored in the memory device on the gaming machine; and 4) displaying the one or more rendered 2-D images to the display device on the gaming machine where the 2-D images display the portion of the indices. For each index selected, a portion of the indices from the sequence of indices may be drawn on one or more three-dimensional (3-D) objects in a 3-D gaming environment where the portion of indices includes the randomly selected indices.

In a particular embodiment, a combination of three indices may be generated as the game outcome by randomly selecting i) a first index from a first sequence of indices, ii) a second index from a second sequence of indices and iii) a third index from a third sequence of indices. The first, second and third sequence of indices may be the same sequence of indices. In addition, a combination of 5 indices may be generated as the game outcome by randomly selecting i) a first index from a first sequence of indices, ii) a second index from a second sequence of indices, iii) a third index from a third sequence of indices, iv) a fourth index from a fourth sequence of indices and v) a fifth index from a fifth sequence of indices. The first, second, third, fourth and fifth sequence of indices are the same sequence of indices.

In another embodiment, the game of chance may be a video slot game and the sequence of indices may be a virtual reel strip. The sequence of indices may comprise two or more different types of indices. The different types of indices may correspond to different types of symbols. Therefore, the method may further comprise mapping a set of symbols to each type of index and drawing the symbols on one or more the 3-D objects in the 3-D gaming environment. In particular, the method may further comprise for a first game of chance, mapping a first set of symbols to each type of index and drawing the symbols on the one or more 3-D objects in the 3-D gaming environment and for a second game of chance, mapping a second set of symbols to each type of index and drawing the symbols on the one or more 3-D objects in the 3-D gaming environment.

In other embodiments, the method may further comprise determining a motion of the one or more 3-D objects in the gaming environment and applying the determined motion to the one or more 3-D objects in the 3-D gaming environment. In one example, the motion of a first 3-D object of the one or more 3-D objects is linear in the 3-D gaming environment. In another example, the motion of a first 3-D object of the one or more 3-D objects is non-linear in the 3-D gaming environment. For instance, the motion of a first 3-D object of the one or more 3-D objects may be along a 3-D curve in the 3-D gaming environment.

In yet other embodiments, the method may further comprise applying motions to a plurality of 3-D objects in the 3-D gaming environment where 1) the motion for each object is linear, 2) the objects move in parallel paths and 3) indices are drawn on each of the plurality of 3-D objects. Further, a first 3-D object of the one or more 3-D objects may be a 2-D rectangle or a box in the 3-D gaming environment where the portion of the indices is drawn on one surface of the rectangle or the box. In addition, a first 3-D object of the one or more 3-D objects may be one of a portion of a cylinder or a curved 2-D surface where the portion of the indices is drawn on one surface of the cylinder portion or the curved 2-D surface.

In another embodiment, each index in the portion of the indices may be displayed sequentially over time in a plurality of rendered 2-D images that are displayed sequentially over time on the display screen. In particular, each of the plurality of rendered 2-D images may comprise a subset of a total number of indices in the portion of the indices. For instance, if the total number of indices in the portion of indices was nine and the number of rendered 2-D images were three, then the first three indices might be rendered on the first 2-D image, the second three indices might be rendered on the second 2-D image, and the last three indices might be rendered on the third 2-D image.

In a particular embodiment, the method may further comprise, generating the portion indices from the sequence of indices where the portion of indices comprises at least one of i) a number of indices in the sequence of indices prior to the randomly selected index, ii) a number of indices after the randomly selected index in the sequence of indices and iii) combinations thereof. In general, sequences of indices may be displayed repetitively such that when an end of the sequence of indices is reached a next index that is displayed is a first index in the sequence of indices. In one embodiment, a number of indices in the portion of indices may be constant for each game of chance that is generated. In another embodiment, a number of indices in the portion of indices may vary for each game of chance that is generated.

In further regards to the indices in the portion of indices, the portion of indices may comprise a first index from the sequence of indices; and the randomly selected index from the sequence of indices where the portion of indices that are drawn include all of the indices between the first index and the randomly selected index in the sequence of indices. The first index from the sequences of indices may be determined from a previous game of chance generated on the game of chance. In another embodiment, the portion of indices may comprise a first index from the sequence of indices and the randomly selected index from the sequence of indices where the portion of indices that are drawn include a subset of the indices between the first index and the randomly selected index in the sequence of indices. Again, the first index from the sequence of indices may be determined from a previous game of chance generated on the game of chance.

In other embodiments, the method may further comprise receiving an input signal from a first input device on the gaming machine where the input signal provides information for altering the game outcome presentation for the game of chance. For example, the input signal may be for one of stopping or starting the motion of the one or more 3-D objects or the input signal may be for altering a motion of the one or more 3-D objects. The input signal may be generated from a touch screen.

In yet another embodiment, the method may further comprise applying motions to a plurality of 3-D objects in the 3-D gaming environment where the motion of each 3-D object begins at an object source in the 3-D gaming environment. A position of the object source in the 3-D gaming environment may change in time. Further, the motion of first 3-D object may originate at a first object source and the motion of a second 3-D object originates at a second object source at a different position from the first object source. In addition, the method may further comprise 1) applying motions to a plurality of 3-D objects in the 3-D gaming environments wherein two or more objects are capable of colliding and 2) detecting a collision between two or more 3-D objects in the 3-D gaming environment.

In other embodiments, the method may further comprise 1) determining the award of indicia of credit using the one or more randomly selected indices wherein the gaming machine is capable of the award of the indicia of credit via the output device, 2) rendering a bonus game presentation in the 3-D gaming environment and capturing the bonus game presentation on the one or more two-dimensional images and 3) receiving an input signal to initiate one or more games of chance.

Another aspect of the present invention provides a second method of generating a game of chance in a gaming machine including a master gaming controller, a display device and a memory device. The method may be generally characterized as comprising: 1) receiving a wager for the game of chance controlled by the master gaming controller on the gaming machine where the gaming machine is capable of receiving indicia of credit for the wager from an input device coupled to the gaming machine and outputting indicia of credit from an output device coupled to the gaming machine; 2) determining randomly a final state on each of a plurality of virtual reel strips; 3) rendering a plurality of two-dimensional (2-D) images comprising the surfaces drawn with the symbols from the virtual reel strips as a game outcome presentation for the game of chance where information used to generate the surfaces and the 3-D gaming environment is stored in the memory device on the gaming machine; and 4) displaying the one or more rendered 2-D images to the display device on the gaming machine where the 2-D images display the sequence of symbols from each of the virtual reel strips. In the method for each virtual reel strip, a sequence of symbols to display from the virtual reel strip may be determined where each of the sequence of symbols comprises at least one of i) a number of symbols prior to the final state on the virtual reel strip; ii) a number of symbols after the final state on the virtual reel strip; or iii) combinations thereof and the sequence of symbols may be drawn over time on a surface defined in a 3-D gaming environment.

In particular embodiments, the method may further comprise determining a motion for each of the surfaces in the 3-D gaming environment; and, while rendering the plurality of 2-D images, applying the determined motion for each of the surfaces in the 3-D gaming environment where the motion for each of the surfaces is captured in at least a portion of the plurality of the 2-D images. In addition, when the 2-D images are viewed in a sequence, the rendered symbols may appear to move along a linear path from a top of the display screen to the bottom of the display screen. The surface may be one of a planar rectangular surface or a curved portion of an outside of a cylinder. In addition, three virtual reel strips may be mapped to three different surfaces or five virtual reel strips may be mapped to five different surfaces. Further, a number of symbols displayed in each game outcome presentation can be a constant.

In another embodiment, the method may further comprise 1) generating at least one of a flat surface or a curved surface divided into a total number of segments of equal area at first position in the 3-D gaming environment; 2) drawing in each of the number of segments of the flat surface or the curved surface a first subset of the sequence of symbols; 3) moving the flat surface or the curved surface from the first position by a distance equal to a height of one of the surface segments along surface while rendering the plurality of 2-D images, and next, a) regenerating the flat surface or the curved surface at the first position in the 3-D gaming environment; b) redrawing in each of the number of segments of the flat surface or the curved surface a second subset of the sequence of symbols; c) moving the flat surface or the curved surface from the first position by the distance equal to the height of one of the surface segments while rendering the plurality of 2-D images; where the first subset and the second subset are defined so that when the plurality of 2-D images capturing the movement of the generated surfaces are viewed on the display screen, the symbols appear to enter and to leave the display screen in an order specified by the sequence of symbols for each virtual reel strip.

In the method of the paragraph above, a sequence in the first subset and a sequence in the second subset may overlap. Further, the rate of movement or the direction of movement of the surfaces may vary over time. In particular, the movement of the flat surface or the curved surface may be specified so that 1) a rate of movement of the symbols appears to increase and then decrease during the game outcome presentation when the plurality of 2-D images capturing the movement of the generated surfaces are viewed on the display screen, 2) the symbols on the display screen appear to oscillate above and below their final positions prior to stopping when the plurality of 2-D images capturing the movement of the generated surfaces are viewed on the display screen, 3) the symbols on the display screen, prior to moving in a first direction appear to move slightly from their initial position in a direction opposite of the first direction when the plurality of 2-D images capturing the movement of the generated surfaces are viewed on the display screen and 4) combinations thereof.

In other embodiments, the method may further comprise dividing each surface into a number of segments and drawing at least one symbol from the sequence of symbols in each segment where a type of symbol drawn in each segment varies with time. In addition, when the one or more 2-D images are displayed to the display screen, a portion of the number is segments may be viewable on the display screen at any one time and positions of a portion of the number of segments may be used to specify a payline. Further, areas occupied by a portion of the number of segments on the display screen may correspond to active areas of a touch screen sensor coupled to the display screen. Thus, the gaming machine may be capable of altering a movement of a first surface in the 3-D gaming environment when an input signal is generated from an active area on the touch screen sensor above the first surface in one of the 2-D images.

In yet other embodiments, the method may comprise receiving an input signal from a first input device on the gaming machine indicating a stop command has been received where the stop command is a request to stop a progression of symbols on one of the virtual reel strips viewed on the display screen and determining a new sequence of symbols to display from the virtual reel strip wherein the new sequence of symbols allows the final state of the virtual reel strip to be displayed sooner than when the stop command is not received. In addition, the method may further comprise: 1) determining the award of indicia of credit using the one or more randomly selected indices wherein the gaming machine is capable of the award of the indicia of credit via the output device, 2) rendering a bonus game presentation in the 3-D gaming environment and capturing the bonus game presentation on the one or more two-dimensional images and 3) receiving an input signal from a first input device coupled to the gaming machine to initiate one or more games of chance.

In yet other embodiments, the sequence of symbols to display from the virtual reel strip may be determined such that the sequence progresses through the virtual reel strip towards an end of the virtual reel strip. When the end of the virtual reel strip is reached in the sequence and more symbols are required for the sequence, a next symbol in the sequence may be selected from symbols near a beginning of the virtual reel strip and the sequence again progresses through the virtual reel strip towards the end of the virtual reel strip. Further, the method may comprise displaying the final state for a plurality of virtual reel strips in a first game of chance; storing the final state of each of the virtual reel strips; for a second game of chance following the first game of chance, determining the sequence of the symbols to display from the virtual reels strips where the final states from the plurality of virtual reel strips from the first game of chance are initial states of the sequence of symbols for the second game of chance.

Another aspect of the present invention provides a virtual reel model for a 3-D gaming environment on a gaming machine where the gaming machine is capable of receiving indicia of credit for a wager for a game of chance from an input device coupled to the gaming machine and outputting indicia of credit from an output device coupled to the gaming machine. The virtual reel model may be generally characterized as comprising: 1) a geometry definition of a reel model for the 3-D gaming environment; 2) a first input parameter for specifying a total number of segments on the reel model where a symbol is drawn on each segment of the reel model in the 3-D gaming environment; 3) a second input parameter for specifying an index of a home segment on the reel model where the index of the home segment is used to specify a starting location for a first payline that the gaming machine is capable of drawing in the 3-D gaming environment; and 4) a third input parameter for specifying a number of visible segments wherein the visible segments are the number of segments above the home segment that are visible on a display screen on the gaming machine when 2-D images are rendered from the 3-D gaming environment comprising the reel model. The rendered 2-D images may be used as part of a game outcome presentation or a bonus game outcome presentation for the game of chance viewed on the gaming machine.

In particular embodiment, the geometry definition of the reel model may be for one of a flat strip or a curved strip. In addition, the virtual reel model may further comprise: i) a fourth input parameter for specifying a number of touchable segments wherein the number of touchable segments specify active areas of a touch screen sensor coupled to the display screen that correspond to segment areas on 2-D images that are displayed to the display screen of the virtual reel model rendered from the virtual reel model generated in the 3-D gaming environment, ii) a fifth input parameter for specifying a number of different types of symbols that are drawn on each symbol or iii) a plurality of motion parameters for specifying a movement of the reel model over time in the 3-D gaming environment. The plurality of motion parameters may be used to define one or more of a) a cock-up movement of the reel model in the 3-D gaming environment, b) a cock-down movement of the reel model in the 3-D gaming environment, c) a bounce-down movement of the reel model in the 3-D gaming environment, d) a bounce-up movement of the reel model in the 3-D gaming environment, e) a stop position of the reel model in the 3-D gaming environment, and f) a velocity as a function of time of the reel model in the 3-D gaming environment and g) a path of the reel model in the 3-D gaming environment as a function of time.

Yet another aspect of the present invention provides a gaming machine. The gaming machine may be generally characterized as comprising: 1) a housing; 2) a master gaming controller designed or configured to control a game of chance played on the gaming machine and to execute game logic mounted within the housing; 3) an input device coupled to the housing capable of receiving indicia of credit for wagers on the game of chance; 4) an output device coupled to the housing capable of outputting indicia of credit from the gaming machine; 5) a memory device coupled to the housing for storing information used to generate a 3-D gaming environment comprising one or more virtual slot reels; 6) game logic executed on the gaming machine for rendering one or more two-dimensional images derived from the 3-D gaming environment; and 7) one or more display devices for displaying a game outcome presentation for the game of chance comprising said rendered one or more two-dimensional images. The game of chance may be a video slot game.

In particular embodiments, the gaming machine may further comprise game logic for 1) rendering one or more 2-D images derived from the 3-D gaming environment for a bonus game outcome presentation, 2) generating a sequence of symbols from the virtual reel strips as a function of time in the 3-D gaming environment and for rendering 2-D images from the 3-D gaming environment comprising the sequence of symbols and 3) generating a motion of the one or more virtual slot reels in the 3-D gaming environment. When a sequence of 2-D images capturing one or more the virtual slot reels at various positions in the 3-D gaming environment is viewed on the display screen, the virtual slot reels may appear to move on the display screen. In particular, the symbols on each virtual slot reel may appear to move along a straight line from the top of the display screen to the bottom of display screen.

In other embodiments, the gaming machine may comprise information for generating geometry of the one or more virtual slot reels in the 3-D gaming environment where the geometry is one of a flat strip or a curved strip. Further, the gaming machine may further comprise one or more virtual reel strips for mapping symbols to the one or more virtual reels and determining a game outcome for the game of chance. For instance, three virtual slot reels and their motions or five virtual slot reels and their motions may be modeled in the 3-D gaming environment.

In particular embodiments, the gaming machine may also comprise a graphical processing unit, separate from said master gaming controller, designed or configured to execute the graphical operations used to render one or more two-dimensional images derived from the 3-D gaming environment or an input mechanism designed or configured to receive an input signal used to change one of a position or a movement of the one or more virtual slot reels in the 3-D gaming environment. The input mechanism is selected from the group consisting of a keypad, a touch screen, a mouse, a joystick, a microphone and a track ball.

Another aspect of the invention pertains to computer program products including a machine-readable medium on which are stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1:
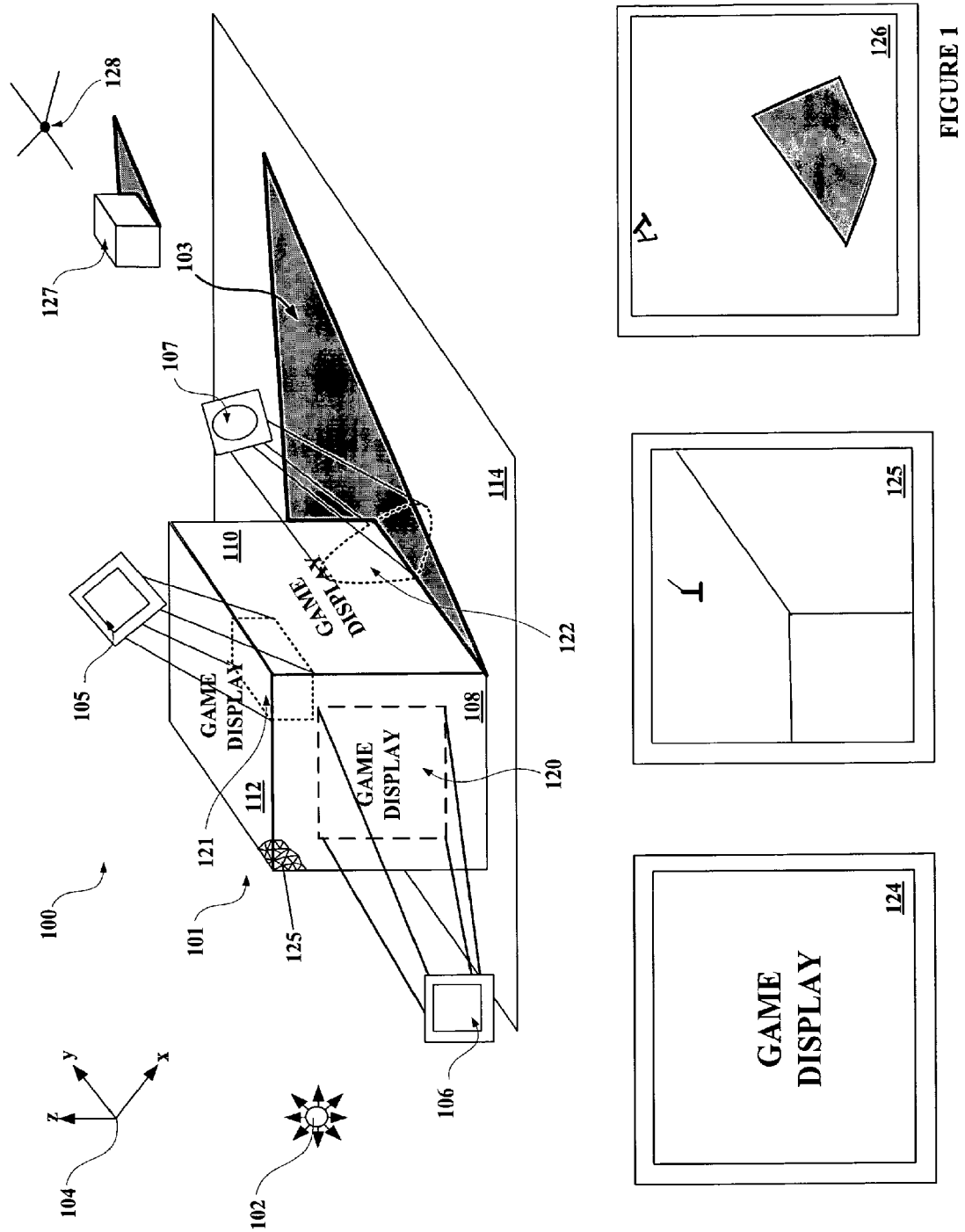
FIG. 1 is a perspective drawing of a 3-D virtual gaming environment implemented on a gaming machine for one embodiment of this invention.

FIG. 1 is a perspective drawing of a 3-D virtual gaming environment 100 implemented on a gaming machine for one embodiment of this invention. The 3-D virtual gaming environment may be used by the master gaming controller on the gaming machine to present a game of chance. The game of chance played on the gaming machine may include: 1) a wager selected by a player playing a game on the gaming machine, 2) an initiation of the game of chance on the gaming machine by the player, 3) a determination of an outcome for the game of chance by the gaming machine and 4) a presentation on the gaming machine of the game outcome to the player. In the present invention, the 3-D gaming environment may be used to present a game outcome to the player, describe operating functions of the gaming machine and provide an interface for obtaining gaming information and services. In particular, methods and apparatus of displaying a sequence of symbols, such as a sequence of symbols on a virtual reel strip, in a 3-D gaming environment are described. The sequence of symbols may be applied to different 3-D objects in the 3-D gaming environment, such as but not limited to flat reel segments or rounded reel segments, for generating a game outcome presentation for a game of chance or a bonus game. Apparatus and methods implementing these features are described with respect to FIGS. 1-10.

Figure 2:
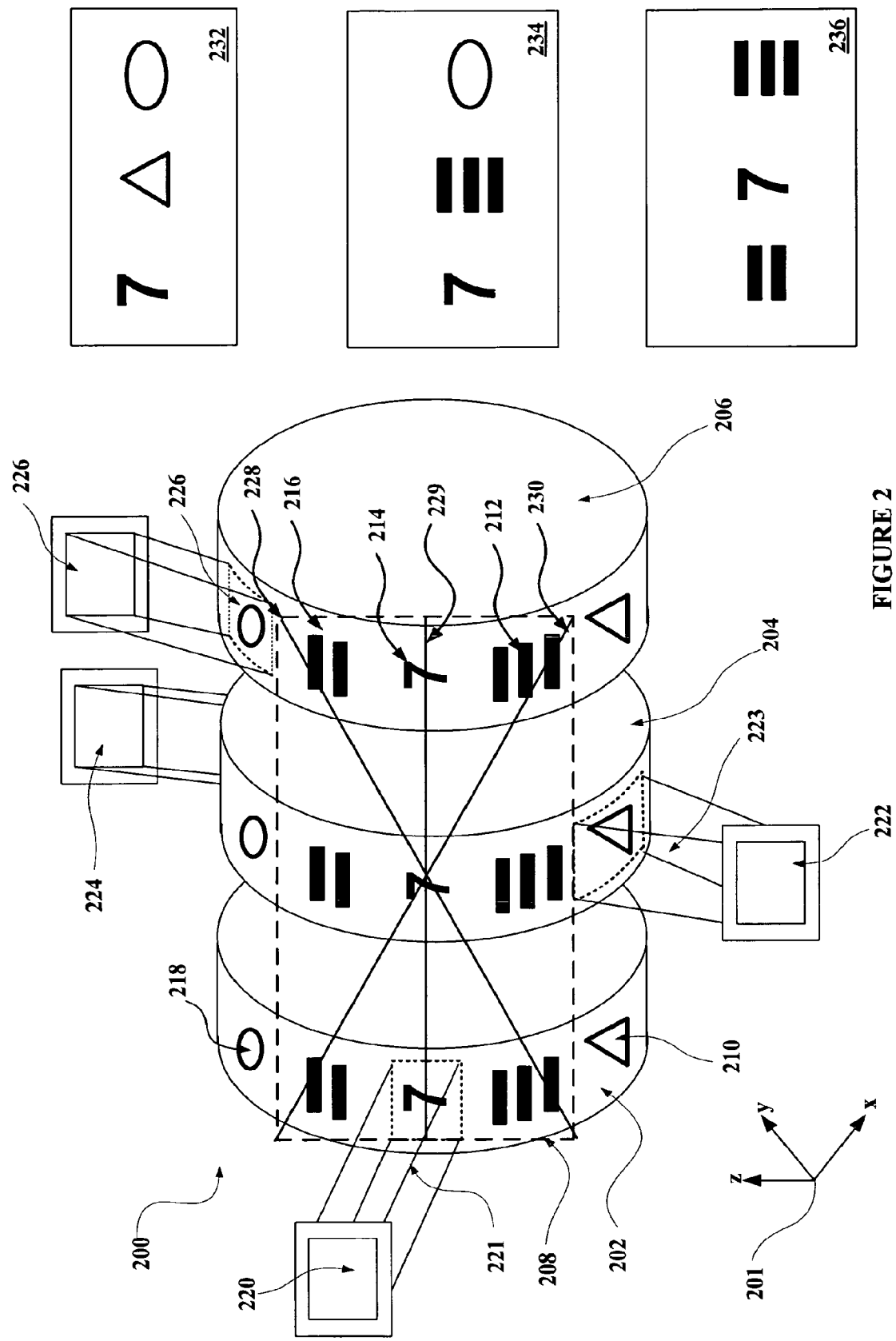
FIG. 2 is a perspective drawing of virtual slot reels in a 3-D virtual gaming environment implemented on a gaming machine for one embodiment of this invention.
Figure 5A:
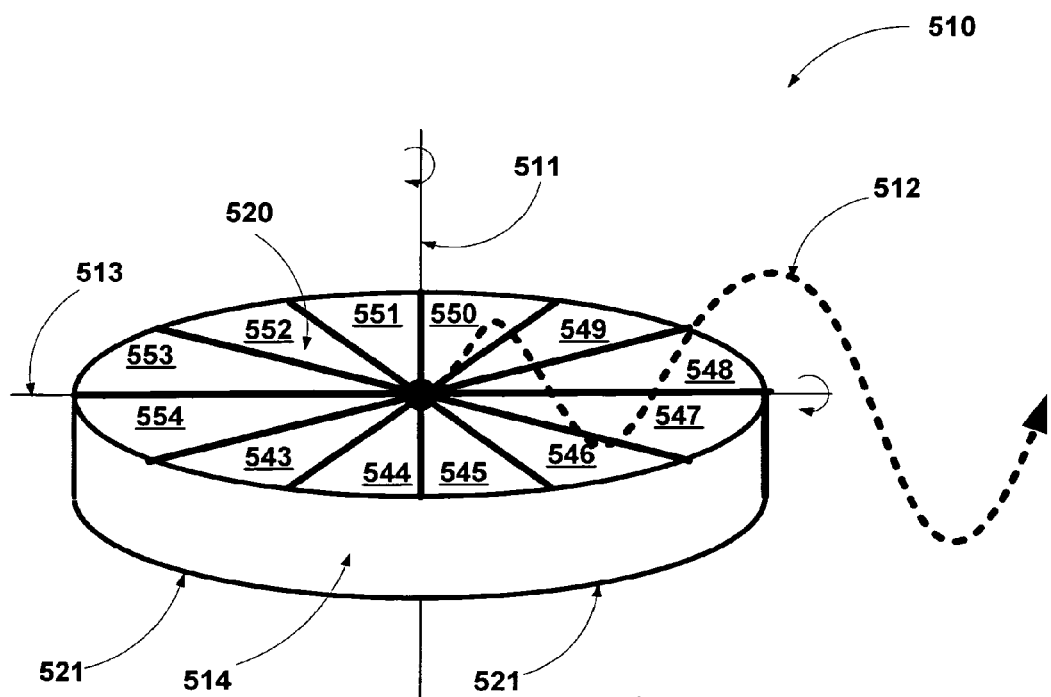
FIGS. 5A-5B are a perspective drawing of a 3-D wheel model and 3-D sphere used to display symbols on a virtual reel strip of the present invention.
Figure 5B:
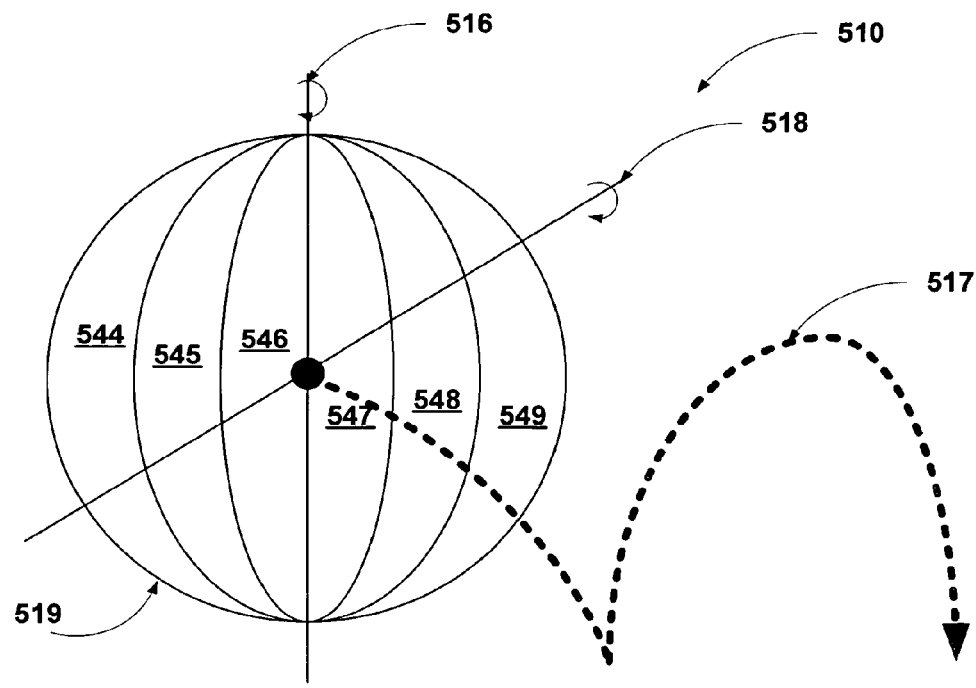
Figure 6A:
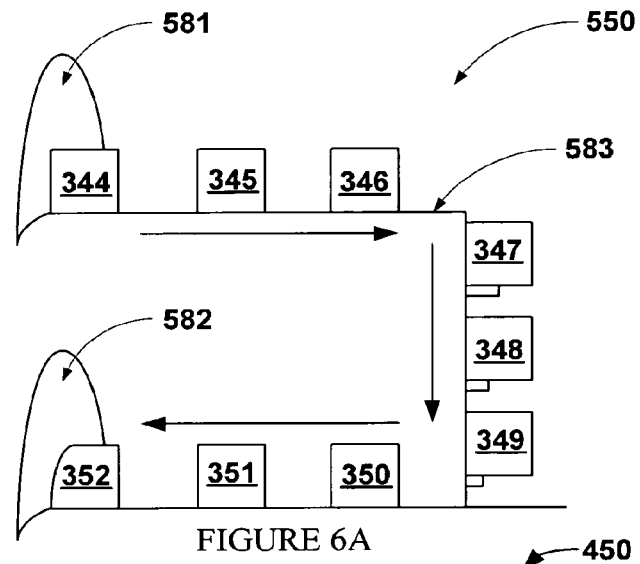
FIGS. 6A-6C are diagrams of 3-D virtual gaming environments used to display symbols on virtual reel strips.
Figure 6B:
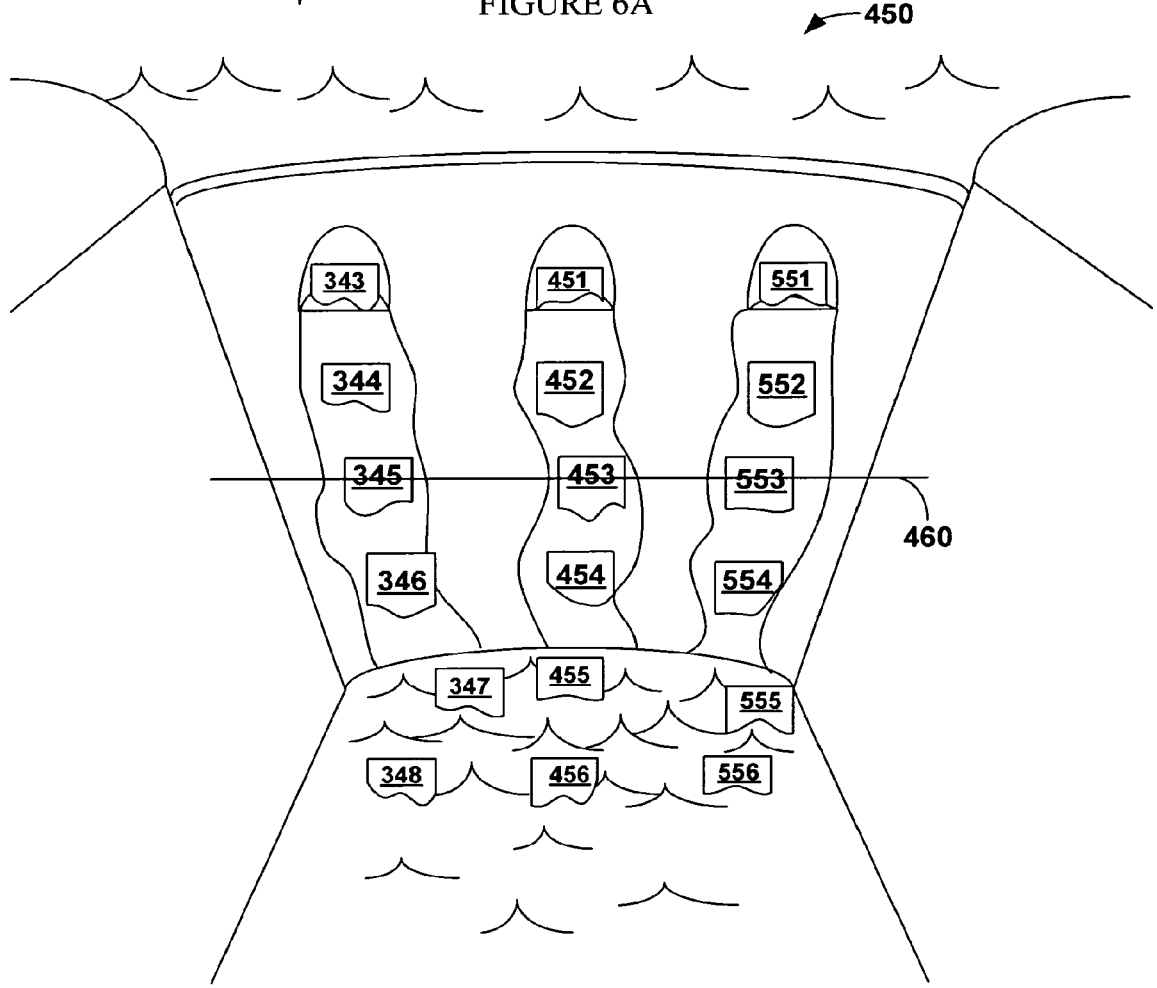
Figure 6C:
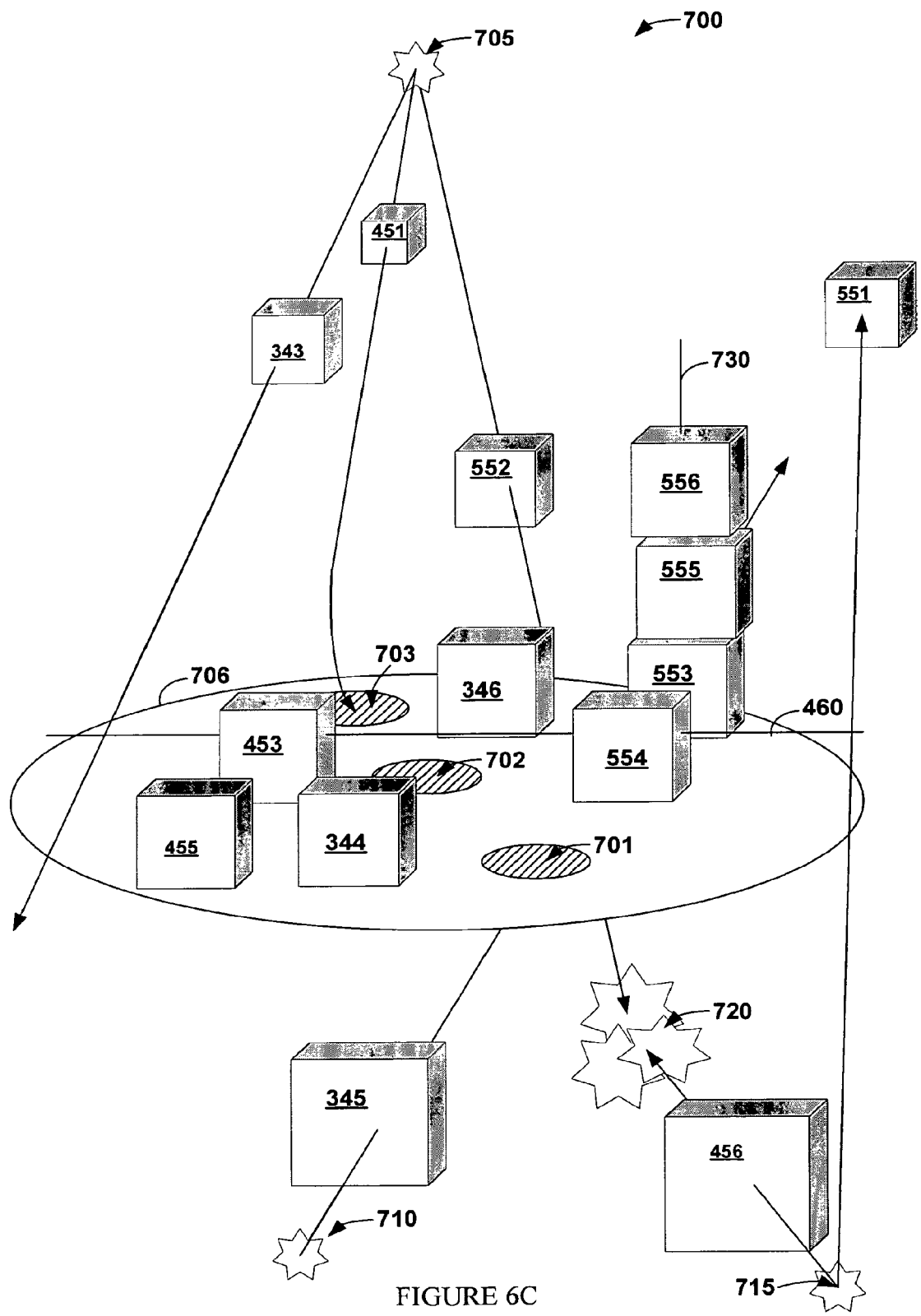
Figure 7:
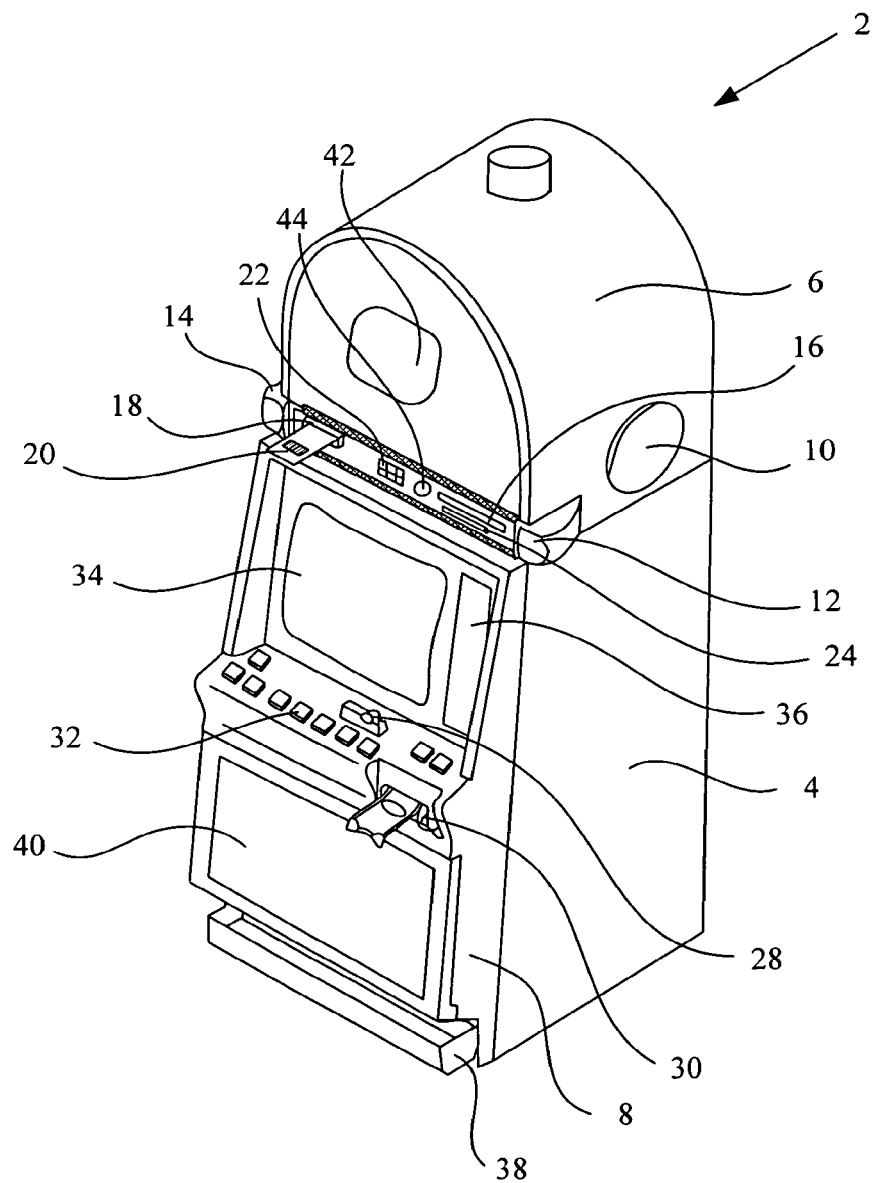
FIG. 7 is a perspective drawing of a gaming machine for one embodiment of the present invention.
Figure 8:
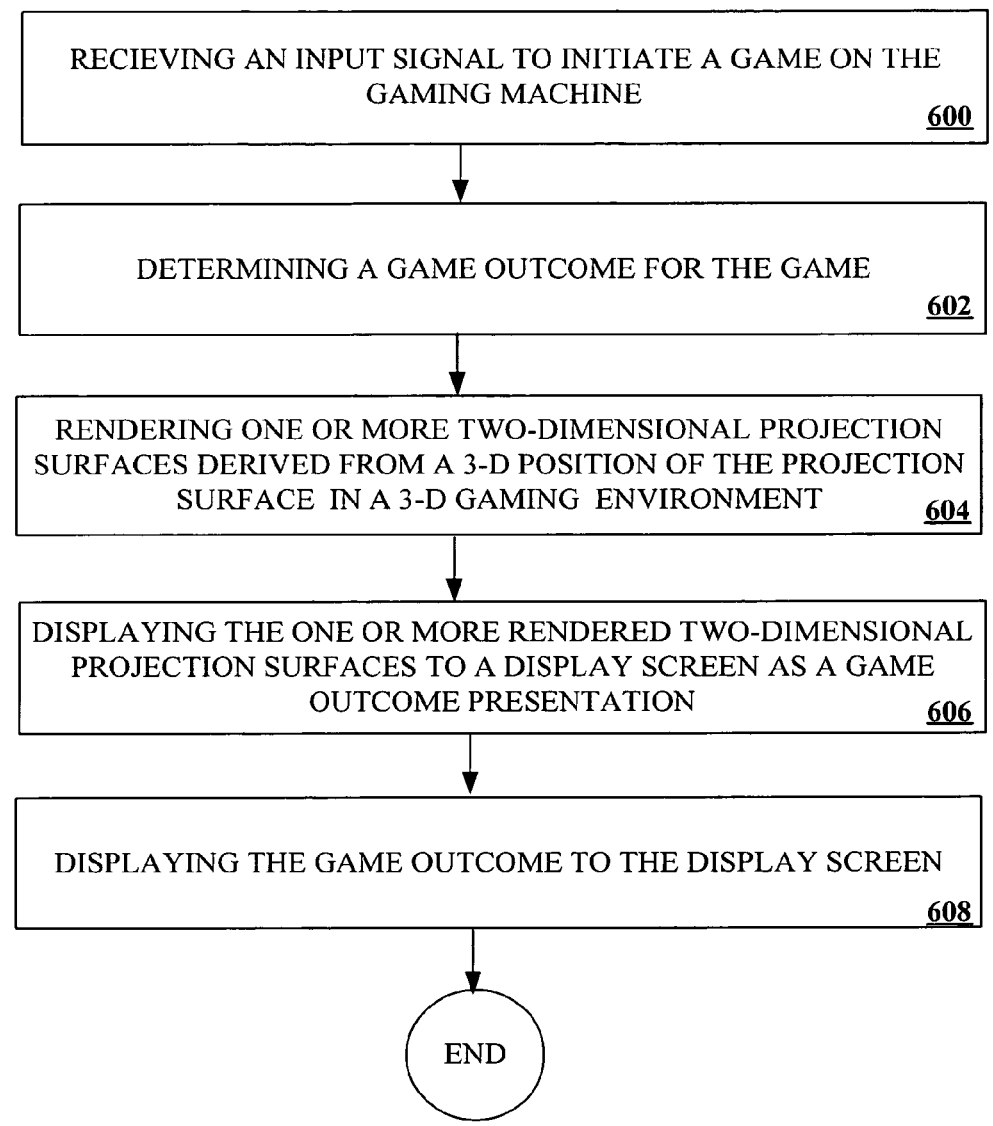
FIG. 8 is a flow chart depicting a method for generating a game of chance using a virtual gaming environment.
Figure 9:
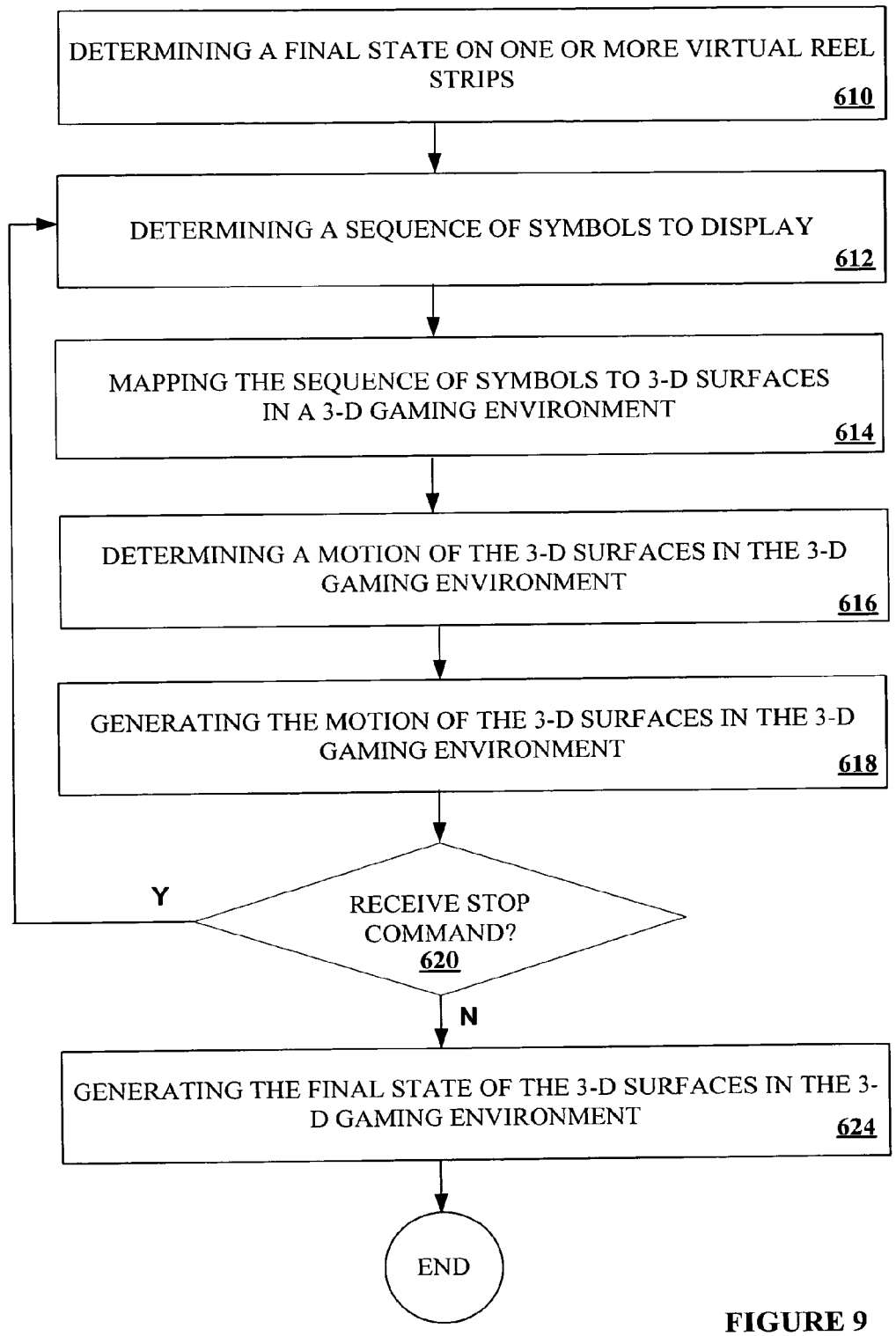
FIG. 9 is a flow chart depicting a method for generating a game presentation using a virtual reel strip in a 3-D virtual gaming environment.
Figure 10:
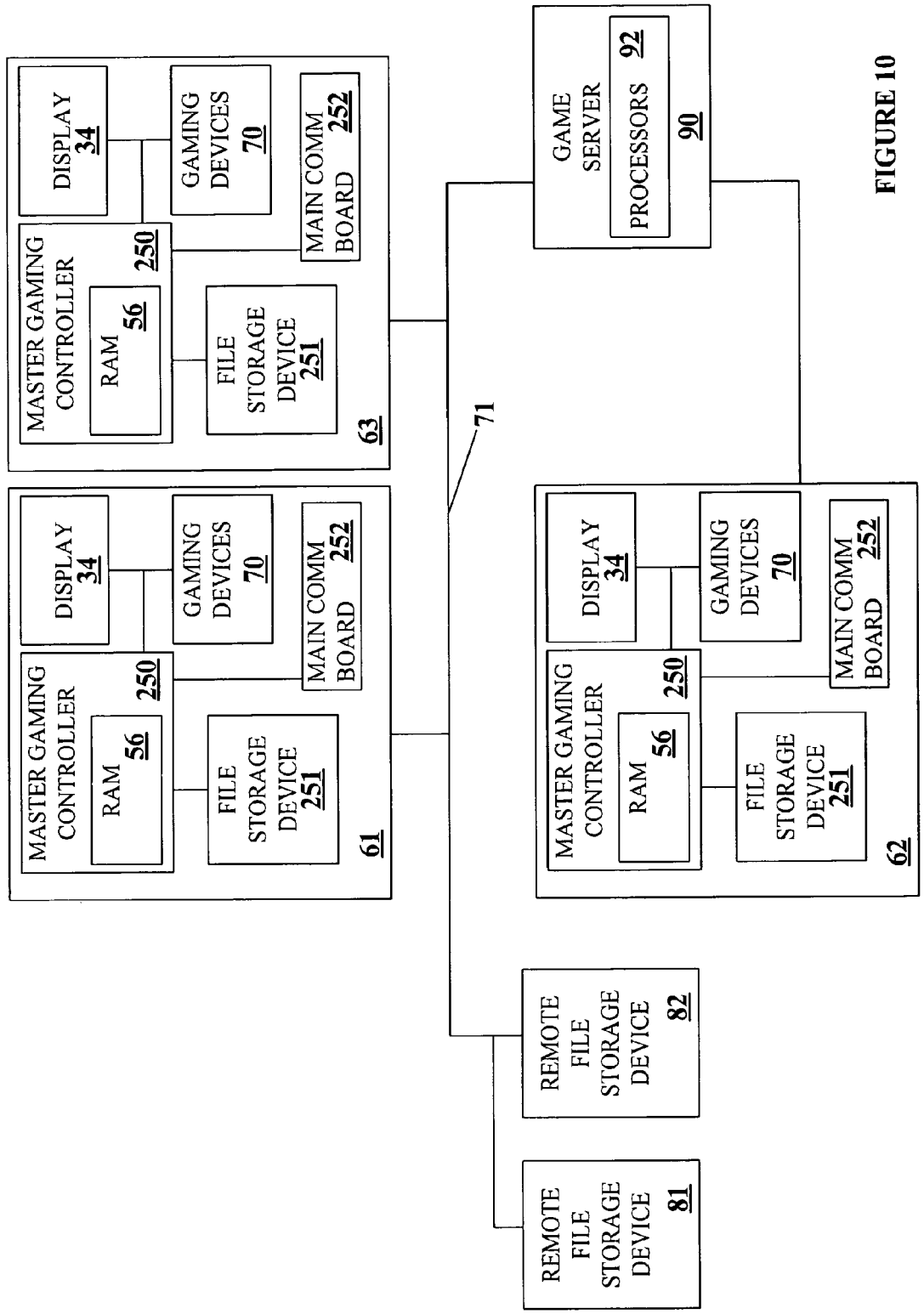
FIG. 10 is a block diagram of gaming machines that utilize distributed gaming software and distributed processors to generate a game of chance for one embodiment of the present invention.

In particular FIGS. 1-10 provide the following information. In FIG. 1, a 3-D gaming environment of the present invention is described. In FIG. 2, 3-D reels in the 3-D gaming environment are described. In FIG. 3A-3F, 4, flat and rounded reel segments used to display symbols in 3-D gaming environments of the present invention are discussed. In FIGS. 5A-5B, embodiments of 3-D wheels and 3-D spheres for displaying symbols that may be used in a generating a game outcome presentation for a game of chance or bonus game of chance are described. In FIGS. 6A-6B, other embodiments of 3-D gaming environments that may be used to display a sequence of symbols that may be used in a generating a game outcome presentation for a game of chance or bonus game of chance are described. In FIG. 7, one embodiment of a gaming machine of the present invention is described. In FIGS. 8 and 9, methods of generating a game of chance or bonus game using the 3-D gaming environments of the present invention are presented. In FIG. 10, a gaming network of the present invention is described.

Prior to describing FIG. 1, some general aspects of 3-D virtual gaming environments and their relationship to 2-D environments are discussed. To utilize a virtual 3-D gaming environment for a game presentation or other gaming activities on a gaming machine, a 2-D view of the virtual 3-D gaming environment is rendered. The 2-D view captures some portion of the 3-D surfaces modeled in the virtual 3-D gaming environment. The captured surfaces define a 3-D object in the 3-D gaming environment. The captured surfaces in 2-D view are defined in the 3-dimensional coordinates of the virtual 3-D gaming environment and converted to a 2-dimensional coordinate system during the capturing process. As part of a game presentation, the 2-D view may be presented as a video frame on a display screen on the gaming machine. In some ways, the two-dimensional view is analogous to a photograph of a physical 3-D environment taken by a camera where the photograph captures a portion of the physical 3-D surfaces existing in the physical 3-D environment. However, the photograph from a camera is not strictly analogous to a 2-D view rendered from a virtual 3-D gaming environment because many graphical manipulation techniques may be applied in a virtual 3-D gaming environment that are not available with an actual camera.

In the present invention, the 2-D view is generated from a viewpoint within the virtual 3-D gaming environment. The viewpoint is a main factor in determining what surfaces of the 3-D gaming environment defining a 3-D object are captured in the 2-D view. Since information about the 3-D gaming environment is stored on the gaming machine, the viewpoint may be altered to generate new 2-D views of objects within the 3-D gaming environment. For instance, in one frame, a 2-D view of an object modeled in the 3-D gaming environment, such as a front side of a building (e.g. the viewpoint captures the front side of a building), may be generated using a first viewpoint. In another frame, a 2-D view of the same object may be generated from another viewpoint (e.g. the backside of the building).

A disadvantage of current gaming machines is that the 2-D views used as video frames in game presentations are only rendered from 2-D objects and information about the multi-dimensional nature of the objects rendered in the 2-D views, such as the viewpoint used to generate the 2-D view, are not stored on the gaming machine. Historically, due to the regulatory environment of the gaming industry, gaming software used to present a game of chance has been designed to "run in place" on an EPROM installed on the gaming machine. Using an EPROM, it was not feasible to store large amounts of game data relating to a complicated 3-D model. Thus, only 2-D object information used to render the 2-D view was stored on the gaming machine.

However, 2-D games rendered on gaming machines have also become more sophisticated and often employ complex animations. When complicated animations are used in a 2-D system, such as playing movies on a 2-D object, a 3-D system can actually save memory because more types of animation can be used with a 3-D system versus a 2-D system without resorting to using movies, which are memory intensive. In a 2-D system without using movies, the animation properties that may be used are simple two-dimensional movement and color cycling using color palettes, which provide a limited visual appeal.

When only 2-D information about a 3-D object is available, it is not possible to generate new 2-D views from different viewpoints of the 3-D object. For instance, when a picture of a slot reel is rendered on current gaming machines, 3-D information, such as the radius of the reel is not stored. Thus, it is not possible to generate a 2-D view of the slot reel from a side viewpoint, because the radius of the reel is not known. As another example, frames from a movie may be used as part of a game presentation on a gaming machine. Each frame of the movie represents a 2-D view from a viewpoint of a camera used to film each frame. If the frame included a picture of a building viewed from the front (e.g., the viewpoint captures the front of the building), it is not possible to generate a new 2-D view of the back of the building using because information regarding the back of the building is not known.

One advantage of the present invention is the potential game playing area used to present a game of chance modeled in a 3-D gaming environment is greater than the potential game playing area of a 2-D gaming environment. For instance, a game of chance may be presented on each of the six sides of a cube modeled in a virtual gaming environment. To play the game chance, 2-D views of the cube from different viewpoints in the 3-D gaming environment may be rendered in real-time and presented to the player. As described below, in some embodiments, the player may even select the viewpoint in the 3-D gaming environment used to generate the 2-D view.

On current gaming machines, the cube would be rendered as a 2-D object generated from the 3-D cube as seen from a particular viewpoint. The particular viewpoint is selected when the game is developed and only 2-D information about the cube as viewed from the selected viewpoint would be stored on an EPROM on the gaming machine. Thus, a game of chance could be presented on the sides of the cube rendered from the 2-D object that was generated from the selected viewpoint of the 3-D cube and stored on the EPROM. However, unless additional 2-D objects were generated from different viewpoints, it is not possible to present a game of chance on the sides of the cube not visible from the selected viewpoint because the 2-D object does not store information regarding the sides of the cube not visible from the selected viewpoint. Further, even if multiple 2-D objects were generated, it is difficult and time consuming to generate enough 2-D objects to allow smooth transitions between viewpoints captured by the 2-D objects. It is also difficult to a scale a 2-D object, either smaller or larger, without introducing distortion effects.

Distortion is also generated when scaling 3-D objects. However, it is easier to deal with using specialized 3-D graphics cards because the card applies a bilinear filtering process to the texels at render time. Without special hardware, such as a 3-D graphics card, it would be difficult to correct for distortion in real-time.

Finally, in a typical 2-D gaming system, due to the limited flexibility of 2D, outcomes for a game of chance rendered in 2D and displayed on a gaming machine have to be quantified and pre-rendered i.e. canned animations. Due to the flexibility of a 3-D gaming system the outcomes can be determined through user input giving an unlimited number of animations in response to the players input. By not having to make a series of pre-canned animations but instead determining the animation in response to the players input saves many bytes in storage space requirements. In following figures, details of methods and apparatus used to present a game of chance generated from a 3-D gaming environment are described.

Returning to FIG. 1, the 3-D gaming environment 100 includes three objects: 1) a rectangular box 101 on top of, 2) a plane 114 and 3) a second box 127. The box 101, box 127 and plane 114 are defined in a 3-dimensional rectangular coordinate space 104. Typically, surfaces of the objects in the gaming environment are defined using a plurality of surface elements. The surface elements may comprise different shapes, such as different types of polygons that are well known in the 3-D graphical arts. For example, the objects in the present information may be defined in a manner to be compatible with one or more graphics standards such as Open Graphics Library (OpenGL). Information on OpenGL may be found at www.opengl.org.

In one embodiment, the objects in the gaming environment 100 may be defined by a plurality of triangular elements. As an example, a plurality of triangular surface elements 125 are used to define a portion of the surface 108 and the surface face 112. In another embodiment, the objects in the gaming environment 100, such as box 101 and box 127, may be defined by a plurality of rectangular elements. In yet another embodiment, a combination of different types of polygons, such as triangles and rectangles may be used to describe the different objects in the gaming environment 100. By using an appropriate number of surface elements, such as triangular elements, objects may be made to look round, spherical, tubular or embody any number of combinations of curved surfaces.

Triangles are by far the most popular polygon used to define 3-D objects because they are the easiest to deal with. In order to represent a solid object, a polygon of at least three sides is required (e.g. triangle). However, OpenGL supports quads, points, lines, triangle strips and quad strips and polygons with any number of points. In addition, 3-D models can be represented by a variety of 3-D curves such as NURBs and Bezier Patches.

Each of the surface elements comprising the 3-D virtual gaming environment may be described in a rectangular coordinate system or another appropriate coordinate system, such as spherical coordinates or polar coordinates, as dictated by the application. The 3-D virtual gaming environments of the present invention are not limited to the shapes and elements shown in FIG. 1 (see FIGS. 2, 3 and 4) or the coordinate system used in FIG. 1 which are shown for illustrative purposes only. Details of 3-D graphical rendering methods that may be used with the present invention are described in "OpenGL Reference Manual: The Official Reference Document to Open GL, Version 1.2," 3rd edition, by Dave Shreiner (editor), OpenGL Architecture Review Board, Addison-Wesley Publishing, Co., 1999, ISBN: 0201657651 and "OpenGL Program Guide: The Official Guide to Learning OpenGL, Version 1.2," 3rd edition, by Mason Woo, Jackie Neider, Tom Davis, Dave Shreiner, OpenGL Architecture Review Board, Addison-Wesley Publishing, Co., 1999, ISBN: 0201604582, which are incorporated herein in their entirety and for all purposes.

Surface textures may be applied to each of the surface elements, such as elements 125, defining the surfaces in the virtual gaming environment 100. The surface textures may allow the 3-D gaming environment to appear more "real" when it is viewed on a display screen on the gaming machine. As an example, colors, textures and reflectances may be applied to each of the surface elements defining the various objects in the 3-D gaming environment. Millions of different colors may be used to add a realistic "feel" to a given gaming environment. Textures that may be applied include smoothness or surface irregularities such as bumps, craters, lines, bump maps, light maps, reflectance maps and refractance maps or other patterns that may be rendered on each element. The textures may be applied as mathematical models stored as "texture maps" on the gaming machine.

In one embodiment, the "texture map" may be an animated texture. For instance, frames of a movie or another animation may be projected onto a 3-D object in the 3-D gaming environment. These animated textures may be captured in 2-D views presented in video frames on the gaming machine. Multiple animated textures may be used at the same time. Thus, for example, a first movie may be projected onto a first surface in the 3-D gaming environment and a second movie may be projected onto a second surface in the 3-D gaming environment where both movies may be viewed simultaneously.

Material properties of a 3-D surface may describe how the surface reacts to light. These surface properties may include such things as a) a material's ability to absorb different wavelengths of light, b) a material's ability to reflect different wavelengths of light (reflectance), c) a material's ability to emit certain wavelengths of light such as the taillights on a car and d) a material's ability to transmit certain wavelengths of light. As an example, reflectance refers to how much light each element reflects. Depending on the reflectance of a surface element other items in the gaming environment may be reflected fuzzily, sharply or not at all. Combinations of color, texture and reflectance may be used to impart an illusion of a particular quality to an object, such as hard, soft, warm or cold.

Some shading methods that are commonly used with 3-D graphics to add texture that may be applied to the present invention include gourand shading and phong shading. Gourand and phong shading are methods used to hide an object's limited geometry by interpolating between two surfaces with different normals. Further, using Alpha Blending, pixels may be blended together to make an object appear transparent i.e. the object transmits light.

Virtual light sources, such as 102, may be used in the gaming environment to add the appearance of shading and shadows. Shading and shadows are used to add weight and solidity to the rendering of a virtual object. For example, to add solidity to the rectangular box 101, light rays emitted from light source 102 are used to generate a shadow 103 around the rectangular box 101. In one method, ray tracing is used to plot paths of imaginary light rays emitted from an imaginary light source such as 102. These light rays may impact and may reflect off various surfaces affecting the colors assigned to each surface element. In some gaming environments, multiple light sources may be used where the number of lights and the intensity of each light source change with time. Typically, in real time 3D, the light sources do not generate shadows and it is up to the programmer to add shadows manually. As stated earlier, however, the light sources produce shading on objects.

Perspective, which is used to convey the illusion of distance, may be applied to the gaming environment 100 by defining a vanishing point, such as 128. Typically, a single point perspective is used where all of the objects in the scene are rendered to appear as though they will eventually converge at a single point in the distance, e.g. the vanishing point. However, multiple point perspectives may also be employed in 3-D gaming environments of the present invention. Perspective allows objects in the gaming environment appear behind one another. For instance, box 101 and box 127 may be the same size. However, box 127 is made to appear smaller, and hence farther away, to a viewer because it is closer to the vanishing point 128. A 3-D gaming environment may or may not provide perspective correction. Transforming points towards the center of the 2-D view screen accomplish perspective correction. The farther away an object is from the viewpoint in 3-D gaming environment, the more it will be transformed into the center of screen.

The present invention is not limited to perspective views or multiple perspective views of the 3-D gaming environment. An orthographic view may be used where 3-D objects rendered in a 2-D view always appear the same size no matter how far away they are in the 3-D gaming environment. The orthographic view is what you would see as a shadow cast from a light source that is infinitely far away (so that the light rays are parallel), while the perspective view comes from a light source that are finitely far away, so that the light rays are diverging. In the present invention, combinations of both perspective and orthographic views may be used. For instance, an orthographic view of a text message may be layered on top of a perspective view of the 3-D gaming environment.

Related to perspective is "depth of field". The depth of field describes an effect where objects that appear closer to a viewer are more in focus and objects that are farther away appear out of focus. Depth of field may be applied renderings of the various objects in the gaming environment 100. Another effect that may be applied to renderings of objects in the gaming environment is "anti-aliasing". Anti-aliasing is used to make lines, which are digitally generated, as a number of straight segments appear smoother when rendered on a display screen on the gaming machine. Because the 2D display only takes finite pixel positions, stair stepping occurs on any limes that are not straight up and down, straight across (left and right) or at 45 degrees on the display screen. Stair stepping produces a visually unappealing effect, thus, pixels are added to stair-stepped lines to make this effect less dramatic.

Objects in the gaming environment 101 may appear to be static or dynamic. For instance, the coordinates of box 127 may change with time while the coordinates of box 101 and plane 114 remain fixed. Thus, when rendered on a display screen on a gaming machine, the box 127 may appear to move in the gaming environment 101 relative to the box 101. Many dynamic effects are possible. For instance, box 127 may appear to rotate while remaining in a fixed position or may rotate while also translating to generate an effect of bouncing or tumbling. Further, in the gaming environment, objects may appear to collide with one another. For instance, box 127 may appear to collide with box 101 altering the trajectory of box 127 in the gaming environment. Many digital rendering effects may be applied to the gaming environment of the present invention. The effects described above have been provided for illustrative purposes only.

Standard alphanumeric text and symbols may be applied to one or more surface elements in the gaming environment 101 to display gaming information to a game player. The alphanumeric text and symbols may be applied to various surfaces in the gaming environment to generate a plurality of game displays that may be used as part of game outcome presentations viewed on the gaming machine. For instance, game displays may be rendered on each of the 6 six surface faces of box 101 or box 127 and a plurality of game displays may also be rendered on planar surface 114. In the present invention, game displays may be rendered across one or more surfaces of any polyhedron or other object defined in the gaming environment.

The rendered text and symbols allow game outcome presentations to be generated for different games of chance. For instance, a card hand for a poker game or black jack game may be rendered on each of the faces of box 101 such as surfaces 108, 110 and 112. As another example, keno numbers or bingo numbers may be rendered on different faces of boxes 101 and 127. Further, slot displays and pachinko displays for slot and pachinko game outcome presentations may be rendered on different faces of boxes 101 and 127.

Many different combinations of games of chance may be rendered in the gaming environment 100. For instance, a slot display may be rendered on face 108 of box 101, a black jack game display may be rendered on face 110, poker game display may be rendered on face 112, a keno game display may be rendered on a face on the box 101 opposite face 108, a pachinko game display may be rendered on a face on the box 101 opposite 110 and a bingo game display may be rendered on a face on the box 101 opposite face 112. A different combination of game displays may be rendered on the surfaces of box 127. Other games of chance that may be used in the present invention include but are not limited to dice games (e.g. craps), baccarat and roulette.

In the present invention, games of chance are used to denote gaming activities where a game player has made a wager on the outcome of the game of chance. Depending on the game outcome for the game of chance initiated by the player, the wager may be multiplied. The game outcome may proceed solely according to chance, i.e. without any input by the game player or the game player may affect the game outcome according to one or more decisions. For instance, in a video poker game, the game outcome may be determined according to cards held or discarded by the game player. While in a slot game, the game outcome, i.e. the final position of the slot reels, is randomly determined by the gaming machine.

The combinations of games described above may be rendered at the same time in the 3-D gaming environment. A player may play one or more games in a sequential manner. For instance, a player may select one or more games, make a wager for the one or more games and then initiate the one or more games and view game outcome presentations for the one or more games. A player may also play one or more games in a parallel manner. For instance, a player may select one or more games, make a wager for the one or more games, and initiate the one or more games. Before the game outcome presentations have been completed for the one or more selected games, the player may select one or more new games, make a wager for the one or more new games and initiate the one or more new games. Details of a parallel game methodology are described in co-pending U.S. application Ser. No. 09/553,437, filed on Apr. 19, 2000, by Brosnan et al. and entitled "Parallel Games on a Gaming Device," which is incorporated in its entirety and for all purposes.

The rendered text and symbols in a game display are not necessarily planar may be rendered in multiple in dimensions in the gaming environment 100. For example, rendered cards may have a finite thickness or raised symbols. The cards may be dealt by hands that are defined as 3 dimensional object models in the 3-D gaming environment 100 and move as the cards are dealt. As another example, a slot display may be rendered as multidimensional reels with symbols (see FIG. 2) that may rotate in the gaming environment 100.

A game display for a game outcome presentation may be rendered on a particular surface and may change with time in response to various player inputs. For example, in a poker game, a player may discard and hold various cards while they are playing the game. Thus, the cards in the hand change as the game outcome is rendered in the 3-D gaming environment and some cards (e.g. discarded cards) may appear to leave the gaming environment. As another example, reels on a slot display rendered in the gaming environment may begin to spin in the gaming environment in response to a player pulling a lever or depressing an input button on the physical gaming machine.

Other game features and gaming information may also be rendered in the gaming environment 100. For example, bonus games, promotions, advertising and attraction graphics may also be rendered in the gaming environment. For instance, a casino's logo or a player's face may be rendered in the gaming environment. These additional game features may be integrated into a game outcome presentation on the gaming machine or other operational modes of the gaming machine such as an attract mode.

In another embodiment of the present invention, a virtual person, e.g. a 3-D dimensional model of a portion (e.g., face, hands, face, head and torso, etc.) or all of a human being may be rendered in the 3-D gaming environment. The virtual person may be animated. For the instance, by adjusting parameters of the 3-D dimensional model of the virtual person in a sequence, the virtual person may appear to speak or gesture. The virtual person may be used to explain gaming instructions to a game player or may be used as a component in a game presentation. The virtual person may appear to respond or interact with a user according to inputs into the gaming machine made by the user. For instance, a player may ask the virtual person a particular question via an input mechanism on the gaming machine such as microphone on a gaming machine equipped with voice recognition software. Next, the virtual person may appear to speak a response to the question input by the user. Animated 3-D models for other objects, such as animals or fictional characters, may also be used in the 3-D gaming environment.

After the gaming environment is defined in 3-dimensions, to display a portion of the 3-D gaming environment on a display screen on the gaming machine, a "photograph" of a portion of the gaming environment is generated. The photograph is a 2-dimensional rendering of a portion of the 3-dimensional gaming environment. Transformations between 3-D coordinate systems and 2-D coordinate systems are well known in the graphical arts. The photograph may be taken from a virtual "camera" positioned at a location inside the gaming environment 100. A sequence of photographs taken by the virtual camera in the gaming environment may be considered analogous to filming a movie.

A "photograph" displayed on the display screen of a gaming machine may also be a composite of many different photographs. For instance, a composite photograph may be generated from portions of a first photograph generated using an orthographic view and portions of a second photograph generated using a perspective view. The portions of the photographs comprising the composite photograph may be placed on top of one another to provide "layered" effects, may be displayed in a side-by-side manner to produce a "collage" or combinations thereof.

In another embodiment of the present invention, a photograph may be a blended combination of two different photographs. Using an interpolation scheme of some type, two photographs may be blended in a sequence of photographs to provide a morphing effect where the first photograph appears to morph into a second photograph. For instance, a slot game may appear to morph into a poker game.

Operating parameters of the virtual camera, such as its position at a particular time, are used to define a 3-D surface in the gaming environment, which is projected on to a 2-D surface to produce the photograph. The 3-D surface may comprise portions a number of 3-D objects in the 3-D gaming environment. The 3-D surface may also be considered a 3-D object. Thus, a photograph is a 2-D image derived from 3-D coordinates of objects in the 3-D gaming environment. The virtual camera may represent gaming logic stored on the gaming machine necessary to render a portion of the 3-D gaming environment 100 to a 2-D image displayed on the gaming machine. The photograph is converted into a video frame, comprising a number of pixels, which may be viewed on a display screen on the gaming machine.

The transformation performed by the virtual camera allowing a portion of the virtual gaming environment to be viewed one or more display screens on the gaming machine may be a function of a number of variables. The size of lens in the virtual gaming environment, the position of the lens, a virtual distance between the lens and the photograph, the size of the photograph, the perspective and a depth variable assigned to each object are some of the variables that may be incorporated into a transformation by the virtual camera that renders a photograph of the virtual gaming environment. The resolution of the display screen on the gaming machine may govern the size of a photograph in the virtual camera. A typical display screen may allow a resolution of 800 by 600 color pixels although higher or lower resolution screens may be used. A "lens size" on the virtual camera defines a window into the virtual gaming environment. The window is sometimes referred to as a viewport. The size and position of the lens determines what portion of the virtual gaming environment 100 the virtual camera views.

After the photograph of the virtual gaming environment has been generated, other effects, such as static and dynamic anti-aliasing, may be applied to the photograph to generate a frame displayed on one or more displays located on the gaming machine. Typically, the mathematical and logical operations, which are encoded in gaming software logic, necessary to perform a particular transformation and generate a video frame may be executed by video cards and graphics cards located on the gaming machine and specifically designed to perform these operations. The graphics cards usually include graphical processing units (GPUs). However, the transformation operations may also be performed by one or more general purpose CPUs located on the gaming machine or combinations of GPUs and CPUs.

In general, the 2D/3D video graphics accelerators or coprocessors often referred to as graphics processing units (GPUs), are located on or connected to the master gaming controller and are used to perform graphical operations. The solutions described are most commonly found as video cards. The graphical electronics may be incorporated directly onto the processor board (e.g. the master gaming controller) of the gaming machine, and even tightly integrated within other very large-scale integrated chip solutions. The integration methods are often cost saving measures commonly used to reduce the costs associated with mass production. For instance, video cards, such as the Vivid!XS from VideoLogic Systems (VideoLogic Systems is a division of Imagination Technologies Group plc, England) may used to perform the graphical operations described in the present invention. As another example, video cards from Nvidia Corporation (Santa Clara, Calif.) may be employed. In one embodiment, the video card may be a multi-headed 3-D video card, such as a Matrox G450 (Matrox Graphics Inc., Dorval, Quebec, Canada). Multi-headed video cards let a single graphics card power two displays simultaneously or render two images simultaneously on the same display.

When displaying photographs from a virtual camera in a 3-D gaming environment, a single image from the camera may be divided among a plurality of display devices. For instance, four display screens may be used to display one quarter of a single image. The video feeds for each of the plurality of display devices may be provided from a single video card. Multi-headed video cards let a single graphics card (or graphics subsystem) display output on two or more displays simultaneously. This may be multiple output rendering for each display or one rendering over multiple displays, or variation of both. For example, when a multi-headed video card is used, a first head on the multi-headed video card may be used to render an image from a first virtual camera in a 3-D gaming environment and a second head on the multi-head video card may be used to render a second image from a second virtual camera in a 3-D gaming environment. The rendered first and second images from the first head and the second head may be displayed simultaneously on the same display or the first image may be displayed on a first display and the second image may be displayed on a second display.

Returning to FIG. 1, three lenses, 105, 106 and 107 used in a virtual camera are shown positioned at three locations in the virtual gaming environment. Each lens views a different portion of the gaming environment. The size and shape of the lens may vary which changes a portion of the virtual gaming environment captured by the lens. For instance, lenses 105 and 106 are rectangular shaped while lens 107 is ovular shaped.

Lens 106 is positioned to view the "game display" for a game outcome presentation rendered on surface 108. The portion of the gaming environment captured by lens 106 is a six-sided shape 120. As described above, the game display may contain the presentation of a particular game played on the gaming machine, such as a hand of cards for a poker game. After applying an appropriate transformation, a photograph 124 of the portion of the virtual gaming environment 100 in volume 120 is generated by the virtual camera with lens 106.

Using differing terminology that is common within the 3D graphics community, the lenses 105, 106 and 107 may be described as a camera. Each camera has the ability to have different settings. A scene in the 3-D gaming environment is shot from the camera's viewpoint. A different scene is captured from each camera. Thus, the scene is rendered from the camera to produce and image.

The photograph 124 generated from the virtual camera with lens 106 may be viewed on one or more display screens on the gaming machine. For instance, photograph 124 may be viewed on a main display on the gaming machine and a secondary display on the gaming machine. In another embodiment, a portion of photograph 124 may be displayed on the main display and a portion of the photograph may be displayed simultaneously on a secondary display. In yet another embodiment, a portion of photograph 124 may be displayed on a first gaming machine while a portion of photograph 124 may be displayed simultaneously on a second gaming machine.

Lens 105 of a virtual camera is positioned to view volume 121 in the virtual gaming environment 100. The volume 121 intersects three faces, 108, 110 and 112, of box 101. After applying an appropriate transformation, a photograph 125 of the portion of the virtual gaming environment 101 in volume 121 is rendered by the virtual camera with lens 105 which may be displayed on one of the display screens on a gaming machine.

Lens 107 of a virtual camera is positioned to view volume 122 in the virtual gaming environment 100. The ovular shape of the lens produces a rounded volume 122 similar to a light from a flashlight. The volume 122 intersects a portion of face 110 and a portion of plane 114 including a portion of the shadow 103. After applying an appropriate transformation, a photograph 126 of the portion of the virtual gaming environment 101 in volume 122 is rendered by the virtual camera with lens 107 which may be displayed on one or more of the display screens on a gaming machine. For instance, a gaming machine may include a main display, a secondary display, a display for a player tracking unit and a remote display screen in communication with the gaming machine via a network of some type. Any of these display screens may display photographs rendered from the 3-D gaming environment.

A sequence of photographs generated from one or more virtual cameras in the gaming environment 101 may be used to present a game outcome presentation on the gaming machine or present other gaming machine features. The sequence of photographs may appear akin to movie or film when viewed by the player. For instance, a 3-D model of a virtual person may appear to speak. Typically, a refresh rate for a display screen on a gaming machine is on the order of 60 HZ or higher and new photographs from virtual cameras in the gaming environment may be generated as the game is played to match the refresh rate.

The sequence of photographs from the one or more virtual cameras in the gaming environment may be generated from at least one virtual camera with a position and lens angle that varies with time. For instance, lens 106 may represent the position of a virtual camera at time, $t_1$, lens 105 may represent the position of the virtual camera at time, $t_2$, and lens 107 may represent the position of the virtual camera at time $t_3$. Photographs generated at these three positions by the virtual camera may be incorporated into a sequence of photographs displayed on a display screen.

The position of the virtual camera may change continuously between the positions at times $t_1$, $t_2$, $t_3$ generating a sequence of photographs that appears to pan through the virtual gaming environment. Between the positions at times $t_1$, $t_2$, $t_3$, the rate the virtual camera is moved may be increased or decreased. Further, the virtual camera may move non-continuously. For instance, a first photograph in a sequence of photographs displayed on a display screen may be generated from the virtual camera using the position of lens 106. The next photograph in the sequence of photographs may be generated from the virtual camera using the position of lens 105. A third photograph in the sequence of photographs may be generated from the virtual camera using the position of lens 107. In general, the virtual camera in the gaming environment 101 may move continuously, non-continuously and combinations thereof.

In a game presentation, a plurality of virtual cameras, with time varying positions, in a plurality of virtual gaming environments may be used. The camera and environment information as a function of time may be stored on the gaming machine and may be accessed when a particular scene for a game event in a game outcome presentation is needed such that the scene may be rendered in "real-time". A scene may be defined by the positions of one or more virtual cameras in one or more gaming environments as a function of time. The scenes may be modularized, i.e. a library of scenes may be generated, so that they may be incorporated into different games. For instance, a scene of a button being depressed may be incorporated into any game using this type of sequence.

A sequence of photographs generated from a first virtual camera in a first virtual gaming environment may be displayed simultaneously with a sequence of photographs generated from a second virtual camera in a second virtual gaming environment. For instance, the first sequence of photographs and second sequence and second sequence of photographs may be displayed on a split screen or may be displayed on different screens. In addition, the first virtual camera in a first virtual gaming environment and the second virtual camera may be located in a second virtual gaming environment different from the first virtual gaming environment. Also, the first virtual gaming environment and the second virtual gaming environment may be in the same gaming environment. Further, a single virtual camera may jump between different gaming environments, such as between a game play environment to a bonus game environment. The transition between the gaming environments may also appear to be smooth (e.g. the camera may pan from one environment in a continuous manner).

In some embodiments, a player may be to select one or more virtual gaming environments used in a game play on a gaming machine. For instance, a first gaming environment may involve a cityscape, such as New York, while a second gaming environment may involve a cityscape, such as Paris. During a game play on a gaming machine, a player may be able to select New York or Paris as a cityscape for the virtual gaming environment used during game play. The different game environments and different scenes generated from the environments may be stored in a memory on the gaming machine as a library of some type.

In particular embodiments, while using the gaming machine, a player may be able to control the position of the virtual camera using an input mechanism on the gaming machine (see FIG. 7). For instance, a player may be able to move the position of lens 106 closer to the surface 108 in the gaming environment 108 which generates the appearance of zooming or the object may be moved closer to the camera. For multiple hand card games, a player may be able to zoom-in on a particular hand to "expand on demand" the hand increasing the visibility of the hand. For instance, a player may use an input mechanism to "scroll" the camera and view larger portions. As another example, the player may be able maneuver a virtual camera through the gaming environment or select a scene in the gaming environment. An opportunity to move the virtual camera may be triggered by certain game events such as a bonus game event on the gaming machine or the movement of the camera may be scripted (e.g. pre-determined) as part of the game playing sequence. For example, as part of the play of a bonus game event, a player may be able to choose from a number of doors leading to different rooms with treasure chests. When the player enters of one of the rooms, the chest is opened their bonus award is revealed.

With the present invention, some advantages of generating a 3-D gaming environment that may be rendered in real-time to a display screen are as follows. First, it allows a player to be presented and possibly control a complex game outcome presentation in real-time. Thus, the game outcome presentation may be varied from game to game in a manner determined by the player. Traditional game outcome presentations have been modeled in 2-D and little control has been given to the player. Thus, traditional game outcome presentations do not vary much from game to game. Second, screen resolution issues associated with presenting a large number of games simultaneously on a single screen may be avoided by modeling the games in 3-D gaming environment.

At any given time during a game presentation viewed on a display screen on the gaming machine, only a portion of the plurality of the games modeled in the 3-D gaming environment may be visible to the player. Thus, a game playing are in a 3-D gaming environment is greater than a 2-D gaming environment because a game of chance may be presented on surfaces modeled in the 3-D gaming environment that may be hidden from view. In a 2-D gaming environment, there are not any hidden surfaces i.e. "what you see" is "what you get." Since the viewpoint in the 3-D model may be varied, the player or gaming machine may zoom-in on one or more games of interest, some of which may be hidden in a current 2-D view, and select a desirable resolution level. Thus, all of the games or game components do not have to be rendered on a single screen simultaneously.

FIG. 2 is a is a perspective drawing of three virtual slot reels, 202, 204 and 206 in a 3-D virtual gaming environment 200 implemented on a gaming machine for one embodiment of this invention. The three slot reels are modeled as cylinder portions in coordinate space 201. The reels appear to be hanging in space. Different symbols are rendered on each reel including a triangle 210, a triple bar 212, a "seven" 214, double bar 216 and an oval 218. Other symbols (not shown) may be rendered on the backs of the reels. In a virtual 3-D slot gaming environment, such as 200, a size of the reels, a number of reels, a number of symbols on the reels and types of symbols on the reels may be varied. Also, background scenery (not shown) may be also varied in the environment.

A window 208 is rendered over the reels, 202, 204 and 206 to illustrate a number of symbols that may be visible on a mechanical slot display. At most, nine symbols, e.g. the three double bars, three sevens and three triple bars may be viewed on the mechanical slot display. When the player views multiple symbols, the multiple symbols may be used to generate multiple paylines that may be wagered on during game play.

When reels on a gaming machine stop after a wager has been received and a game has been initiated, a combination of symbols along a payline may be compared to winning combinations of symbols to determine an award for the game. For instance, three paylines 228, 229 and 230 are shown. Three "sevens" symbols are along payline 229. A triple bar, a seven and a double bar are shown along paylines 228 and 230. Often triple seven combination is used as a winning combination on slot games. The number of paylines increases the betting opportunities for a given game and some players desire multiple payline games. In some slot games, only a single line of symbols may be viewed, such as the three sevens, and a player may bet on only a single payline.

For a game outcome presentation, the slot reels 202, 204 and 206 may each begin to rotate and move in the virtual gaming environment. In the virtual space 200, the reels may rotate in different directions, translate, rotate around different axis, shrink in size or grow in size, as the reels are not limited by the constraints of actual mechanical slot reels. During the game outcome presentation, a virtual camera, which may vary its position as a function of time, may film a sequence (e.g., generate a number of photographs in a sequence) that are displayed on a display screen on the gaming machine and that capture the motion of the reels.

A number of virtual cameras may be positioned in the virtual gaming environment 200 to capture one or more symbols on the slot reels. For instance, lens 220 of a virtual camera captures the "7" symbol on reel 202 in volume 221 of the virtual gaming environment 200. Lens 222 of a virtual camera captures the "triangle" symbol on reel 204 in volume 223 of the virtual gaming environment. Lens 224 of a virtual camera captures a "triple bar" symbol (not shown) on reel 204 of the virtual gaming environment. Finally, Lens 226 of a virtual camera captures the "oval" symbol on reel 206 in volume 226 of the virtual gaming environment. However, a single virtual camera may also by used to capture multiple symbols such as a line of symbols across multiple reels.

The symbols captured from the virtual cameras using lens 220, 222, 224 and 226 may be used to create various paylines that may be used for wagering. For example, the symbols captured from lens 220, 222 and 226 are used to generate a first combination of symbols 232 which may wagered on during game play. The symbols captured from lens 220, 224 and 226 are used to generate a second combination of symbols 234 which may be wagered on during game play. Finally, virtual cameras may be positioned along payline 230 to capture the combination of symbols 236.

In the present invention, the number of paylines that may be implemented is quite large. For instance, for three virtual reels with 25 symbols on each reel, 253 paylines may be utilized. In one embodiment, to aid in the display of a large amount of gaming information generated in one virtual gaming environment, gaming information generated in a first gaming environment may be transferred to a second gaming environment. For example, gaming information regarding combinations of symbols along a plurality of paylines generated in gaming environment 200 may be transferred to a second gaming environment with virtual cameras for rendering it to a display viewed by a player.

In another embodiment, the slot reels 202, 204, 206 may appear translucent such that symbols on the back of the reel may be visible from the front. Paylines, that may be wagered on by a player, may be rendered in "virtual space" to connect symbols on the front of a reel to a symbol on the back of the reel. For instance, a payline may be rendered from the front of reel 202 to the back of reel 204 and to the front of reel 206.

Next, other embodiments for displaying symbols that may be used in games of chance and bonus games of present invention are described and contrasted with a traditional mechanical slot machine. In a mechanical slot game, a reel strip is mounted to a reel that is rotated by a motor. The reel strip may be a rectangular strip of a printable media with a number of different symbols printed on it. The symbols are arranged in a particular sequence. A typical mechanical slot game may employ a plurality of reels, such as three reels, to present a game of chance.

The mechanical slot machine may include one or more paytables that define a probability of each position occurring for a single reel/wheel or a probability of each combination of positions occurring for a plurality of reels. For example, some mechanical slot machines include a bonus wheel and 3 reels. The probability of each position or combinations of positions may be proportional to a payout for a game of chance played on the slot machine. After a wager has been made and the game has been initiated, to determine an outcome for the game of chance, a random number may be generated and compared with entries in the paytable stored on the gaming machine.

Using the paytable and the random number, a position of each of the one or more reels or wheels and a payout for the game may be determined. The slot machine may then rotate the reels based upon an algorithm stored in the gaming machine and stop them at the predetermined position. The position on each reel is usually marked with a symbol printed on the reel strip at the position or a blank space. Usually, only a portion of the symbols on each reel strip is visible to a player at any one time. Thus, as the one or more reels spin, the player views different portions of each reel strip. The final position of the one or more reels indicates a symbol or a combination of symbols. The combination of symbols displayed on the mechanical reels, as defined by a payline, may be used by the player to determine whether the combination is a winning combination.

In FIG. 2, the modeling of 3-D virtual reels in a 3-D gaming environment was described. A virtual reel strip comprising a sequence of symbols was shown mapped to a plurality of positions on the virtual reel in a manner analogous to a mechanical slot reel. However, as described with respect to FIG. 2, the symbols may be viewed from various vantage points, such as behind the virtual reels, and the virtual reels may move in manners, such as translating or vibrating, that are not easily duplicated using mechanical reels. In other embodiments of the present invention, the virtual reel strip may be mapped to 3-D objects in the 3-D gaming environment in a manner that is different from a traditional slot machine. These embodiments are described as follows.

Figure 3A:
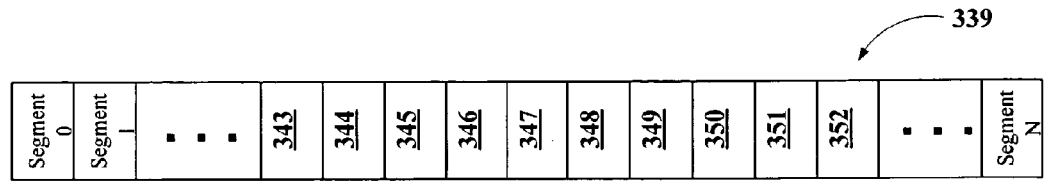
FIGS. 3A-3C are diagrams showing a mapping of virtual reel strip to a 3-D object for one embodiment of this invention.
Figure 3B:
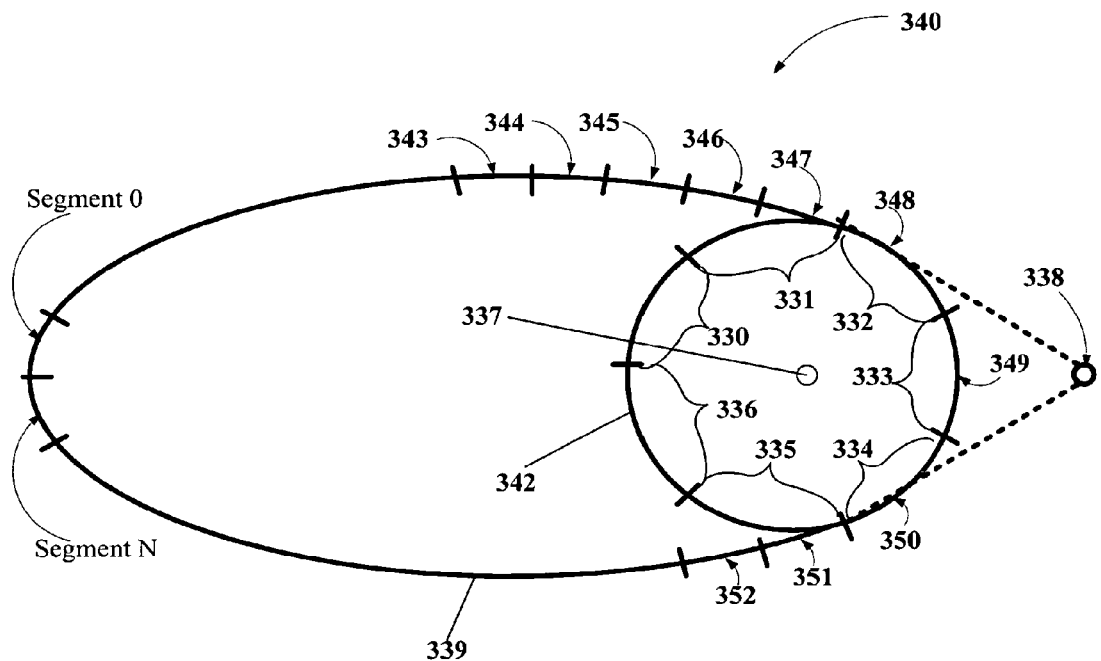
Figure 3C:
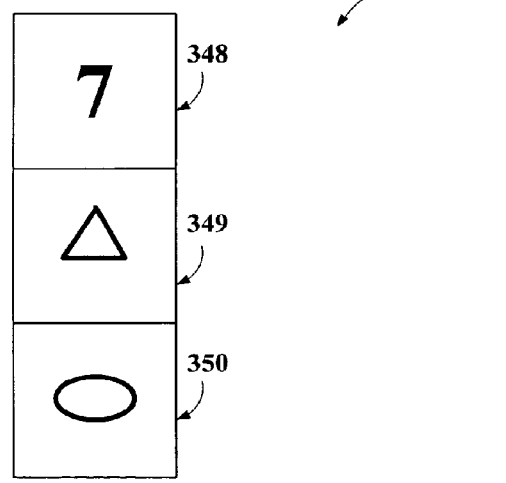

FIGS. 3A-3C are diagrams showing a mapping of virtual reel strip to a 3-D object for one embodiment of this invention. In FIG. 3A, the virtual reel strip 339 is shown which is a graphical conceptualization relating the virtual reel strip 339 to its physical counterpart on a mechanical slot machine. On the gaming machine, the virtual reel strip 339 may be stored in one or more files that specify the sequence of symbols represented on the virtual reel strip 339 and any logical relationships needed to use the virtual reel strip in a 3-D gaming environment.

The virtual reel strip may comprise a plurality of segments. For instance, the virtual reel strip may be N+1 segments long where N is a whole number. A typical value of N is between 30 and 40 but the present invention is not limited to this range. Between segment 0 and segment N on the strip 339, there are 10 referenced segments, 343-352. Each segment may be mapped to a corresponding symbol and a corresponding index in a paytable. Thus, the virtual reel strip may define a sequence of symbols, which is analogous to a physical reel strip.

The virtual reel strip 339 may be generated with generic symbol identifiers for each type of symbol used on the virtual reel strip. For instance, the generic symbol identifiers used in the virtual reel strip 339 may be denoted as "symbol 1," "symbol 2," "symbol 3", up to "symbol N" and a sequence of these different symbol types may be stored in a file defining the virtual reel strip 339. The generic symbols may be considered as an index in a sequence of indices where the sequence of indices corresponds to the sequence of symbols in a virtual reel strip. To display the virtual reel strip in a 3-D gaming environment, a graphical object, such as a bitmap of the graphical object, may be mapped to each symbol type used on the virtual reel strip 339. The graphical object assigned to each symbol type may be used when the sequence of symbols from the virtual reel strip 339 is generated in a 3-D gaming environment.

As an example, one embodiment of the virtual reel strip 339 may use three types of symbols that are represented by the generic symbol identifiers, "symbol 1," "symbol 2" and "symbol 3" and each segment of virtual reel strip 339 may be assigned one of these symbols types. Segment 343 may be assigned "symbol 1," segment 344 may be assigned "symbol 1," segment 345 may be assigned "symbol 3," segment 346 may be assigned "symbol 2," etc. The generic symbol identifier information for each segment of the virtual reel strip 339 may be stored in a file on the gaming machine, such as in a table, with pointers to a corresponding paytable for the sequence of symbols defined for the virtual reel strip.

The use of generic symbol identifiers may allow the look and feel of virtual reel strip to be changed and hence a game outcome presentation using the virtual reel strip to be changed, without changing a paytable that uses the virtual reel strip. For instance, a virtual reel strip 339 may allow for 4 different generic symbol types that are mapped to each segment. In one embodiment, a single bar, a double bar and a triple bar and a blank space may be mapped to the generic symbol types for the virtual reel strip 339. In another embodiment, a cherry, a plum, a lemon and a blank space may be mapped to the generic symbol types for the virtual reel strip 339. In one embodiment, a plurality of graphical symbols that may be mapped to the generic symbol types defined for the virtual reel strip 339 may be stored on the gaming machine and the gaming machine may be capable of allowing a player to select the graphical symbols that are mapped to the generic symbol types when the virtual reel strip is used in the 3-D gaming environment.

In FIG. 3B, the virtual reel strip 339 is mapped to a 3-D object 342 that may be generated in a 3-D gaming environment 340. The 3-D object 342 may be modeled as a cylinder, as was described with respect to FIG. 2 although the present invention is not limited to this shape. The 3-D object 342 may be a random shape with a number of surfaces used for drawing symbols corresponding to segments of the virtual reel strip 339. The 3-D object 342 comprises seven positions, 330-336, corresponding to seven surface segments on the cylinder. These seven surface segments on the cylinder may be used to display symbols corresponding to segments on the virtual reel strip 339. For instance, the symbols corresponding to segments, 348, 349 and 350, of the virtual reel strip 339 may be drawn at positions 332, 333 and 334 on the cylinder 342.

A virtual camera 338, as described with respect to FIGS. 1 and 2, may be positioned in the 3-D gaming environment 340 to capture the three positions, 332, 333 and 334, of the cylinder 342 for rendering. The other positions, 330, 331, 335 and 336, on the 3-D object 342, may not be visible to the virtual camera 338. The resulting "photograph" captured by the camera is analogous to a mechanical slot display where only a portion of each of the reel strips is visible. The cylinder 342 may rotate around axis 337 allowing different symbols mapped to each of its segments to be captured by the virtual camera 338.

An example of a sequence of symbols 341 that may be rendered from the virtual camera 338 in the 3-D gaming environment 340 is shown in FIG. 3C. Three symbols, a "seven," a triangle and an oval are shown. The three symbols correspond to segments 348, 349 and 350 on virtual reel strip 339 that were drawn at positions 332, 333 and 334. As described with respect to FIG. 3A, different combinations of graphical symbols may be used for each symbol without changing the mathematical model of the virtual reel strip represented in the paytable. For instance, each "7," "triangle," and "oval" used on the virtual reel strip 339 may be replaced "a cherry," "a plum" and a "lemon," respectively in the 3-D gaming environment 340 without changing the mathematical model used in the paytable.

In this embodiment, the number of segments on the virtual reel strip 339 is greater than the number of positions available on the cylinder 342. Since the cylinder 342 has seven positions available, a sequence of up to seven consecutive segments long from the virtual reel strip 339, such as segments 0 thru 6, segments 343 thru 349, segments or segments 346 thru 352, and their corresponding symbols may be drawn at the 7 positions, 330 and 336 on the cylinder 342. By rotating the 3-D object 342 about its axis 337 in the 3-D gaming environment 340, different sequences of symbols from the virtual reel strip 339 may be captured by the virtual camera 338. Thus, in FIG. 3C, the sequence of symbols 341 may change as the cylinder 342 is rotated.

To display a portion of the virtual reel strip, which is greater than 7 segments long, seven symbols corresponding to a consecutive sequence of seven segments from the virtual reel strip 339 may be mapped to the 7 positions of the 3-D object at a time. Then, the cylinder may be rotated around its axis 337 in the 3-D gaming environment 340. When the cylinder completes a rotation, such that the end of the sequence of seven symbols is reached, the next seven symbols corresponding to the next seven segments on the virtual reel strip 339 may be drawn to 3-D object 342. Thus, by splicing consecutive 7 segment length pieces of the sequence of segments in the virtual reel strip 339 to the cylinder, all of the segments of the virtual reel strip 339 may be displayed. When the last segment on the virtual reel strip 339, segment N, is reached, the gaming machine may jump to the first segment, segment 0, on the virtual reel strip 339 and begin repeating the sequence defined by the virtual reel strip 339.

Conceptually, the rotation through the segments on the virtual reel strip 339 may be viewed as the rotation of a belt moving through an oval shaped path around the cylinder 342 or as the rotation of a bicycle chain around a spoked wheel. For illustrative purposes only, the virtual reel strip 339 is represented in FIG. 3B in this manner. However, although the virtual reel strip 339 may be drawn as a 3-D object as shown in the figure, it is not necessary for the gaming machine to draw the virtual reel strip 339 as a 3-D object in the gaming environment 340. The gaming machine may logically keep track of the sequence of symbols to draw on the cylinder 342 according to the order of symbols representing the virtual reel strip 339 and may draw the symbols to the positions on the cylinder 342 as it rotates such that the sequence of symbols from the virtual reel strip are displayed.

In one embodiment of the present invention, the gaming machine may be capable of instantaneously jumping to different locations on the virtual reel strip 339 for the purposes of displaying a sequence of symbols in a game outcome presentation using the virtual reel strip that is less than all of the symbols between two locations on the virtual reel strip. For example, a current position on the reel strip that is displayed may be segment 0 and a final position, which is to be displayed, is segment 352. Rather than displaying all of the symbols between segment 0 and segment 352, the sequence of symbols displayed may be segment 0, segment 1, segment 2, segment 349, segment 350, segment 351 and segment 352 where segments such as, segments 343, 344, 345, 346, 347, 348, between segment 2 and segment 349 are skipped. Since the rotating symbols often move so fast that the symbol at each position is indistinguishable and the sequence is not easily determined, a player viewing the symbols rendered to the display may not notice the skipping of symbols on the virtual reel strip.

An advantage of allowing jumps in the display sequence is that the length of the game outcome presentation may be more finely tuned in the present invention than with a mechanical slot game. For example, a number of symbols to rotate through for each reel and logic for making an appropriate jump or jumps on the virtual reel strip may be specified. Thus, the presentation time for each game outcome presentation may be fixed. In a mechanical slot game, the symbols on the mechanical reels in the sequence of symbols between to an initial position and a final position must all be displayed. Thus, the game outcome presentation time may vary depending on initial position of reels, the final position of the reels and relative position of the initial position and the final position.

Figure 3D:
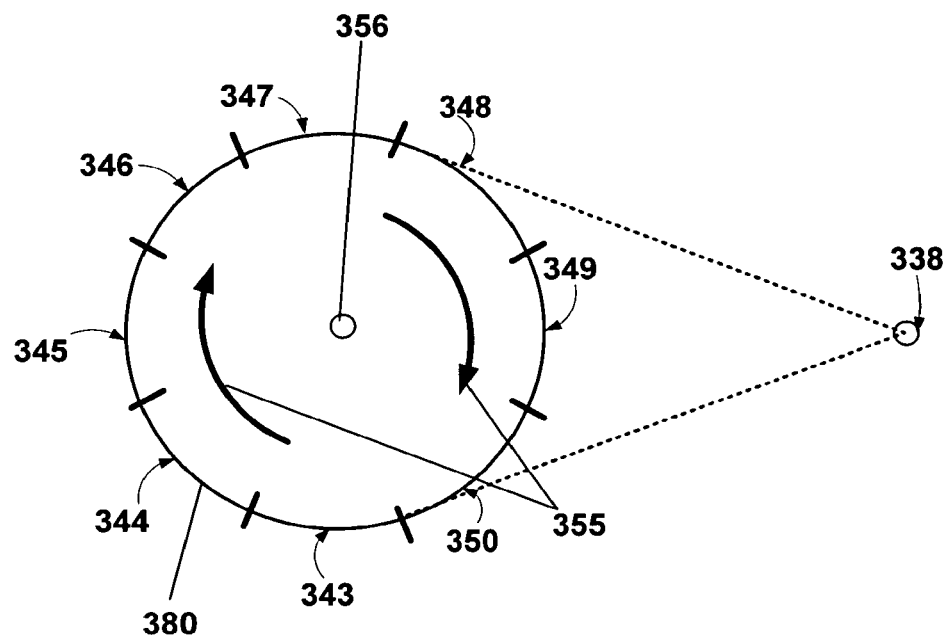
FIGS. 3D-3E are diagrams showing movement patterns of a 3-D object used to display a virtual real strip.
Figure 3E:
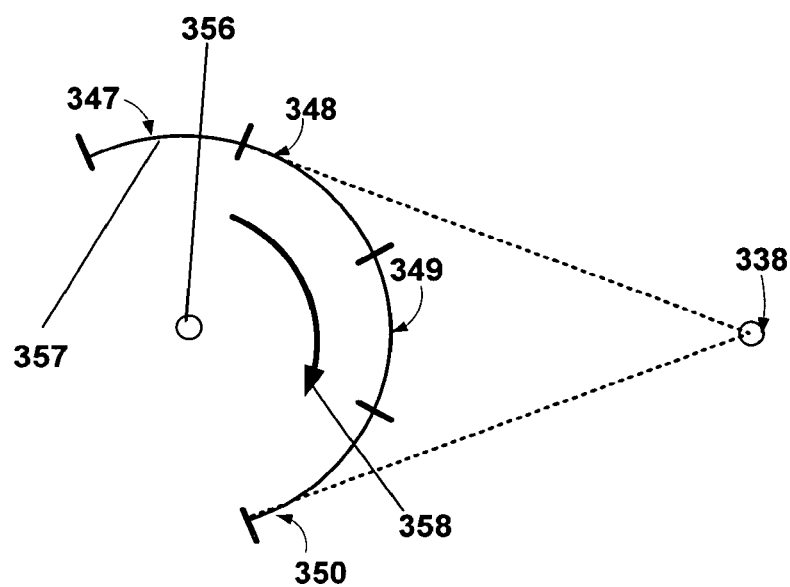

FIGS. 3D-3E are diagrams showing movement patterns of a 3-D object used to display a virtual real strip. In FIG. 3D, 8 symbols from 8 segments, 343-350, of virtual reel strip 339 (see FIG. 3A) are mapped to a 3-D object 380 which may be a cylinder as described with respect to FIG. 2. In another embodiment, the 3-D object 380 may also be an octagonal-shaped object, like a "stop" sign. The 3-D object 380 may be modeled in a 3-D gaming environment of the present invention.

The cylinder 380 may rotate around an axis through point 356. As rotations of the cylinder are completed, different symbols in the sequence comprising the virtual reel strip 339 may be mapped to the cylinder 380. The cylinder may be rotated 355 in a clock-wise or counter clock-wise direction in the 3-D gaming environment. Portions of the cylinder 380 may be captured by a virtual camera 338 in the 3-D gaming environment and used as part of a game outcome presentation for a game of chance played on the gaming machine. The portions of the cylinder captured depend on the position of the virtual camera. In one example, the virtual camera 338 is positioned to capture three positions of the cylinder 380. Using a cylinder with a larger radius or dividing the cylinder into more positions may be used to allow the virtual camera 338 to capture more symbols at one time.

During a rotation sequence of the cylinder 380 for a game outcome presentation various motion sequences may be applied to the cylinder 380. For instance, prior to rotating, the cylinder may be cocked up and down, then the cylinder 380 may be spun up to a constant rotation rate, the cylinder may spin at a constant rate, then the cylinder may be spun down to a stop. After stopping, the cylinder may bounce down and up in a rotational movement around the axis 356. These motions may be used to emulate the motions made by a mechanical reel.

During the rotation sequence, a sequence of symbols from the virtual reel strip may be mapped to the cylinder 380. The symbol displayed at a particular position on the cylinder may change as a function of time as the cylinder 380 rotates. As described with respect to FIGS. 3A-3C, the sequence of symbols mapped from the virtual reel strip 339 may include jumps of greater than 1 symbol, such that all of the symbols between an initial position and a final position on the virtual reel strip are not displayed.

In another embodiment of the present invention, a sequence of symbols from a virtual reel strip 339 may be rendered for the display of a game outcome presentation using a portion of a cylinder or a rectangular strip. The motion of a cylinder portion 357 is described with respect to FIG. 3E in a 3-D gaming environment. The motion of a rectangular strip is described with respect to FIG. 3G.

In FIG. 3E, a portion of a cylinder 357 with four positions for drawing symbols is shown in a 3-D gaming environment. The four positions may each comprise ¼ of the cylinder portion 357. Symbols from segments 347, 348, 349 and 350 of the virtual reel strip are drawn at consecutive positions on the cylinder portion 357. The cylinder portion 357 may rotate 358 around axis 356 in the 3-D gaming environment. The virtual camera 338 is positioned in the 3-D gaming environment to capture 3 out of 4 positions on the cylinder portion 357, which spans ¾ the length of its circumference. In the FIG. 3E, the virtual camera 338 captures the positions where symbols corresponding to segments 348, 349 and 350 of the virtual reel strip 339 are drawn.

To display a sequence of symbols, the cylinder portion 357 may be rotated a ¼ turn in the clockwise direction, where a ¼ turn is a rotation of the cylinder portion through a length comprising ¼ of its circumference. After the ¼ turn, the virtual camera 338 captures the symbols, for segments 347, 348 and 349, and the symbol for segment 350 goes beyond the view of the virtual camera 338. Next, the cylinder portion 357 may be instantly redrawn at its initial position before the ¼ turn and a new set of symbols may be mapped at each position of the cylinder portion 357. For instance, symbols corresponding to segments 346, 347, 348 and 349 may be drawn at each position. Then, the cylinder portion 357 may be again rotated ¼ turn. Repeating the rotation and re-mapping symbols of the cylinder portion in this manner, a series of "photographs" captured by the camera 338 in the 3-D gaming environment may appear to show a cylinder with a sequence of symbols rotating corresponding to a sequence of symbols defined by the virtual reel strip 339.

Using this type of motion and the position of the virtual camera 333, the cylinder portion 357 may appear to mimic the movement of rotating cylinder in different directions, such as clockwise and counter clockwise. In addition, the cylinder portion 357 may also be cocked up, cocked down, spun up, spun down and bounced as was described with the full cylinder 380 in FIG. 3D. An advantage of using a cylinder portion, as opposed to a full cylinder, is that it may be faster then rendering an entire cylinder because the polygons defining the full cylinder are rendered even when they are not in view of the camera 338.

Figures 3F, 3G:
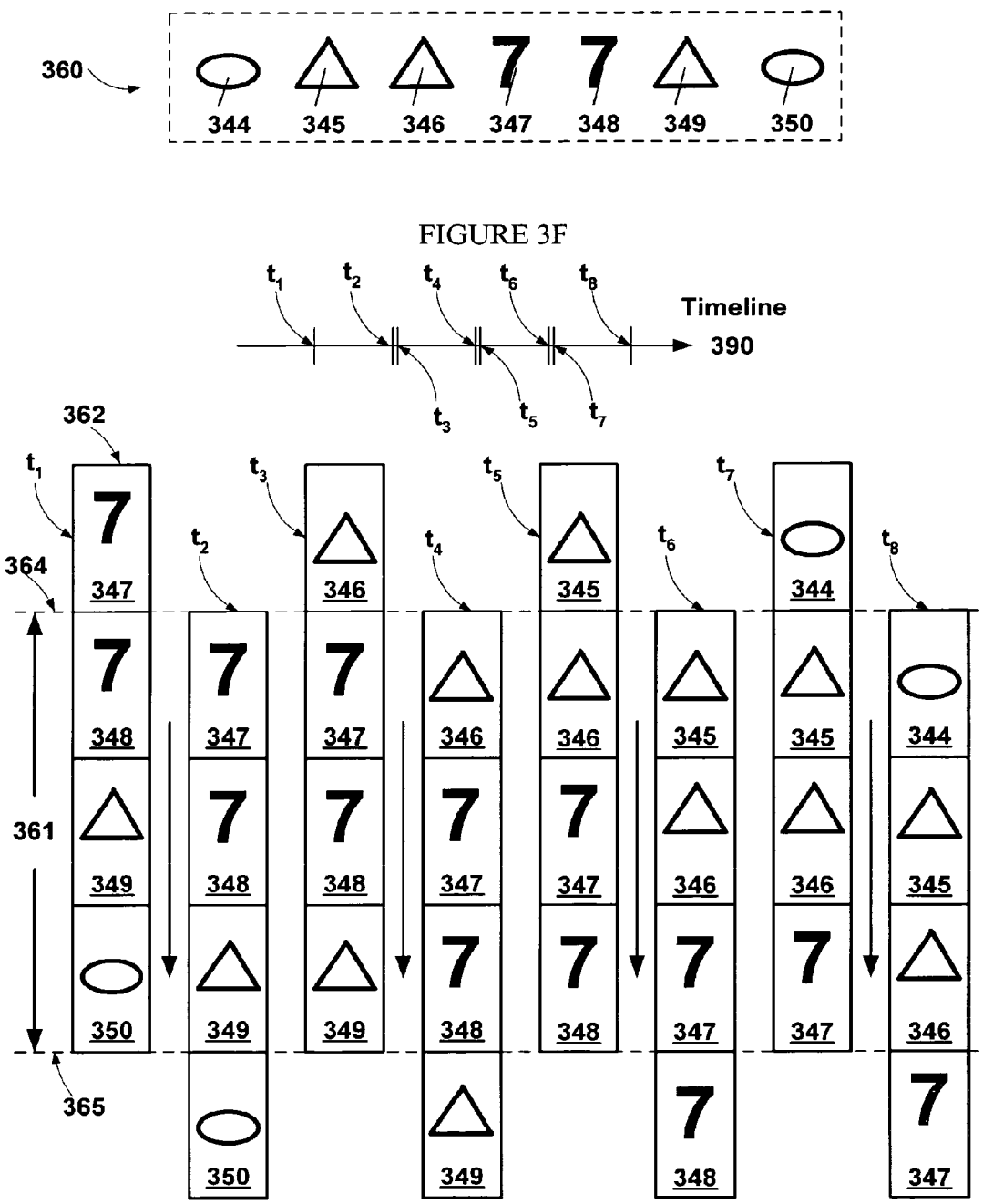
FIGS. 3F-3G are diagrams showing a display of a sequence of symbols from a virtual reel strip using a 3-D object in a 3-D gaming environment.

FIGS. 3F-3G are diagrams showing a display of a sequence of symbols 360 from a virtual reel strip 339 using a 3-D object in a 3-D gaming environment. In FIG. 3F, the sequence of symbols 360 that are to be displayed on a rectangular strip 362 in a 3-D environment are shown. The sequence of symbols 360 comprises seven symbols from segments 344-350 of the virtual reel strip 339. The order of the seven symbols 360 is an oval, a triangle, a triangle, a seven, a seven, a triangle and an oval.

In FIG. 3G, a sequence of movements for a rectangular strip 362 drawn in a 3-D gaming environment and a mapping of symbols from the sequence of symbols 360 as a function of time are described that generate an appearance of cycling through the seven symbols in the sequence 360. The rectangular strip 362 comprises four equal length segments. A virtual camera (not shown) in the 3-D environment captures a portion of the rectangular strip 361 between lines 364 and 365. A portion of the rectangular strip above the line 364 or below the line 365 is not captured by the virtual camera for rendering as part of a game outcome presentation.

The symbols on the rectangular strip are described at eight times, $t_1$, $t_2$, $t_3$, $t_4$, $t_5$, $t_6$, $t_7$ and $t_8$ shown on timeline 390. As shown on the timeline 390, the intervals between times may not be equal. The relative spacing of the times is provided for illustrative purposes only.

At time $t_1$, symbols corresponding to segments 347, 348, 349 and 350 are drawn on the rectangular strip. The seven, triangle and oval are visible at this time. Between times $t_1$ and $t_2$, the rectangular strip 362 is moved in a downward direction as indicated by the arrow. As the strip moves, the seven comes into view and the oval passes out of view. The velocity of the strip 362 may be a constant or may vary with time to provide different movement effects.

Between time $t_2$ and $t_3$, a new set of symbols may be mapped to the rectangular strip 362. The time interval between $t_2$ and $t_3$ may be much smaller than the time interval between times $t_1$ and $t_2$. At time $t_3$, the rectangular strip 362 is drawn with a new set of symbols corresponding to segments 346, 347, 348 and 349. Since symbol 346 is above the line 364, the appearance of the strip 362 that appears on a display screen has not changed. Between times $t_3$ and $t_4$, the rectangular strip is again moved downward. During the movement, the triangle at the bottom of the strip is moved downward and out of view and a triangle appears at the top of the strip and enters into view.

By repeating the re-mapping and the movements described at times $t_1$, $t_2$, $t_3$ and $t_4$, at times $t_5$, $t_6$, $t_7$ and $t_8$, and rendering the visible portion of the rectangular strip to a display screen on the gaming machine, the sequence of symbols 360 may appear to be cycled through on the display of the gaming machine. The movement pattern is not limited to a downward motion. The movements may be specified to be up or down and may vary with time. For instance, the symbols rendered to a display screen on the gaming machine may appear to move downward through a sequence of symbols on a virtual reel strip for a first game of chance and for a second game of chance played after the second game of chance, the symbols may appear to move upward through the sequence of symbols on a virtual reel strip. Over time, the rate of motion and direction of motion may be varied to give the virtual reel strips the appearance of being cocked-up, cocked down, spun-up, spun-down, bounced-up and bounced down.

As described with respect to FIGS. 3A-3B, jumps in the sequence of symbols on the virtual reel strip may be introduced to the mapping of symbols to the rectangular strips 362. In addition, the method of movement described for the rectangular strip 362 may also be applied to a curved strip, such as the cylinder portion described with respect to FIG. 3E. In another embodiment, the method of movement may be applied to a wavy strip (not shown). Further, the method described in FIGS. 3F-3G may be applied to simultaneously display symbols from a plurality of virtual reel strips for a game outcome presentation of a multi-reel video slot game.

Although, the virtual reel strip in FIG. 3G is shown moving in a downward direction, the present invention is not so limited. The virtual reel strips may appear move upwards and downwards in a vertical direction or when the strips are orientated horizontally, the strips may appear to move in either sideways direction. In general, the virtual reel strips may be orientated in any direction and move in either forwards or backwards along a path defined by the virtual reel strip. When a plurality of virtual strips are rendered for a game outcome presentation, the virtual strips may be moved in different directions and with different motion patterns relative to one another.

Figure 4:
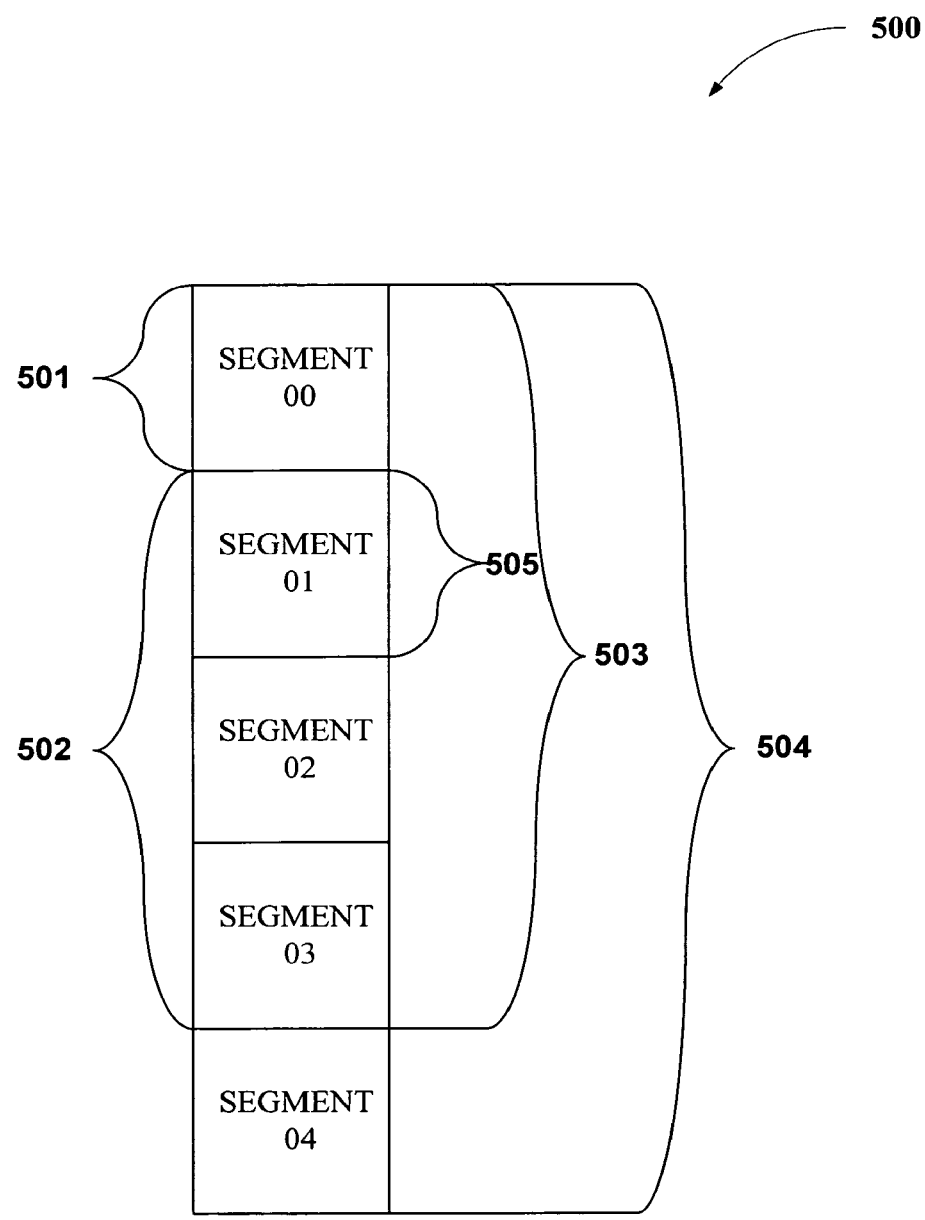
FIG. 4 is a block diagram of a parameterized 3-D model for a flat reel or round reel for one embodiment of this invention.

FIG. 4 is a block diagram of a parameterized 3-D reel model 500 for a flat reel or round reel for one embodiment of this invention. An example of a flat reel model was described with respect to FIG. 3G. An example of a round reel model was described with respect to FIGS. 2, 3D and 3E. By specifying parameters of the 3-D model 500, a flat reel or a round reel object may be created in a 3-D gaming environment of the present invention. The parameters of the 3-D reel model 500 may be specified in a script file allowing a designer to easily change the features of the 3-D reel model 500.

The parameters of the 3-D reel model 500 may include but are not limited to, 1) a total number of segments 504, 2) a number of visible segments 503, 3) a number of touchable segments 502, 4) a home segment 501, and 5) a number of visible segments above a home segment 505. The total number of segments 504 is the number of segments modeled on the 3-D reel model 500. In the example in the FIG. 4, the total number of segments is 5. In the 3-D gaming environment, when 5 total segments are specified, a flat reel, which may be a rectangular strip with 5 segments, or a rounded reel which may be a portion of a cylinder with 5 segments, may be generated. An example of a rectangular strip with four segments was described with respect to FIG. 3F and an example of a cylinder portion with 4 segments was described with respect to FIG. 3D.

In the example in FIG. 4, four visible segments are specified. The number of visible segments 503 may be the number of segments that are rendered by a virtual camera in the 3-D gaming environment. The rendered number of visible segments may be displayed to a video display on the gaming machine as part of a game outcome presentation for a game of chance or a bonus game outcome presentation for a bonus game.

In one embodiment, the 3-D reel model 500 may include a number of touchable segments 502. Three touchable segments are shown in the example in FIG. 4. When displayed on a touch screen video display, the touchable segments 502 may correspond to active areas of the touch screen video display where an input signal may be generated that affect the game outcome presentation. Input received via one of the touchable segments 502 may be used to affect a game outcome presentation using the 3-D reel model 500. For instance, the input 502 may be used to affect the motion of the virtual 3-D reel model 500, such as but not limited to starting the reels to spin, stopping the reels from spinning and affecting the rate at which the reels spin, in the 3-D gaming environment.

The home segment 505 may be the first segment that is used in a payline for the game of chance. In the example in FIG. 4, the home segment is segment 501. The number of visible segments above the home segment 501 is visible segments that may be viewed by the player but are not included in a payline for the game of chance using the reel. Visible segments above the home segment 501 are used to slide new symbols in to view while the 3-D reel model 500 is spinning.

Next, the further details of configuring a 3-D reel model 500 of the present invention are described. First, a 3-D reel model object may be specified and may be assigned a unique ID or name. The 3-D reel model object may be a logical unit that is used by a gaming operating system to generate the reel specified by the 3-D reel model object in the 3-D gaming environment. The 3-D reel model object may be parameterized, as described with respect to FIG. 4, to allow a number of features of the model to be specified.

The ID assigned to the 3-D reel model object may be used for internal reel configuration purposes as well as in communication via sequence events with the game presentation components. Details of the gaming software architecture and gaming operating system including sequence events that may be used with the 3-D reel model object are described in co-pending U.S. application Ser. No. 10/040,329, filed on Jan. 3, 2002, by LeMay, et al., entitled, "Game Development Architecture That Decouples The Game Logic From The Graphics Logic," and U.S. application Ser. No. 10/041,212, filed Jan. 7, 2002, by Breckner, et al, entitled "Decoupling Of The Graphical Presentation Of A Game From The Presentation Logic," each of which is incorporated herein by reference in their entirety and for all purposes.

In two different embodiments, the 3-D reel model object may be specified as a flat or a rounded reel. Although, as previously described with respect to FIGS. 3A-G, the present invention is not limited to these shapes. A "FLAT_MODEL" parameter may be used to specify a flat reel, such as a rectangular strip, and a "ROUND_MODEL" parameter may be used to specify a round reel, such as a cylinder portion. Using either, "FLAT_MODEL" or "ROUND_MODEL," as a parameter for the 3-D reel model object, may specify these two 3-D models. For reels of different shape, a different shape parameter may be employed. For instance, an octagonal-shaped reel may be specified using "OCTAGONAL_MODEL" as an input parameter.

A number of other parameters may be specified in the 3-D reel model object as described as follows. "setNumberOfSymbols (uint32 number_of_symbols)" is a function that allows the number of different symbols used in the model to be specified. The specified number may correspond to the number of symbols configured for each virtual reel strip in a corresponding paytable. "setSymbol (uint32 symbol_index, const char*symbol_file)" is a function that allows a symbol index and bitmap file to be specified for a symbol. There may be one call to "setSymbol ( )" for each unique symbol defined for the virtual reel strip in the paytable. Further, the index parameter may be selected to be consistent with the paytable-defined symbol order.

"setNumberOfSegments (uint32 number_of_segments)" is a function that allows the total number of segments 504 in the reel 3-D model 500 to be specified. "setHomeSegment (uint32 segment_offset)" is a function that allows a home segment 505 for the reel 500 to be specified. The home segment may be the first recognized payable symbol on the reel. "setCentralSegments (uint32 symbol_above_center, uint32 symbol_below_center)" is a function that allows offsets of segments above and below the center of the reel 500 to be specified.

"setVisibleSegments (uint32 visible_segments, uint32 segments_above_home_segment)" is a function that allows the visible segments 503 on the reel 500 to be specified. "setTotalNumberOfSegments (uint32 total_number_of_segments)" is a function that may be used to specify a total number of segments required to configure a complete 360-degree model of the reel 500. For instance, when a cylinder portion is used, this function may be used to specify the number of segments that are needed to complete the cylinder portion. While all segments may not be modeled (i.e., the actual model is just a partial cylinder), this information may be to ensure that the reel spins consistently to the correct stop positions. For instance, the total number of segments may be used to determine a number of degrees spanned by each segment. This information may be used to determine the rotational distance required to rotate through one symbol, which may be employed when specifying movements for the reel.

"setTouchableSegment (const char*segment_piece_name, uint32 offset_to_home_segment)" is a function that allows touchable segments to be specified for the reel 500. This function may bind the name of an invisible model piece to the position of this piece on the reel. The touchable segments may allow a player to stop the reel and an operator to adjust reel stops in the slot evaluation and utility pages by touching the machine's display screen. "setCurrentSpinChain (const char*spin_chain_name)" is a function that allows a script file containing spinning parameters to be specified for the model 500.

The following is an example of reel model script file that may be used to configure a reel model object using the functions and parameters described above. The present invention is not limited to the formatting used below for the reel model script file, which may be programming language specific and operating system specific.

```
// Initialize reel 0
Reel (0 /*Reel to initialize*/)
{
    // Configure parameters of the reel model
    ReelModel (FLAT_MODEL)
    {
        // Initialize the number of reel symbols on this reel
        setNumberOfSymbols (3);
        // Load the Reel symbols
        setSymbol (0, "Images/Reels/Symbol0.tga");
        setSymbol (1, "Images/Reels/Symbol1.tga");
        setSymbol (2, "Images/Reels/Symbol2.tga");
        // Set the number of segments in the reel model
        setNumberOfSegments (4);
        // Set the index of segment the reel uses as its home
        // segment (starts from 0)
        setHomeSegment (1);
        // Set total number of visible segments and number of
        // visible segments above the home segment.
        setVisibleSegments (4, 1);
        // Use the specified model for the reels geometry
        useModel ("Models/Reels/reel.model");
    }
    // Set offsets of segments above and below the center of the reel
    setCentralSegments (1, 3);
    // Set the touchable segments.
    setTouchableSegment ("reel0_segment01", 1);
    setTouchableSegment ("reel0_segment02", 2);
    setTouchableSegment ("reel0_segment03", 3);
    // Set the name of SpinChain to be used for the spinning of this reel
    setCurrentSpinChain ("NormalReelSpin");
}
```

Reel Model Script File

The "setCurrentSpinChain ( )" in the reel model script file may be used to call a movement script file, such as "NormalReelSpin," that specifies movement properties for the reel model 500. In one embodiment, translational or rotational movements may be specified in the movement script file for a flat reel model or round reel model using a series of commands or function calls. The examples of functions specifying different movements is provided for illustrative purposes only and more complex movements may be generated for 3-D objects of the present invention by just defining different commands or functions describing the motions. An example of a movement script file, called "NormalReelSpin" is provided below. This movement script file may be called by the "setCurrentSpinChain( )" function and used as part of generating the movement of the 3-D reel in the 3-D gaming environment.

```
NormalReelSpin
{
    ReelAnimation
    {
        Position
        {
            // Set the spin direction of the reel (FORWARD or BACKWARD)
            setSpinDirection (FORWARD);
            setFrame ("0.0f,  0.0f,   0.0f", 1                );
//delay before COCK_UP
            setFrame ("0.0f,  0.0f,   0.0f", 40, "COCK_UP"    );
            setFrame ("0.0f,  0.12f,  0.0f", 70               );
//delay before COCK_DOWN
            setFrame ("0.0f,  0.12f,  0.0f", 40, "COCK_DOWN"  );
            setFrame ("0.0f,  0.0f,   0.0f", 750,"SPIN"       );
            setFrame ("0.0f, -4.208f, 0.0f", 75, "BOUNCE_DOWN");
            setFrame ("0.0f, -4.265f, 0.0f", 75, "BOUNCE_UP"  );
            setFrame ("0.0f, -4.208f, 0.0f", 0,  "REEL_STOPPED" );
        }
    }
}
```

Movement Script File

The order, number and types of functions called may be varied with the present invention and is not limited to the example provided above. The function, "setSpinDirection ( )", may be used to specify whether the reel spins forwards of backwards. In the movement script file above, the reel spins forward. If the reel is displayed vertically and configured to spin in the forward direction, then the reel will spin from top to bottom. Further, a reel configured to spin in the backward direction will spin from bottom to top.

Frames may be configured as position or rotation frame types. The "setFrame ( )" function may be used to define reel movement data in the 3-D gaming environment. Frame tags may be used to specify which frame corresponds to which reel spinning state. When generating the game of chance using the reel movement script file, the frame tags may be used by other logical units executed on the gaming machine to determine the state of the presentation being generated. An example of frame tags include but are not limited to COCK_UP, COCK_DOWN, SPIN, BOUNCE_DOWN, BOUNCE_UP, and REEL_STOPPED.

In the movement script file example above, the "setFrame( )" function using the frame tag "SPIN" is inside of a position object which may be used to designate that the reel position is being modified. As specified by the "setFrame( )" function, the SPIN state of the reel movement starts at the relative reel position (0.0f, 0.0f, 0.0f) and lasts for 750 ms. The relative reel position (0.0f, −4.208f, 0.0f) is the final position of the SPIN state. This position may be the next frame's initial position.

The "setFrame( )" function with frame tag "BOUNCE_DOWN" starts the BOUNCE_DOWN state of reel movement at the relative reel position (0.0f, 10.52f, 0.0f) and lasts for 75 ms. The BOUNCE_DOWN state may be used to make the reel oscillate in the 3-D gaming environment. The BOUNCE_DOWN state may provide a similar oscillatory motion. The COCK_UP or COCK_DOWN states may be used to define a small upward or downward motion of the reel prior to beginning or ending its movement. REEL_STOPPED state may be used to generate the final position of the reel in the 3-D gaming environment.

The order, number and types of functions called may be varied with the present invention and is not limited to the example provided above. For example, multiple "setFrame( )" functions describing the "SPIN" state to provide different rates of spinning, such as but not limited to 1) a SPIN-UP state where the reel starts spinning or translating from a resting position and reaches a constant angular or translation velocity (in this state, the velocity may vary with time), 2) a SPIN state, as described above, which allows for a constant angular velocity or translation velocity, and 3) a SPIN-DOWN state where the reels transitions from a constant angular or translational velocity to a resting state (in this state, the velocity may vary with time). The velocity of spin may be changed using additional "setFrame ( )" functions in the motion script.

Using movement script file or other logic on the gaming machine, a constant number of symbols to be displayed during the movement of the reels may be specified. For instance, with knowledge of a length of a segment on the 3-D reel model used to display a symbol, the "setFrame( )" function may be used to move the 3-D model such that a constant number of symbols are displayed during the game outcome presentation. This allows the length of the game outcome presentation to be pre-determined. Jumps in the sequence of symbols defined by the virtual reel strip may be required when the final position of the virtual reel strip requires a movement through a number of symbols on the strip that is greater than the specified constant number of symbols. Game logic may be included with the gaming machine to determine the required jump length, which may vary from game outcome presentation to game outcome presentation depending on the initial location on the virtual reel strip and a final location on the virtual reel strip.

In some embodiments, the gaming machine may be capable of receiving inputs that allow the reels to be stopped by a player. Therefore, the reels may not move through the specified constant number of symbols but may move through a number of symbols that is lower than the specified constant number of symbols. Therefore, when the reels are stopped prior to reaching the specified constant number of symbols, game logic may be included on the gaming machine that allows for the generation of a new sequence of symbols to be displayed, such as a jump to a new position on the virtual reel strip.

An advantage of using parameterized models, such as the script files described above, is reduced software development costs. In the gaming industry, due to reliability and regulatory requirements, a huge amount of effort and cost is accrued in the code development process. Any code that is used to generate a game of chance typically has to be approved by a regulatory agency. Anytime reliable software that has been approved by a regulatory agency, such as a gaming jurisdiction, can be re-used, the software development costs are lowered. By implementing models that are parameterized, features of the game outcome presentation can be changed without changing the underlying code, which would require a re-approval, by the gaming regulatory agency. Thus, the methods described herein can provide reduced software development costs.

FIGS. 5A-5B are a perspective drawing of a 3-D wheel model and 3-D sphere used to display symbols on a virtual reel strip of the present invention. In FIG. 5A, the 3-D wheel 514 is a cylinder and is generated in a 3-D gaming environment 510. The 3-D wheel is divided into 12 sections on the top 511 and mapped to 12 symbols from a virtual reel strip with segments 543 through 554. The 3-D wheel 514 may be divided into a larger number of sections or a smaller number of sections. The odds of the 3-D wheel 514 stopping at a particular position and symbol may be defined in a corresponding paytable. The 3-D wheel 514 may be used as part of game outcome presentation for a game of chance, a bonus game or combinations thereof where an award may be based upon a position of the wheel.

The 3-D wheel 514 may translate in 3 dimensions in the 3-D gaming environment 510 according to the general 3-D curve 512. The 3-D curve may be defined in a movement script file, as described with respect to FIG. 4, or in other formats that provide the necessary data to generate the 3-D curve 512 and allow the 3-D wheel 514 to move along it. While moving along the 3-D curve 512, the 3-D wheel 514 may also rotate around axis 511 and axis 513 according to a specified rotation profile as a function of time for each axis. Again, the rotational motion may be provided in a movement script file. In general, a plurality of different axis' may be defined for rotational movement in the 3-D gaming environment.

In one embodiment, the top 520 and bottom 521 of the 3-D wheel 524 may be mapped to a virtual reel strip. For example, the 3-D wheel may be flipped like a coin to convey a 50-50 probability of a game outcome for a virtual reel strip with two segments and two associated symbols. In another example, the 3-D wheel 514 may spin around axis 513 like a shooting target. A game player playing the gaming machine may initiate the shot at the target. When the 3-D wheel 514 is shot, it may spin around axis 513 and then stop with either a top side 520 or a bottom side 521 facing towards a virtual camera where the top side and the bottom side display different symbols. Based upon which symbol is facing toward the virtual camera when the 3-D object stops spinning, an award may be made in a game outcome presentation for a game of chance or a bonus game. A plurality of the 3-D wheels spun in this manner may be used in a shooting gallery bonus game where combinations of symbols provide the basis for presenting a game outcome.

In another embodiment, the top 520, the bottom 521 and the side of the 3-D wheel may be mapped to a virtual reel strip. For instance, the 3-D wheel may rotate around axis 511 to display the symbols on the top 520 of the 3-D wheel 514 captured by a virtual camera in the 3-D gaming environment, then flip to its side to display symbols one the edge of the 3-D wheel 514, and then flip to the bottom to display symbols displayed on the bottom 521 of the wheel. The number of segments on the top 520 and the bottom 521 of wheel 514 do not necessarily have to be equal. When the 3-D wheel 514 has cycled through the top, side and bottom, then the pattern of motion may be repeated until the 3-D wheel stop at a particular position. The mapping of virtual reel strip to different surfaces of a 3-D object and then proscribing a motion to the 3-D object that displays the symbols in an order that displays all of the symbols according to the order defined to virtual reel strip may be applied to many different types of 3-D shapes and is not limited to the 3-D wheel shape 514 shown in the figure.

In FIG. 5B, a sphere 519 is generated in a 3-D gaming environment 510. The sphere 519 is divided into 12 sections and mapped to 12 symbols from a virtual reel strip with segments 543 through 554. Only segments 544-549 from the virtual reel strip are visible. The sphere may be divided into a larger number of sections or a smaller number of sections. The odds of the sphere 514 stopping at a particular position and symbol that is captured by a virtual camera in the 3-D gaming environment 510 may be defined in a corresponding paytable. The sphere 519 may be used as part of game outcome presentation for a game of chance, a bonus game or combinations thereof where an award may be based upon a position of the wheel.

The sphere 519 may translate in 3 dimensions in the 3-D gaming environment 510 by traveling along the general 3-D curve 517. The 3-D curve 517 may be defined in a movement script file, as described with respect to FIG. 4, or in other formats that provide the necessary data to generate the 3-D curve 512. In FIG. 5B, the curve 517 is defined to provide a bouncing motion for the sphere 519. While moving along the 3-D curve, the 3-D wheel 514 may also rotate around axis 516 and axis 518 according to a specified rotation profile as a function of time for movements about each axis. Again, the rotational motion may be provided in a movement script file. In general, a plurality of different axis' may be defined for rotational movement in the 3-D gaming environment.

As described with respect to FIGS. 3A-3B, a cylinder portion may be used to display symbols from a virtual reel strip. For instance, a virtual camera may be positioned above the top 520 of the 3-D wheel 514, such that only segments 554, 543, 544 are visible and the cylinder is a slice containing segments 353, 354, 343, 344. By rotating the cylinder through a rotation around axis 511 comprising only 1 segment at a time and then redrawing the cylinder at its initial position, then re-mapping the symbols to the cylinder segments, the cylinder portion may be used to cycle through a virtual reel strip. A similar approach may be employed for the sphere where a virtual camera is positioned in the 3-D gaming environment 510 such that the camera only captures one side of the sphere. Therefore, it may not be necessary to render the backside of the sphere in the 3-D gaming environment.

FIGS. 6A-6B are diagrams of two 3-D virtual gaming environments used to display symbols on virtual reel strips that may be used in a game outcome presentation for a game of chance or a bonus game. In one embodiment of the present invention, a virtual reel strip may be mapped to a plurality of 3-D objects in a 3-D gaming environment that move in a prescribed pattern of motion. For example, in FIG. 6A, a plurality of rectangular objects move in a cyclical manner out of tunnel 581 and into tunnel 582 along conveyor belts 583 in a clockwise manner in the gaming environment 580. The rectangular boxes and conveyor belts may be set in a mine or a factory. The rectangular boxes include symbols from segments 344-352 of virtual reel strip 339 in FIG. 3A. As the rectangular boxes move in and out of the tunnels, a sequence of symbols defined by the virtual reel strip 339 may be mapped to the rectangular boxes such that the symbols on the virtual reel strip are sequentially displayed.

The conveyor belts may start from a resting position, speed up, move at a constant speed and slow down to a final position. When the conveyor belts are at rest, the initial sequence of symbols displayed on the rectangular boxes may correspond to a first sequence of symbols from the virtual reel strip. Using a paytable corresponding to the reel strip, a final position on the virtual reel strip may be selected that allows a second sequence of symbols displayed on the rectangular to be generated. Next, the conveyor belts may rotate and symbols may be mapped to the rectangular boxes until the second sequence of symbols is generated on the plurality of boxes. The conveyor belts may rotate fast enough so that the symbols are not readable on the rectangular boxes allowing for jumps in the sequence of symbols defining the virtual reel strip.

As with the reel models described with respect to FIGS. 3A-3F and 4, variable rates of motion and directions of motions may be specified for the conveyor belts 583. Further, the gaming machine may be capable of receiving inputs from a player that allows the conveyor belts to start spinning and stop spinning. One or more positions where the conveyor belts are located may be used to indicate awards. For instance, an award may be indicated by the symbol on the rectangular box that stops at the position of box 348. The 3-D objects in the 3-D gaming environment 580 may be rendered to a display screen of the gaming machine as part of a game outcome presentation for a game of chance or a bonus game.

In FIG. 6B, another embodiment of the present invention is described where a sequence of symbols defined by three virtual reel strips are mapped to a plurality of moving objects in a virtual gaming environment 450. In FIG. 6B, three streams of symbols flow from floodgates of a dam. The dam, the symbols, the water and scenery may be modeled as 3-D objects in the 3-D gaming environment 450 and may be rendered to a display screen of the gaming machine as part of game outcome presentation for a game of chance or a bonus game. Each stream carries symbols mapped from a separate virtual reel strip. The first stream displays symbols corresponding to segments 343-348 of a first virtual reel strip 339, the second stream displays symbols corresponding to segments 451-456 from a second virtual reel strip and the third stream displays symbols corresponding to segments 551-556 from a third virtual reel strip.

A payline 460 defines a combination of symbols from the three streams. Multiple paylines are possible with the present invention and it is not limited to a single payline. Using a paytable, a final combination of symbols displayed at the payline 460 may be determined.

When the game is initiated, the floodgates may be closed and no water may be flowing. The symbols may rest on ledges on the dam and on the ground below the dam. When the game is initiated, the flow gates may open and water-carrying symbols down the dam and into the water below dam may begin to flow. The water may flow faster or slower and at different rates analogous to the reels spinning faster or slower as described with respect to FIG. 4. As the symbols representing the final combination approach the payline, the floodgates may close cutting off the water and the final combination of symbols, as determined from the paytable for the game, may come to rest on the payline 460. Then, an award for the final combination may be indicated.

The present invention is not limited to the two scenarios described above for mapping symbols to a sequence of objects generated in a 3-D gaming environment. Many different types of 3-D objects may be used for the sequence of objects. Further, many different types of themes, other than the mine, factory or dam as described in FIGS. 6A and 6B, may be used as backgrounds for a sequence of objects used to display a sequence of symbols from a virtual reel strip and the present invention is not limited to the examples described in the figures.

In FIG. 6C, the display of virtual reel strips in a 3-D gaming environment 700 is further generalized. This example is provided for illustrative purposes only and the present invention is not so limited. In the figure, objects with symbols from three virtual reel strips are shown originating from three object sources 705, 710 and 715. The symbols may be drawn on the front face of a 3-D rectangle so that they are visible to a user when rendered to the display screen, although, any general 3-D shape in which the symbols are visible when rendered may be used as objects including essentially 2-D objects with a minimal thickness.

The solid lines with arrows illustrate the trajectories of the objects in the 3-D gaming environment 700. In general, an object's trajectory may be any 3-D curve through the 3-D gaming environment 700. Further details of generating object trajectories in a 3-D environment including collisions is described in co-pending U.S. application Ser. No. 10/187, 343, filed on Jun. 27, 2002, by Brosnan et al. and titled, "Trajectory Based 3-D Games of Chance for Video Gaming Machines," which is incorporated herein in its entirety and for all purposes.

The rectangular boxes with the symbols move through the space of 3-D gaming environment 700. When the boxes pass near or through the circle 706, some are captured and land at 9 designated spots on a plane including the circle 706. Boxes with symbols, 455, 453, 344, 346, 553 and 554 occupy six of the designated spots. Three of the designated spots, 701, 702 and 703 are unoccupied.

Objects may emerge from the object sources, at various time intervals. The order of symbols drawn on the 3-D objects as they emerge from each of the object sources, 705, 710 and 715, may be determined from a virtual reel strip as previously described with respect to FIGS. 3A-3G. The symbol drawn on each object that will land on one of the nine spots may be pre-determined using a pay-table and a random number generator in the same manner as a video slot game. The trajectories of the 3-D objects may be selected so that the objects with the pre-determined symbols land on the designated spots, such as 701, 702 and 703.

Other objects that do not correspond to the pre-determined symbols are given trajectories that fly past the designated spots. The 3-D objects that do not land on a designated spot may appear to fly off the screen or collide with other symbols and be destroyed. For example, an object with symbol 552 that originated at object source 705 appears to collide at location 720 with an object with symbol 456 that emerged from object source 715. In another embodiment, the objects may bounce off of one another after a collision and then fly off the screen.

In FIG. 6C, one object source 705 is located so that the objects originating from the object source 705 appear to be off in the distance when they are rendered. The objects from this source may appear to grow larger as they approach the circle 706. For instance, the box with symbol 451 from source 705 may increase in size as it approaches the designated spot 703.

The other two object sources 710 and 715 are located so that the objects originating from them appear to be closer when rendered and viewed on the display screen. As these objects, approach the circle 706 and move off into the distance they may appear to shrink in size. In one embodiment, the object sources may be located so that they are not apparent when rendered to the display as part of a game outcome presentation. In a particular embodiment, the object sources and the trajectory of the objects may be located in a single plane, such as a plane parallel to the view of the display screen. Thus, when the plane is parallel to the view of the display screen, the objects may not appear to shrink or grow in size and may appear to remain at the same distance when rendered to the display screen.

When all of the nine spots are filled, the nine symbols on the rectangular boxes in the designated spots may be used to indicate an award based on various combinations of symbols along a payline, such as payline 460. The combinations of symbols and pay-offs for each combination may be derived and in analogous manner to a combination of symbols used in a slot game with 3 reels. For example, the positions of symbols, 455, 453 and 451 may correspond to three symbols visible on a reel strip connected to a mechanical slot reel in a gaming machine and the other two columns may correspond to symbols that would be displayed on two additional slot reels. In other embodiments, symbol combinations may be derived from 5 reel slot games or other multi-reel slot games may be used.

In particular, the object sources are not limited to a particular location in the 3-D gaming environment and their location may vary with time. Further, one or more object sources may be used and the number of object sources may change with time. For example, objects with symbols mapped from three different virtual reel strips may appear to stream from object source 705. As another example, each of three virtual reel strips may be mapped to one of the corresponding object sources, 705, 710 and 715. In another embodiment, the object source may appear to be an object rather than a point in space. For instance, object source 705 may be drawn as a spinning reel with symbols. Rectangular boxes with the symbols may appear to be thrown off the wheel. These symbols may land at the designated spots or fly by the designated spots and off the screen.

In a particular embodiment, the rectangular boxes may be stacked to form columns. For instance, three games where 9 rectangular boxes are generated in each game may be stacked to form 9 columns each with three boxes. One column with three boxes with respective symbols 553, 555, 556 is shown in the figure. The symbols on the stacked boxes may be used to generate vertical paylines, such as 730. In one embodiment, the outcomes from three games may be linked where the combination of symbols on a vertical payline may be used as bonus multipliers or to provide additional win opportunities.

In another embodiment, the columns may be built unevenly. For instance, a vertical column may only be created when certain symbols appear on a box and land on top of a stack of one or more boxes. Boxes with these "growth" symbols may appear at random and at different positions. Thus, the height of each column may be variable. When a column reaches a certain height, a bonus or an additional award may be won. Additionally, in a particular embodiment, boxes with other symbols may appear that knock over a column. In this case, an award or bonus is only awarded if a column reaches a set height before toppling. In this example, the bottom of each stack may correspond to the current game being played. Boxes for the current game may knock out the boxes at the bottom of each stack from the previous game with or without knocking over any stacks that are two or more boxes high.

In FIGS. 6A-6C, methods of displaying symbols from a virtual reel strip in a 3-D gaming environment are described. In a traditional video slot game, the symbols on each real are drawn in two-dimensions. The symbols on each "reel" enter the screen from the top, travel in a straight vertical line and exit at the bottom. The present invention is not so limited. As described above, the entrance and exit points on the screen are not limited to a fixed spot on the top and bottom of the screen and may vary with time. Further, the number of entrance points may be varied. In addition, the symbols may be moved along linear and non-linear paths that vary with time and where symbols paths may be non-linear. Further, because the symbols are drawn in a 3-D gaming environment, the symbols, when rendered to the display screen, may appear to grow or shrink as if they were moving off into the distance or moving closer.

An advantage of these methods is that a more variable game outcome presentation may be provided to the user while utilizing paytables and symbols combinations derived for multi-reel video slot games. The variable game outcome presentations may be more interesting to a player over time and encourage additional game play. The ability to use paytables and symbol combinations derived for multi-reel video slot games may reduce software development costs for the game of chance.

Turning to FIG. 7, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, plasma/LED display or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor.

Typically, after a player has initiated a game on the gaming machine, the main display monitor 34 and the second display monitor 42 visually display a game presentation, including one or more bonus games, controlled by a master gaming controller (not shown). The bonus game may be included as a supplement to the primary game outcome presentation on the gaming machine 2. The video component of the game presentation consists of a sequence of frames refreshed at a sufficient rate on at least one of the displays, 34 and 42, such that it appears as a continuous presentation to the player playing the game on the gaming machine. Each frame rendered in 2-D on display 34 and/or 42 may correspond to a virtual camera view in a 3-D virtual gaming environment stored in a memory device on gaming machine 2.

One or more video frames of the sequence of frames used in the game presentation may be captured and stored in a memory device located on the gaming machine. The one or more frames may be used to provide a game history of activities that have occurred on the gaming machine 2. Details of frame capture for game history applications are provided co-pending U.S. application Ser. No. 09/689,498, filed on Oct. 11, 2000 by LeMay, et al., entitled, "Frame Buffer Capture of Actual Game Play," which is incorporated herein in its entirety and for all purposes.

Returning to the gaming machine in FIG. 7, the information panel 36 may be a back-lit, silk screened glass panel with lettering to indicate general game information including, for example, the denomination of bills accepted by the gaming machine (e.g. $1, $20, and $100). The bill validator 30, player-input switches 32, video display monitor 34, and information panel are devices used to play a game on the game machine 2. The devices are controlled by the master gaming controller (not shown), which is located inside the main cabinet 4 of the machine 2.

In the example, shown in FIG. 7, the top box 6 houses a number of devices, which may be used to input player tracking information or other player identification information into the gaming machine 2, including the bill validator 30 which may read bar-coded tickets 20, a key pad 22, a florescent display 16, and a camera 44, and a card reader 24 for entering a magnetic striped cards or smart cards. The camera 44 may be used to generate player images that are integrated into a virtual gaming environment implemented on the gaming machine. The keypad 22, the florescent display 16 and the card reader 24 may be used to enter and display player-tracking information. In addition, other input devices besides those described above may be used to enter player identification information including a finger print recording device or a retina scanner. Methods and apparatus for capturing a player's image to a video frame is described in co-pending U.S. patent application Ser. No. 09/689,498, by LeMay et al. filed on Oct. 11, 2000 and titled "Frame Buffer Capture of Actual Game Play" is incorporated herein in its entirety and for all purposes.

In addition to the devices described above, the top box 6 may contain different or additional devices than those shown in the FIG. 7. For example, the top box may contain a bonus wheel or a backlit silk-screened panel, which may be used to add bonus features to the game being played on the gaming machine. During a game, these devices are controlled and powered, in part, by the master gaming controller circuitry (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 7, when a user selects a gaming machine 2, he or she inserts cash through the coin acceptor 28 or bill validator 30. Additionally, the bill validator may accept a printed ticket voucher, which may be accepted by the bill validator 30 as an indicia of credit. Once cash or credit has been accepted by the gaming machine, it may be used to play a game on the gaming machine. Typically, the player may use all or part of the cash entered or credit into the gaming machine to make a wager on a game play. During the course of a game, a player may be required to make a number of decisions, which affect the outcome of the game. For example, a player may vary his or her wager, select a prize, or make game-time decisions, which affect the game play. These choices may be selected using the player-input switches 32, the main video display screen 34 or using some other device which enables a player to input information into the gaming machine including a key pad, a touch screen, a mouse, a joy stick, a microphone and a track ball.

Using input devices such as but not limited to the player-input switches 32, the main video display screen 34 or using some other device which enables a player to input information into the gaming machine including a key pad, a touch screen, a mouse, a joy stick, a microphone and a track ball, properties of 3-D objects in the 3-D gaming environment and thus, the corresponding presentation of these 3-D objects rendered to one or more of the display screens on the gaming machine may be altered. For instance, in 3-D gaming environment with a rotating object, such as but not limited to rotating reel, rotating wheel, rotating reel segment, or a rotating sphere, the gaming machine may be capable of receiving input via one of the input devices, that starts an object spinning, stops an object spinning or affects a rotation rate of the object. In another example, the gaming machine may be capable of receiving input via one or more input devices, that initiates translational movement in one or more 3-D objects in the 3-D gaming environment, stop translational movement or affects a rate of translation movement.

In general, the gaming machine may be capable of receiving input information for controlling a plurality motion parameters for 3-D objects in the gaming environment. The motion parameters may vary depending upon degrees of movement freedom modeled for a particular 3-D object. The input information may be used to alter a game outcome presentation, a bonus game outcome presentation or any other type of presentation generated on the gaming machine.

In some embodiments, to change the format of a game outcome presentation on the gaming machine or to utilize different gaming machine functions, the player may use an input device on the gaming machine to control a virtual camera in a virtual gaming environment implemented on the gaming machine. For instance, a player may use the virtual camera to "zoom in" or "expand on demand" a portion of the virtual gaming environment such as one poker hand of a hundred poker hands displayed on display screen 34. In another example, the game player may alter the game outcome presentation, such as the view or perspective of the game outcome presentation, by controlling the virtual camera. In yet another example, the player may be able to select a type of game for game play on the gaming machine, select a gaming environment in which a game is played, receive casino information or obtain various casino services, such as dinner reservations and entertainment reservations, by navigating through a virtual casino implemented on the gaming machine. The virtual casino may correspond to the actual casino where the gaming machine is located. Thus, the virtual casino may be used to give the player directions to other portions of the casino.

In other embodiments of the present invention, CAD/CAM models of the gaming machine 2 may be used to generate a virtual 3-D model of the gaming machine. The virtual 3-D model may be used to visually demonstrate various operating features of the gaming machine 2. For instance, when a player-tracking card is inserted incorrectly in the card reader 24, the virtual 3-D model of the gaming machine may be used to display a visual sequence of the card being removed from the card reader 24, flipped over and correctly inserted into the card reader 24. In another example, a visual sequence showing a player inputting an input code on the keypad 22 may be used to prompt and show the player how to enter the information. In another example, when the gaming machine 2 is expecting an input from the player using one of the player input switches 32, the virtual 3-D model of the gaming machine may be used to display a visual sequence of the correct button on the gaming machine being depressed. In yet another example, the manner in which a bill or ticket is inserted into the bill validator may be shown to the player using a sequence of photographs generated from the 3-D model.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. The ability of a player to control a virtual camera in a virtual gaming environment to change the game outcome presentation may also add to the excitement of the game. After the player has completed a game, the player may receive game tokens from the coin tray 38 or the ticket 20 from the printer 18, which may be used for further games or to redeem a prize.

FIG. 8 is a flow chart depicting a method for generating a game outcome presentation from a virtual gaming environment. In 600, after receiving a wager for one or more games played on a gaming machine, an input signal is received on the gaming machine to initiate a game of chance. The input signal may be input by a player using a various input devices available on the gaming machine, such as input buttons and a touch screen. In 602, one or more game outcomes are determined for the one or more games initiated by the game player. Typically, a game outcome is determined by generating one or more random numbers and comparing the numbers with a paytable stored on the gaming machine.

In 603, based upon the one or more game outcomes determined in 602, one or more game outcome presentations are rendered in a 3-D virtual gaming environment in the gaming machine. In 604, at least one virtual camera in the 3-D gaming environment is used to render a sequence of 2-D projection surfaces (e.g. images) derived from three-dimensional coordinates of surfaces in the 3-D gaming environment. As described with reference to FIG. 2, the position of the virtual camera may vary with time. In 606, the sequence of rendered 2-D projection surfaces is displayed to one or more game display screens on the gaming machine as part of a game outcome presentation or a bonus game presentation. In 608, the game outcome (e.g. an amount awarded for one or more games) is displayed to the display screen. The method described above is not limited to game outcome presentations. Other types of gaming information such as attract mode presentations, maintenance operation information, game operation information and casino information may be generated in a 3-D virtual gaming environment and displayed to a display screen on the gaming machine. Further, transition screens that allow a smooth transition between different gaming presentations may also be generated and displayed on the display screen. For instance, a transition screen may be generated to for a display a smooth transition between a game outcome presentation and a bonus game.

FIG. 9 is a flow chart depicting a method for generating a game presentation using a virtual reel strip in a 3-D virtual gaming environment. In 610, a final state on or more virtual reel strips is determined. The final state may be generated from a paytable as part of a game outcome presentation 602, as described in FIG. 8. In 612, a master gaming controller on the gaming machine may determine a sequence of symbols to display from the one or more virtual reel strips. The sequence of symbols may comprise all or a portion of the symbols between an initial state on the virtual reel strip and the final state on the virtual strip defined for the virtual reel strip.

As described with respect to FIGS. 3A-3G and 4, when displaying symbols from the virtual reel strip, the present invention may allow for one or more jumps between a first location on the virtual reel strip to a second location on the virtual reel strip. For the jump, the sequence of symbols on the virtual reel strip between the first location and the second location may not be displayed. However, the missing symbols in the sequence may not be noticeable in a rendering of the 3-D gaming environment displaying the symbols because the motion of the symbols may be too fast to allow a viewer of the symbols to determine which symbols are actually displayed.

In 614, the sequence of symbols for each virtual reel strip may be mapped to one or more surfaces on 3-D objects in the 3-D gaming environment. For instance, the sequence of symbols in 612 may be mapped to a single flat reel or single round reel which moves in a manner that allows the sequence of symbols to be displayed, as described with respect to FIGS. 2, 3A-3G, 4, 5A and 5B. As another example, the sequence of symbols from a virtual strip in 612 may be mapped to a sequence of 3-D objects that move in the 3-D gaming environment, such as the two examples described with respect 6A and 6B.

In 616, a motion of the one or more 3-D surfaces that allows the sequence of symbols to be displayed may be determined. For instance, when the symbols are displayed on a rounded reel in the 3-D gaming environment, the angle to rotate the reel through and the rate of rotation for the rounded reel may be determined. The motion of the 3-D objects may be affected by input received through one or more input devices on the gaming machine. For instance, based upon player input, a generated reel may spin faster or slower. In 618, the determined motion of the 3-D surfaces in 616 with the mapped symbols from 614 are generated. As described with respect to 604 and 606 in FIG. 8, a sequence of two-dimensional projection surfaces rendered from the 3-D surfaces in the 3-D gaming environment may be displayed to the display screen as part of a game outcome presentation.

In 620, a stop command may be received to stop the game outcome presentation. For instance, as described with respect to FIG. 4, a reel generated in the 3-D gaming environment may include one or more touchable segments that allow the reel to be stopped in response to an input received on a touch screen on the gaming machine. In 620, when a stop command is received, a new sequence of symbols to display may be determined in 612 and then 614, 616 and 618 may be repeated. When a stop command is not received, in 624, the final state of the 3-D surfaces in the 3-D gaming environment may be generated and rendered to the display screen. The final state of the 3-D surfaces may include a combination of symbols that correspond to a determined game outcome for the game of chance.

FIG. 10 is a block diagrams of gaming machines that utilize distributed gaming software and distributed processors to generate a game of chance for one embodiment of the present invention. A master gaming controller 250 is used to present one or more games on the gaming machines 61, 62 and 63. The master gaming controller 250 executes a number of gaming software modules to operate gaming devices 70, such as coin hoppers, bill validators, coin acceptors, speakers, printers, lights, displays (e.g. 34) and other input/output mechanisms (see FIGS. 13 and 14). The master gaming controller 250 may also execute gaming software enabling communications with gaming devices located outside of the gaming machines 61, 62 and 63, such as player tracking servers, bonus game servers, game servers and progressive game servers. In some embodiments, communications with devices located outside of the gaming machines may be performed using the main communication board 252 and network connections 71. The network connections 71 may allow communications with remote gaming devices via a local area network, an intranet, the Internet or combinations thereof.

The gaming machines 61, 62 and 63 may use gaming software modules to generate a game of chance that may be distributed between local file storage devices and remote file storage devices. For example, to play a game of chance on gaming machine 61, the master gaming controller may load gaming software modules into RAM 56 that may be may be located in 1) a file storage device 251 on gaming machine 61, 2) a remote file storage device 81, 2) a remote file storage device 82, 3) a game server 90, 4) a file storage device 251 on gaming machine 62, 5) a file storage device 251 on gaming machine 63, or 6) combinations thereof. The gaming software modules may include script files, data files and 3-D models used to generate 3-D objects in the 3-D gaming environments of the present invention. In one embodiment of the present invention, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof. For both security and regulatory purposes, gaming software executed on the gaming machines 61, 62 and 63 by the master gaming controllers 250 may be regularly verified by comparing software stored in RAM 56 for execution on the gaming machines with certified copies of the software stored on the gaming machine (e.g. files may be stored on file storage device 251), accessible to the gaming machine via a remote communication connection (e.g., 81, 82 and 90) or combinations thereof.

The game server 90 may be a repository for game software modules and software for other game services provided on the gaming machines 61, 62 and 63. In one embodiment of the present invention, the gaming machines 61, 62 and 63 may download game software modules from the game server 90 to a local file storage device to play a game of chance or the game server may initiate the download. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. In another example, the game server might also be a dedicated computer or a service running on a server with other application programs.

In one embodiment of the present invention, the processors used to generate a game of chance may be distributed among different machines. For instance, the game flow logic to play a game of chance may be executed on game server 92 by processor 90 while the master gaming controller 250 may execute the game presentation logic on gaming machines 61, 62 and 63. The gaming operating systems on gaming machines 61, 62 and 63 and the game server 90 may allow gaming events to be communicated between different gaming software modules executing on different gaming machines via defined APIs. Thus, a game flow software module executed on game server 92 may send gaming events to a game presentation software module executed on gaming machine 61, 62 or 63 to control the play of a game of chance or to control the play of a bonus game of chance presented on gaming machines 61, 62 and 63. As another example, the gaming machines 61, 62 and 63 may send gaming events to one another via network connection 71 to control the play of a shared bonus game played simultaneously on the different gaming machines or in general to affect the game play on another machine.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box or a secondary display. Both of these types of gaming machines may be modeled in a virtual gaming environment stored on a gaming machine.

What is claimed is:

1. In a gaming machine including a master gaming controller, a display device and a memory device, a method of generating a game of chance, the method comprising:

receiving a wager for the game of chance controlled by the master gaming controller on the gaming machine wherein the gaming machine is capable of receiving indicia of credit for the wager from an input device coupled to the gaming machine and outputting indicia of credit from an output device coupled to the gaming machine;

determining a game outcome for the game of chance by randomly selecting, one or more times, for each of a plurality of virtual reel strips, each virtual reel strip comprising a sequence of indices, an index from the sequence of indices, the index being representative of a final state of the virtual reel strip;

for each index selected, associating a portion of the sequence of indices with one or more three-dimensional (3-D) objects in a 3-D gaming environment wherein the portion of indices includes the selected index;

mapping a set of symbols to the sequence of indices and drawing the symbols on one or more of the 3-D objects in the 3-D gaming environment; said drawing comprising:

i) selecting a first subset of symbols from the set of symbols;

ii) drawing the first subset of symbols on a surface of the one or more of the 3-D objects;

iii) moving the surface, including the first subset of symbols, from a first position to a second position in the 3-D gaming environment;

iv) selecting a second subset of symbols from the set of symbols;

v) drawing the second set of symbols the surface; and vi) moving the surface including the second subset of symbols from the first position to the second position in the 3-D gaming environment; wherein the first subset and the second subset are defined so that when a plurality of 2-D images are rendered from the 3-D gaming environment to capture the movements of the surface, the symbols, as viewed on the display screen, appear to enter and to leave the display screen in an order specified by the sequence of symbols determined for each virtual reel strip;

rendering one or more two-dimensional (2-D) images derived from the one or more 3-D objects and the three-dimensional gaming environment as a game outcome presentation for the game of chance wherein information used to generate the one or more 3-D objects and the 3-D gaming environment is stored in the memory device on the gaming machine; and displaying the one or more rendered 2-D images to the display device on the gaming machine wherein the 2-D images display the portion of the indices.

2. The method of claim 1, wherein a combination of at least three indices is generated as the game outcome by randomly selecting i) a first index from a first sequence of indices, ii) a second index from a second sequence of indices and iii) a third index from a third sequence of indices.

3. The method of claim 1, wherein a combination of 5 indices is generated as the game outcome by randomly selecting i) a first index from a first sequence of indices, ii) a second index from a second sequence of indices, iii) a third index from a third sequence of indices, iv) a fourth index from a fourth sequence of indices and v) a fifth index from a fifth sequence of indices.

4. The method of claim 1, wherein the game of chance is a video slot game.

5. The method of claim 1, wherein the sequence of indices comprises two or more different types of indices.

6. The method of claim of 1, further comprising:
determining a motion of the one or more 3-D objects in the gaming environment; and
applying the determined motion to the one or more 3-D objects in the 3-D gaming environment.

7. The method of claim 1, wherein a first 3-D object of the one or more 3-D objects is at least one of a 2-D rectangle or a box in the 3-D gaming environment and the portion of the indices is drawn on at least one surface of the rectangle or the box.

8. The method of claim 1, wherein a first 3-D object of the one or more 3-D objects is at least one of a portion of a cylinder or a curved 2-D surface and the portion of the indices is drawn on at least one surface of the cylinder portion or the curved 2-D surface.

9. The method of claim 1, wherein each index in the portion of the indices is displayed sequentially over time in a plurality of rendered 2-D images that are displayed sequentially over time.

10. The method of claim 1, further comprising:
receiving an input signal from a first input device on the gaming machine wherein the input signal provides information for altering the game outcome presentation for the game of chance.

11. The method of claim 10, wherein the input signal is for one of stopping or starting the motion of the one or more 3-D objects.

12. The method of claim 11, wherein the input signal is for altering a motion of the one or more 3-D objects.

13. In a gaming machine including a master gaming controller, a display device and a memory device, a method of generating a game of chance, the method comprising:
receiving a wager for the game of chance controlled by the master gaming controller on the gaming machine wherein the gaming machine is capable of receiving indicia of credit for the wager from an input device coupled to the gaming machine and outputting indicia of credit from an output device coupled to the gaming machine;

determining randomly a final state on each of a plurality of virtual reel strips;

for each virtual reel strip, a) determining a sequence of symbols to display from the virtual reel strip wherein each of the sequence of symbols comprises at least one of i) a number of symbols prior to the final state on the virtual reel strip; ii) a number of symbols after the final state on the virtual reel strip; or iii) combinations thereof; and b) drawing the sequence of symbols over time on a surface defined in a 3-D gaming environment, said drawing comprising;

i) dividing the surface into a number of segments and wherein the number of segments is less than a total number of segments associated with the virtual reel strip;

ii) selecting a first subset of symbols from the sequence of symbols to draw in the segments;

iii) drawing the first subset of symbols in the segments;

iv) moving the surface, including the first subset of the sequence of symbols, from a first position to a second position in the 3-D gaming environment;

v) generating the surface at the first position in the 3-D gaming environment;

vi) selecting a second subset of symbols from the sequence of symbols to draw in the segments;

vii) drawing the second set of symbols in the segments; and viii) moving the surface, including the second subset of the sequence of symbols, from the first position to the second position in the 3-D gaming environment; wherein the first subset and the second subset are defined so that when a plurality of 2-D images are rendered from the 3-D gaming environment to capture the movements of the surface, the symbols, as viewed on the display screen, appear to enter and to leave the display screen in an order specified by the sequence of symbols determined for each virtual reel strip.

14. The method of claim 13, further comprising:
determining a motion for each of the surfaces in the 3-D gaming environment; and, while rendering the plurality of 2-D images, applying the determined motion for each of the surfaces in the 3-D gaming environment wherein the motion for each of the surfaces is captured in at least a portion of the plurality of the 2-D images.

15. The method of claim 14, wherein, when the 2-D images are viewed in a sequence, the rendered symbols appear to move along a linear path from a top of the display screen to the bottom of the display screen.

16. The method of claim 13, wherein one or more of the rate of movement and the direction of movement of the surfaces varies over time.

17. The method of claim, 13 further comprising:
dividing each surface into a number of segments and drawing at least one symbol from the sequence of symbols in each segment.

18. The method of claim 17, wherein a type of symbol drawn in each segment varies with time.

19. The method of claim 17, wherein a portion of the number is segments are viewable on the display screen at any one time when the one or more 2-D images are displayed to the display screen.

20. The method of claim 17, wherein positions of a portion of the number of segments are used to specify a payline when the one or more 2-D images are displayed to the display screen.

21. The method of claim 17, wherein, when the one or more 2-D images are displayed to the display screen, areas occupied by a portion of the number of segments on the display screen correspond to active areas of a touch screen sensor coupled to the display screen.

22. The method of claim 21, wherein the gaming machine is capable of altering a movement of a first surface in the 3-D gaming environment when an input signal is generated from an active area on the touch screen sensor above the first surface in one of the 2-D images.

23. The method of claim 13, further comprising:
displaying the final state for a plurality of virtual reel strips in a first game of chance;
storing the final state of each of the virtual reel strips;
for a second game of chance following the first game of chance,
determining the sequence of the symbols to display from the virtual reels strips wherein the final states from the plurality of virtual reel strips from the first game of chance are initial states of the sequence of symbols for the second game of chance.

24. A gaming machine comprising:
a housing;
a master gaming controller designed or configured to control a game of chance played on the gaming machine mounted within the housing and to execute game logic;
an input device coupled to the housing capable of receiving indicia of credit for wagers on the game of chance;
an output device coupled to the housing capable of outputting indicia of credit from the gaming machine;
a memory device coupled to the housing for storing information used to generate a 3-D gaming environment comprising one or more virtual slot reels;
game logic executed on the gaming machine for rendering one or more two-dimensional images derived from the 3-D gaming environment wherein the rendering for each virtual slot reel comprises a) determining a sequence of symbols to display from a virtual reel strip associated with the virtual slot reel wherein each of the sequence of symbols comprises at least one of i) a number of symbols prior to the final state on the virtual reel strip; ii) a number of symbols after the final state on the virtual reel strip; or iii) combinations thereof; and b) drawing the sequence of symbols over time on a surface defined in a 3-D gaming environment, said drawing comprising;
i) dividing the surface into a number of segments and wherein the number of segments is less than a total number of segments associated with the virtual reel strip;
ii) selecting a first subset of symbols from the sequence of symbols to draw in the segments;
iii) drawing the first subset of symbols in the segments;
iv) moving the surface, including the first subset of the sequence of symbols from a first position to a second position in the 3-D gaming environment
v) generating the surface at the first position in the 3-D gaming environment;
vi) selecting a second subset of symbols from the sequence of symbols to draw in the segments;
vii) drawing the second set of symbols in the segments;
viii) moving the surface, including the second subset of the sequence of symbols from the first position to the second position in the 3-D gaming environment; wherein the first subset and the second subset are defined so that when a plurality of 2-D images are rendered from the 3-D gaming environment to capture the movements of the surface, the symbols, as viewed on the display screen, appear to enter and to leave the display screen in an order specified by the sequence of symbols determined for each virtual reel strip; and
one or more display devices for displaying a game outcome presentation for the game of chance comprising said rendered one or more two-dimensional images.

25. The gaming machine of claim 24, wherein the game of chance is a video slot game.

26. The gaming machine of claim 25, further comprising:
game logic for generating a motion of the one or more virtual slot reels in the 3-D gaming environment wherein, when the plurality of 2-D images capturing one or more the virtual slot reels at various positions in the 3-D gaming environment is viewed on the display screen, the virtual slot reels appear to move on the display screen.

* * * * *

UNITED STATES PATENT AND TRADEMARK OFFICE
CERTIFICATE OF CORRECTION

PATENT NO. : 8,523,672 B2
APPLICATION NO. : 13/555811
DATED : September 3, 2013
INVENTOR(S) : Alexey Kryuchkov et al.

It is certified that error appears in the above-identified patent and that said Letters Patent is hereby corrected as shown below:

IN THE CLAIMS

In Claim 1, Column 45, Line 10, between "of" and "indices" insert --the--.
In Claim 1, Column 45, Line 24, replace "set" with --subset--.
In Claim 1, Column 45, Line 24, between "symbols" and the second instance of "the" insert --on--.
In Claim 1, Column 45, Line 31, replace "screen" with --device--.
In Claim 1, Column 45, Line 32, replace "screen" with --device--.
In Claim 6, Column 45, Line 62, after the second instance of "the" insert --3-D--.
In Claim 7, Column 45, Line 67, replace the second instance of "or" with --and--.
In Claim 8, Column 46, Line 6, replace "or" with --and--.
In Claim 8, Column 46, Line 7, delete "portion".
In Claim 11, Column 46, Line 20, replace the first instance of "or" with --and--.
In Claim 12, Column 46, Line 23, replace "a" with --the--.
In Claim 13, Column 46, Line 38, delete "of the".
In Claim 13, Column 46, Line 41, replace "or" with --and--.
In Claim 13, Column 46, Line 59, replace "set" with --subset--.
In Claim 13, Column 46, Line 67, replace the first instance of "screen" with --device--.
In Claim 13, Column 46, Line 67, replace the second instance of "screen" with --device--.
In Claim 14, Column 47, Line 9, delete the second instance of "the".
In Claim 15, Column 47, Line 12, replace "screen" with --device--.
In Claim 15, Column 47, Line 13, replace "screen" with --device--.
In Claim 16, Column 47, Line 14, replace the second instance of "the" with --a--.
In Claim 16, Column 47, Line 15, replace the first instance of "the" with --a--.
In Claim 17, Column 47, Line 18, delete "dividing each surface into a number of segments and".
In Claim 19, Column 47, Line 24, replace "is" with --of--.
In Claim 19, Column 47, Line 24, replace "screen" with --device--.
In Claim 19, Column 47, Line 26, replace "screen" with --device--.
In Claim 20, Column 47, Line 30, replace "screen" with --device--.
In Claim 21, Column 47, Line 32, replace "screen" with --device--.

Signed and Sealed this
Twentieth Day of January, 2015

Michelle K. Lee
*Deputy Director of the United States Patent and Trademark Office*

CERTIFICATE OF CORRECTION (continued)
U.S. Pat. No. 8,523,672 B2

IN THE CLAIMS

In Claim 21, Column 47, Line 34, replace "screen" with --device--.
In Claim 21, Column 47, Line 35, replace "screen" with --device--.
In Claim 24, Column 48, Line 14, replace the first instance of "the" with --a--.
In Claim 24, Column 48, Line 16, replace "or" with --and--.
In Claim 24, Column 48, Line 34, replace "set" with --subset--.
In Claim 24, Column 48, Line 41, replace the third instance of "the" with --a--.
In Claim 26, Column 48, Line 54, between "more" and the first instance of "the" insert --of--.